(12) United States Patent
Sato et al.

(10) Patent No.: US 7,379,268 B2
(45) Date of Patent: May 27, 2008

(54) THIN-FILM MAGNETIC HEAD INCLUDING NON-MAGNETIC LAYER FOR MAINTAINING FLATNESS OF THE TOP SURFACE OF POLE PORTION LAYER

(75) Inventors: Yoshikazu Sato, Tokyo (JP); Tetsuya Roppongi, Tokyo (JP); Yuichi Watabe, Tokyo (JP)

(73) Assignee: TDK Corporation, Tokyo (JP)

( * ) Notice: Subject to any disclaimer, the term of this patent is extended or adjusted under 35 U.S.C. 154(b) by 1083 days.

(21) Appl. No.: 09/985,604

(22) Filed: Nov. 5, 2001

(65) Prior Publication Data

US 2002/0109946 A1 Aug. 15, 2002

(30) Foreign Application Priority Data

Nov. 10, 2000 (JP) ............................. 2000-343245
Nov. 10, 2000 (JP) ............................. 2000-344507
Jan. 23, 2001 (JP) ............................. 2001-014950

(51) Int. Cl.
*G11B 5/31* (2006.01)

(52) U.S. Cl. ........................ 360/125.07; 360/125.08; 360/125.11; 360/125.29; 360/125.3

(58) Field of Classification Search ............... 360/126, 360/317, 125, 123.03, 123.04, 123.06, 123.09, 360/125.02, 125.03, 125.06, 125.07, 125.08, 360/125.11, 125.12, 125.15, 125.27, 125.28, 360/125.29, 125.3, 125.32

See application file for complete search history.

(56) References Cited

U.S. PATENT DOCUMENTS 4,516,180 A * 5/1985 Narishige et al. ........... 360/126

| 4,589,042 | A | * | 5/1986 | Anderson et al. ........... 360/125 |
| 4,716,484 | A | * | 12/1987 | Kaminaka et al. .......... 360/126 |
| 4,791,719 | A | | 12/1988 | Kobayashi et al. |
| 4,855,854 | A | | 8/1989 | Wada et al. |
| 5,181,151 | A | * | 1/1993 | Yamashita et al. .......... 360/126 |
| 5,198,950 | A | * | 3/1993 | Wada et al. ................. 360/126 |
| 5,218,499 | A | * | 6/1993 | Wada et al. ................. 360/126 |

(Continued)

FOREIGN PATENT DOCUMENTS

| JP | A 60-133516 | 7/1985 |
| JP | A 63-195815 | 8/1988 |
| JP | A 11-102506 | 4/1999 |
| JP | A 2000-57522 | 2/2000 |
| JP | A 2000-67413 | 3/2000 |

OTHER PUBLICATIONS

"Nikkei Electronics", Sep. 25, 2000 Issue (No. 779), p. 206, Fig. 2.
"Head/Media Las Vegas 2000—Show Directroy", Nov. 11-12, 2000.

*Primary Examiner*—Craig A. Renner
(74) *Attorney, Agent, or Firm*—Oliff & Berridge, PLC

(57) ABSTRACT

A thin-film magnetic head comprises first and second magnetic layers, a gap layer provided between the first and second magnetic layers, a coupling portion for magnetically coupling the first and second magnetic layers to each other at a distance from a medium facing surface ABS, and a thin-film coil, part of which is disposed between the first and second magnetic layers. The second magnetic layer has a pole portion layer and a yoke portion layer. The thin-film magnetic head further comprises a non-magnetic layer that is in contact with the surface of the pole portion layer farther from the gap layer. The non-magnetic layer prevents the surface of the pole portion layer farther from the gap layer from being damaged during the manufacturing process of the head, and thereby maintains the flatness of the surface.

12 Claims, 47 Drawing Sheets

U.S. PATENT DOCUMENTS

| | | | | |
|---|---|---|---|---|
| 5,543,989 A | * | 8/1996 | Westwood | 360/319 |
| 5,872,693 A | * | 2/1999 | Yoda et al. | 360/126 |
| 6,373,657 B1 | * | 4/2002 | Kamijima | 360/126 |
| 6,738,222 B2 | * | 5/2004 | Sato et al. | 360/126 |

* cited by examiner

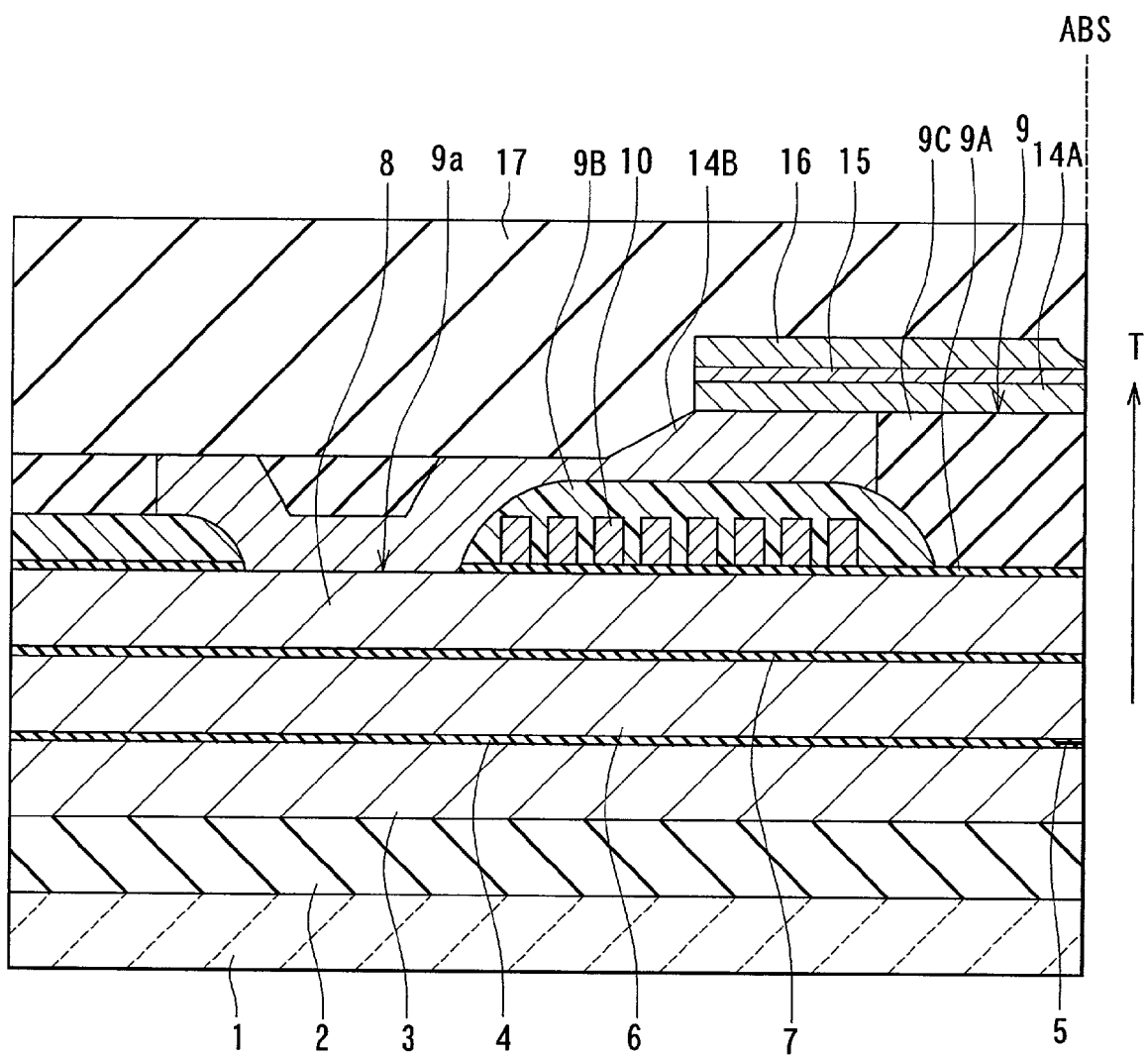
F I G. 70

THIN-FILM MAGNETIC HEAD INCLUDING NON-MAGNETIC LAYER FOR MAINTAINING FLATNESS OF THE TOP SURFACE OF POLE PORTION LAYER

BACKGROUND OF THE INVENTION

1. Field of the Invention

The present invention relates to a thin-film magnetic head for use with a magnetic read/write apparatus such as a magnetic disc apparatus and a magnetic tape apparatus, and to the method of manufacturing such a thin-film magnetic head.

2. Description of the Related Art

The recording schemes for a magnetic read/write apparatus include a longitudinal magnetic recording scheme which employs the direction of signal magnetization along the surface of the recording medium (or in the longitudinal direction) and a vertical magnetic recording scheme which employs the direction of signal magnetization perpendicular to the surface of the recording medium. When compared with the longitudinal magnetic recording scheme, the vertical magnetic recording scheme is said to be less affected by the thermal fluctuation of a recording medium and therefore possible to implement a higher linear recording density.

In general, the thin-film magnetic head that employs the longitudinal magnetic recording scheme comprises: a medium facing surface (or air bearing surface) that faces toward a recording medium; a first magnetic layer and a second magnetic layer magnetically coupled to each other and including magnetic pole portions that are opposed to each other and placed in regions of the magnetic layers on a side of the medium facing surface, with a gap layer provided between the pole portions; and a thin-film coil at least a part of which is placed between the first and second magnetic layers and insulated from the first and second magnetic layers.

On the other hand, examples of the thin-film magnetic head that employs the vertical magnetic recording scheme include a ring head having the same structure as that of the thin-film magnetic head that employs the longitudinal magnetic recording scheme, and a single magnetic pole head for applying a magnetic field in a direction perpendicular to the surface of the recording medium with one main magnetic pole. Generally, for the single magnetic pole head, used as a recording medium is a two-layer medium that has a soft magnetic layer and a magnetic recording layer stacked on a substrate.

For thin-film magnetic heads, it is desired that the track width should be reduced so as to increase track density. For the purpose of achieving reduction in the track width without reducing the intensity of a magnetic field to be applied to the recording medium, various thin-film magnetic heads have been proposed, in which the magnetic layer including the magnetic pole portion is divided into a magnetic pole portion and a yoke portion that is magnetically connected to the magnetic pole portion, the magnetic pole portion having a saturated magnetic flux density higher than that of the yoke portion.

Examples of the thin-film magnetic head having the structure in which the magnetic layer including the magnetic pole portion is divided into the magnetic pole portion and the yoke portion as mentioned above are disclosed in Published Unexamined Japanese Patent Application (KOKAI) Nos. 2000-57522, 2000-67413, and Heisei 11-102506.

Any one of the thin-film magnetic heads disclosed in the aforementioned publications comprises the first and second magnetic layers. The second magnetic layer is disposed on the leading side in the traveling direction of the recording medium (or on the air-outflow-end side of a slider including the thin-film magnetic head), and is divided into the magnetic pole portion and the yoke portion.

In addition, in any one of the thin-film magnetic heads disclosed in the aforementioned publications, the yoke portion is arranged so as to detour around a coil in a region extending from a portion where the first and second magnetic layers are magnetically connected to each other to the magnetic pole portion.

In the thin-film magnetic head disclosed in Published Unexamined Japanese Patent Application (KOKAI) No. 2000-57522, the second magnetic layer has a main magnetic film and an auxiliary magnetic film. In this head, the magnetic pole portion is composed of a part of the main magnetic film located on a side of the medium facing surface, while the yoke portion is composed of the other part of the main magnetic film and the auxiliary magnetic film.

In the thin-film magnetic head disclosed in Published Unexamined Japanese Patent Application (KOKAI) No. 2000-67413, the second magnetic layer has a pole portion layer including the magnetic pole portion, and a yoke portion layer including the yoke portion. The pole portion layer is magnetically connected to the yoke portion layer at the rear end surface (opposite to the medium facing surface), at the side surfaces (perpendicular to the medium facing surface and a surface of the gap portion), and at the top surface (opposite to the gap portion).

In the thin-film magnetic head disclosed in Published Unexamined Japanese Patent Application (KOKAI) No. Heisei 11-102506, the second magnetic layer has a pole portion layer including the magnetic pole portion, and a yoke portion layer including the yoke portion. The pole portion layer is magnetically connected to the yoke portion layer at the side surfaces and at the top surface.

On the other hand, for the thin-film magnetic head employing the vertical magnetic recording scheme, an example of the structure of a single magnetic pole head is shown in FIG. 2 of "Nikkei Electronics, Sep. 25, 2000 Issue (No. 779), p. 206". This head has a single-layered magnetic layer including the main magnetic pole.

For example, to realize a magnetic read/write apparatus having an areal recording density of 60 G bits/inch$^2$ or greater, the vertical magnetic recording scheme is expected to be employable. However, such a thin-film magnetic head has not been realized that is suitable for the vertical magnetic recording scheme and has characteristics capable of realizing a magnetic read/write apparatus having an areal recording density of 60 G bits/inch$^2$ or greater. This is because of problems as discussed below that are present in the prior-art thin-film magnetic heads.

First, any one of the thin-film magnetic heads disclosed in the aforementioned publications is intended structurally for the longitudinal magnetic recording scheme and not suitable for the vertical magnetic recording scheme. More specifically, any one of the thin-film magnetic heads disclosed in the aforementioned publications has a thin gap portion and a short throat height, and the yoke portion is arranged to detour around the coil. This structure raises a problem that the magnetic pole portion develops a reduced magnetic field that is perpendicular to the surface of the recording medium. Furthermore, any one of the thin-film magnetic heads disclosed in the aforementioned publications is vulnerable to curving at the edge opposite to the gap portion of the magnetic pole portion, due to the etching for patterning the magnetic pole portion of the second magnetic layer or the steps subsequent to the formation of the magnetic pole portion. This raises a problem that a distortion occurs in the shape of the bit pattern of the recording medium, which makes it difficult to increase the linear recording density. Furthermore, any one of the thin-film magnetic heads disclosed in the aforementioned publications has a structure in which the yoke portion is arranged so as to detour around the coil, which raises a problem of having a long magnetic path, and this in turn causes a deterioration of the high-frequency characteristics.

On the other hand, in the thin-film magnetic head disclosed in Published Unexamined Japanese Patent Application (KOKAI) No. Heisei 11-102506, the pole portion layer is magnetically connected to the yoke portion layer only at the side surfaces and the top surface. This structure causes the head to have a small area of the connecting portion where the pole portion layer and the yoke portion layer are magnetically connected to each other. Accordingly, this raises a problem that the magnetic flux is saturated at the connecting portion, thereby causing the magnetic pole portion to generate a reduced magnetic field in the medium facing surface.

On the other hand, in the thin-film magnetic head shown in FIG. 2 of "Nikkei Electronics, Sep. 25, 2000 Issue (No. 779), p. 206", the magnetic layer including the main magnetic pole is made up of a single layer. In this head, in order to reduce the thickness of the magnetic layer in the medium facing surface, the entire magnetic layer is made thin. Accordingly, this raises a problem that the magnetic flux tends to be saturated halfway through the magnetic layer and therefore the main magnetic pole generates a reduced magnetic field in the medium facing surface.

If the end of the main magnetic pole on the air-outflow side is not flat in the medium facing surface, the shape of bit pattern of the recording medium is distorted, and as a result, the linear recording density is reduced. Therefore, to improve the linear recording density, it is desirable that the end of the main magnetic pole on the air-outflow side be flat in the medium facing surface.

According to the thin-film magnetic head shown in FIG. 2 of "Nikkei Electronics, Sep. 25, 2000 Issue (No. 779), p. 206", however, the entire magnetic layer has to be made flat in order to flatten the air-outflow-side end of the main magnetic pole in the medium facing surface. This causes the head to have a square and long magnetic path. Such a structure makes the head inefficient in terms of the intensity of magnetic field and high-frequency characteristics.

OBJECT AND SUMMARY OF THE INVENTION

It is therefore an object of the present invention to provide a thin-f film magnetic head which allows the magnetic pole portion to produce an increased magnetic f field perpendicular to the surface of a recording medium and has an improved recording density, and to a method of manufacturing such a thin-film magnetic head.

A thin-film magnetic head of the present invention comprises:

a medium facing surface that faces toward a recording medium;

a first magnetic layer and a second magnetic layer that are magnetically coupled to each other at a distance from the medium facing surface, and include magnetic pole portions disposed so as to oppose to each other with a predetermined spacing interposed therebetween along the traveling direction of the recording medium;

a gap layer made of a non-magnetic material and provided between the first and second magnetic layers; and a thin-film coil at least a part of which is disposed between the first and second magnetic layers and insulated from the first and second magnetic layers, wherein:

the second magnetic layer has: a pole portion layer including the magnetic pole portion, the width of the pole portion layer measured in the medium facing surface defining a track width; and a yoke portion layer for magnetically connecting the pole portion layer and the first magnetic layer to each other, and the yoke portion layer is magnetically connected to the pole portion layer at least in part of: an end surface of the pole portion layer farther from the medium facing surface; a surface of the pole portion layer closer to the gap layer; and both side surfaces of the pole portion layer in the width direction, the thin-film magnetic head further comprising a non-magnetic layer that is in contact with the entire surface of the pole portion layer farther from the gap layer.

In the thin-film magnetic head of the present invention, the second magnetic layer has the pole portion layer and the yoke portion layer. It is therefore possible to reduce the track width without decreasing the intensity of the magnetic field to be applied to the recording medium. Furthermore, the thin-film magnetic head of the invention comprises the non-magnetic layer that is in contact with the entire surface of the pole portion layer farther from the gap layer. It is therefore possible to prevent the surface of the pole portion layer farther from the gap layer from being damaged in the manufacturing process of the thin-film magnetic head, and to thereby keep the surface flat.

In the thin-film magnetic head of the invention, a part of the yoke portion layer may be adjacent to the surface of the pole portion layer farther from the gap layer via the non-magnetic layer, and magnetically connected to the pole portion layer via the non-magnetic layer.

In the thin-film magnetic head of the invention, the part of the yoke portion layer that is adjacent to the surface of the pole portion layer farther from the gap layer via the non-magnetic layer has a surface that is farther from the non-magnetic layer, and the surface, at least in a part thereof located near the medium facing surface, may gradually get closer to the non-magnetic layer as the distance from the medium facing surface decreases.

In the thin-film magnetic head of the invention, the part of the yoke portion layer that is adjacent to the surface of the pole portion layer farther from the gap layer via the non-magnetic layer may include: a direct connection layer that is in contact with the non-magnetic layer; and an indirect connection layer that is in contact with at least a part of a surface of the direct connection layer farther from the non-magnetic layer. In this case, the surface of the direct connection layer farther from the non-magnetic layer, at least in a part thereof located near the medium facing surface, may gradually get closer to the non-magnetic layer as the distance from the medium facing surface decreases.

The thin-film magnetic head of the invention may further comprise a third magnetic layer that is adjacent to a surface of the non-magnetic layer farther from the pole portion layer. In this case, one of ends of the third magnetic layer closer to the medium facing surface may be located at a distance from the medium facing surface. In addition, the third magnetic layer may have a saturated magnetic flux density smaller than that of the pole portion layer.

In the thin-film magnetic head of the invention, the pole portion layer may have a saturated magnetic flux density equal to or greater than that of the yoke portion layer.

The thin-film magnetic head of the invention may further comprise a magnetoresistive element as a read element.

In the thin-film magnetic head of the invention, the first magnetic layer may be disposed on the trailing side of the traveling direction of the recording medium, while the second magnetic layer may be disposed on the leading side of the traveling direction of the recording medium.

The thin-film magnetic head of the invention may be employed for a vertical magnetic recording scheme.

A method of the invention is provided for manufacturing a thin-film magnetic head comprising: a medium facing surface that faces toward a recording medium; a first magnetic layer and a second magnetic layer that are magnetically coupled to each other at a distance from the medium facing surface, and include magnetic pole portions disposed so as to oppose to each other with a predetermined spacing interposed therebetween along the traveling direction of the recording medium; a gap layer made of a non-magnetic material and provided between the first and second magnetic layers; and a thin-film coil at least a part of which is disposed between the first and second magnetic layers and insulated from the first and second magnetic layers, wherein the second magnetic layer has: a pole portion layer including the magnetic pole portion, the width of the pole portion layer measured in the medium facing surface defining a track width; and a yoke portion layer for magnetically connecting the pole portion layer and the first magnetic layer to each other.

The method comprises the steps of:
forming the first magnetic layer;
forming the gap layer;
forming the thin-film coil; and
forming the second magnetic layer having the pole portion layer and the yoke portion layer, and forming a non-magnetic layer that is in contact with the entire surface of the pole portion layer farther from the gap layer, such that the yoke portion layer is magnetically connected to the pole portion layer at least in a part of: an end surface of the pole portion layer farther from the medium facing surface; a surface of the pole portion layer closer to the gap layer; and both side surfaces of the pole portion layer in the width direction.

According to the method of manufacturing the thin-film magnetic head of the invention, the second magnetic layer is formed to have the pole portion layer and the yoke portion layer. It is therefore possible to reduce the track width without decreasing the intensity of the magnetic field to be applied to the recording medium. Furthermore, in the method of manufacturing the thin-film magnetic head of the invention, the non-magnetic layer is formed which is in contact with the entire surface of the pole portion layer farther from the gap layer. It is therefore possible to prevent the surface of the pole portion layer farther from the gap layer from being damaged in the manufacturing process of the thin-film magnetic head, and thereby to keep the surface flat.

In the method of manufacturing a thin-film magnetic head of the invention, the step of forming the second magnetic layer and the non-magnetic layer may include the steps of:
forming a layer to be etched, of a material for forming the pole portion layer, on the gap layer;
forming the non-magnetic layer on the layer to be etched;
forming a mask corresponding to a shape of the pole portion layer on the non-magnetic layer; and
defining an outer shape of the pole portion layer by selectively etching the non-magnetic layer and the layer to be etched, through dry etching using the mask.

In the method of manufacturing a thin-film magnetic head of the invention, the step of forming the second magnetic layer and the non-magnetic layer may further include the step of flattening a top surface of the layer to be etched, through polishing, after the step of forming the layer to be etched.

In the method of manufacturing the thin-film magnetic head of the invention, the step of forming the second magnetic layer and the non-magnetic layer may further include the step of flattening a base of the layer to be etched, through polishing, prior to the step of forming the layer to be etched.

In the method of manufacturing a thin-film magnetic head of the invention, the mask may be formed of a magnetic material. In this case, in the step of defining the outer shape of the pole portion layer, the etching may be carried out so as to allow at least a portion of the mask to remain. Furthermore, in the step of defining the outer shape of the pole portion layer, a third magnetic layer may be formed of the portion of the mask remaining after the etching, the third magnetic layer being adjacent to a surface of the non-magnetic layer farther from the pole portion layer. In the step of defining the outer shape of the pole portion layer, a part of the yoke portion layer may be formed of the portion of the mask remaining after the etching, the yoke portion layer being adjacent to the surface of the pole portion layer farther from the gap layer via the non-magnetic layer, and magnetically connected to the pole portion layer via the non-magnetic layer.

In the method of manufacturing a thin-film magnetic head of the invention, when the mask is formed of a magnetic material and the etching in the step of defining the outer shape of the pole portion layer is carried out so as to allow at least a part of the mask to remain, the mask may be formed by electroplating through the use of a frame having a gap portion, a part of the gap portion located near the medium facing surface having a width smaller than that of the other part of the gap portion. Furthermore, in the step of defining the outer shape of the pole portion layer, the etching may be carried out such that a part of the mask located near the medium facing surface is completely removed while the other part of the mask is allowed to remain. The mask used in this case may have a shape such that the part located near the medium facing surface has a thickness smaller than that of the other part.

Other and further objects, features and advantages of the invention will appear more fully from the following description.

BRIEF DESCRIPTION OF THE DRAWINGS

FIG. 70 is a cross-sectional view illustrating the structure of a thin-film magnetic head according to a first modified example of the sixth embodiment of the invention.

DETAILED DESCRIPTION OF THE PREFERRED EMBODIMENTS

Embodiments of the invention will now be described in detail with reference to the accompanying drawings.

First Embodiment

Figure 1:
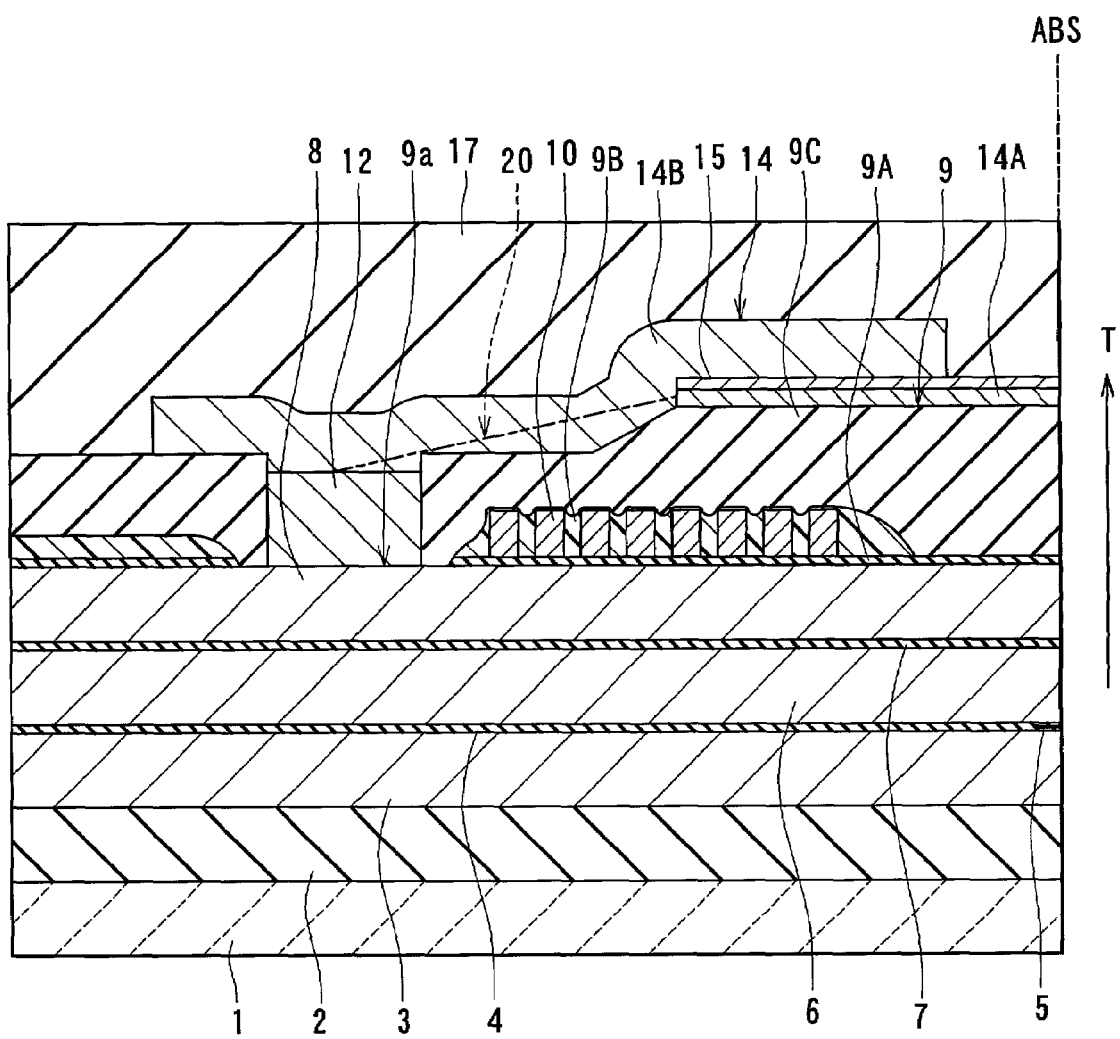
FIG. 1 is a cross-sectional view illustrating a structure of a thin-film magnetic head according to a first embodiment of the invention.
Figure 2:
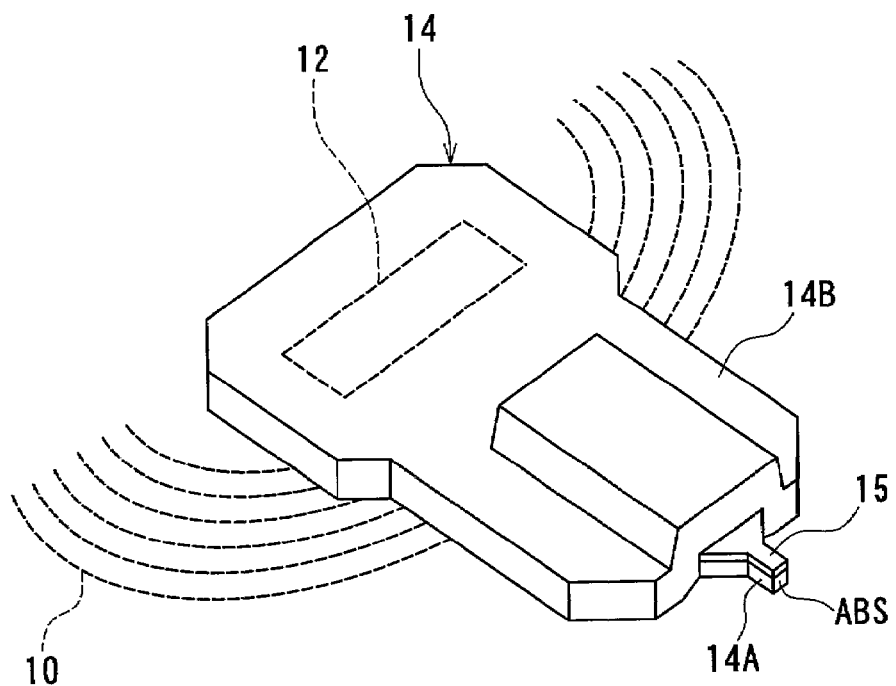
FIG. 2 is a perspective view illustrating the main part of the thin-film magnetic head shown in FIG. 1.
Figure 3:
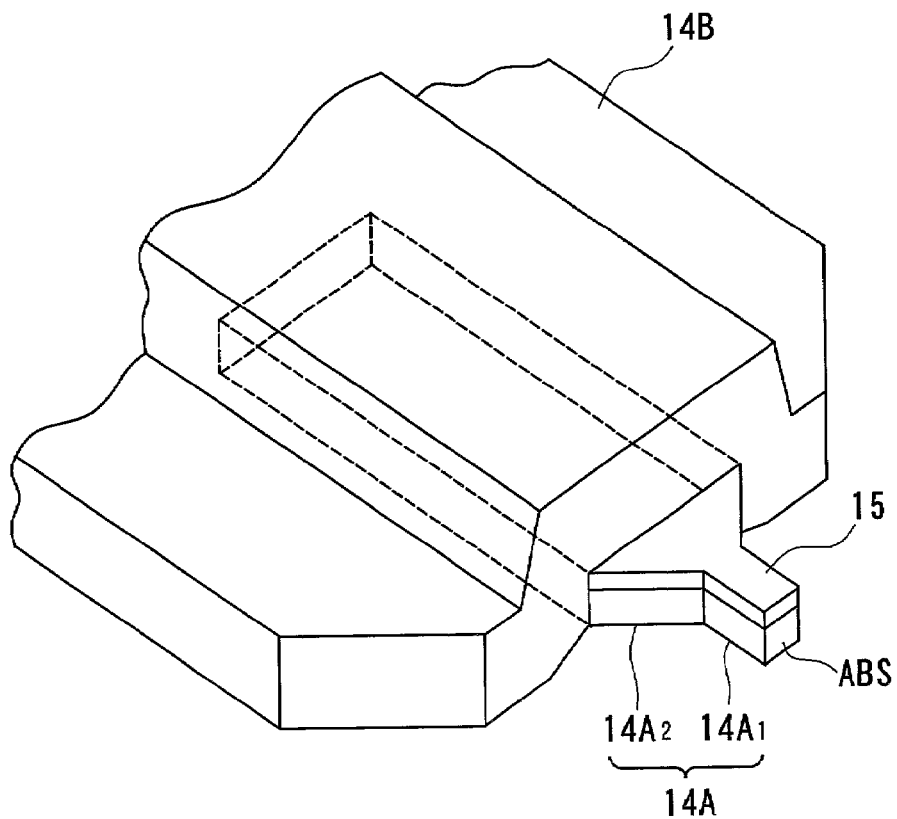
FIG. 3 is an enlarged perspective view illustrating the vicinity of the magnetic pole portion shown in FIG. 2.
Figure 4:
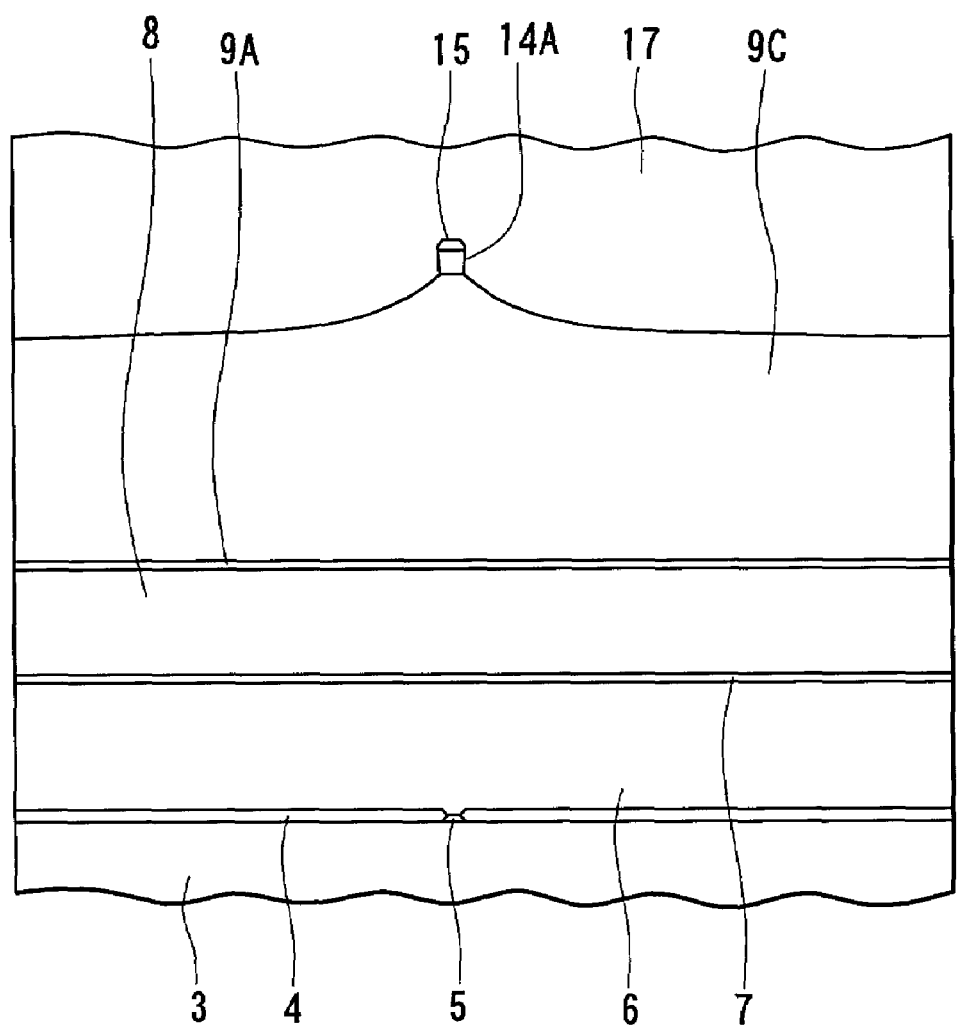
FIG. 4 is a front view illustrating part of the medium facing surface of the thin-film magnetic head shown in FIG. 1.
Figure 5:
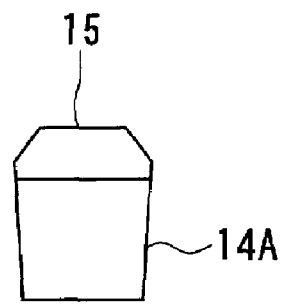
FIG. 5 is an enlarged front view illustrating the pole portion layer and the non-magnetic layer shown in FIG. 4.

FIG. 1 is a cross-sectional view illustrating the structure of a thin-film magnetic head according to a first embodiment of the invention. FIG. 1 shows a cross section orthogonal to the medium facing surface and the surface of the substrate. In addition, the arrow indicated by symbol T in FIG. 1 shows the traveling direction of a recording medium. FIG. 2 is a perspective view illustrating the main part of the thin-film magnetic head shown in FIG. 1. FIG. 3 is an enlarged perspective view illustrating the vicinity of the magnetic pole portion shown in FIG. 2. FIG. 4 is a front view illustrating part of the medium facing surface of the thin-film magnetic head shown in FIG. 1. FIG. 5 is an enlarged front view illustrating the pole portion layer and the non-magnetic layer shown in FIG. 4.

As shown in FIG. 1, the thin-film magnetic head according to this embodiment comprises: a substrate 1 made of a ceramic material such as aluminum oxide and titanium carbide ($Al_2O_3.TiC$); an insulating layer 2 made of an insulating material such as alumina ($Al_2O_3$) and formed on the substrate 1; a bottom shield layer 3 made of a magnetic material and formed on the insulating layer 2; an MR (magnetoresistive) element 5 functioning as a read element and formed on the bottom shield layer 3 via an insulating layer 4; and a top shield layer 6 made of a magnetic material and formed on the MR element 5 via the insulating layer 4. Each of the bottom shield layer 3 and the top shield layer 6 has a thickness of, for example, 1 to 2 μm.

One of ends of the MR element 5 is located in the medium facing surface (air bearing surface) ABS. The MR element 5 may be an element made of a magnetosensitive film that exhibits a magnetoresistive effect, such as an anisotropic magnetoresistive (AMR) element, a giant magnetoresistive (GMR) element, or a tunneling magnetoresistive (TMR) element.

The thin-film magnetic head further comprises: a non-magnetic layer 7 formed on the top shield layer 6; a first magnetic layer 8 made of a magnetic material and formed on the non-magnetic layer 7; an insulating layer 9A formed on a portion of the first magnetic layer 8 in which a thin-film coil 10 is to be formed; the thin-film coil 10 formed on the insulating layer 9A; and an insulating layer 9B filled at least between windings of the thin-film coil 10. There is formed a contact hole 9a in the insulating layer 9A at a distance from the medium facing surface ABS.

For example, the first magnetic layer 8 has a thickness of 1 to 2 μm. The magnetic material for making the first magnetic layer 8 may be an iron-nickel-based alloy or Permalloy, or a high saturated magnetic flux density material to be described later.

The insulating layer 9A is made of a non-conductive and non-magnetic material such as alumina, and has a thickness of 0.1 to 1 μm, for example.

The thin-film coil 10 is made of a conductive material al such as copper, and the winding thereof is 0.3 to 2 μm in thickness, for example. Thin-film coil 10 can have any number of turns of the winding as well as any pitch of the winding. In this embodiment, as an example, the winding of the thin-film coil 10 has a thickness of 1.3 μm, a width of 0.8 μm, a pitch of 1.3 μm, and the number of turns of 8.

The insulating layer 9B is made of a non-conductive and non-magnetic material that exhibits fluidity during its formation. More specifically, the insulating layer 9B may be formed of an organic, non-conductive and non-magnetic material such as photoresist (a photosensitive resin), or a spin-on-glass (SOG) film of coating glass.

The thin-film magnetic head further comprises: a coupling portion 12 made of a magnetic material and f formed on a portion of the first magnetic layer 8 in which the contact hole 9a is formed; and an insulating layer 9C formed so as to cover the thin-film coil 10 and the insulating layers 9A and 9B. The thin-film coil 10 is wound around the coupling portion 12.

For example, the coupling portion 12 has a thickness of 2 to 4 μm, a depth (or the length perpendicular to the medium facing surface ABS) of 2 to 10 μm, and a width of 5 to 20 μm. For example, the magnetic material making the coupling portion 12 may be an iron-nickel-based alloy or Permalloy, or a high saturated magnetic flux density material as described later.

The insulating layer 9C is made of a non-conductive and non-magnetic material which has abetter resistance to corrosion, rigidity, and insulating strength than those of the insulating layer 9B. As such a material, an inorganic, non-conductive and non-magnetic material such as alumina and silicon dioxide ($SiO_2$) may be used. The total thickness of the insulating layers 9A and 9C in the medium facing surface ABS is, for example, 2 to 4 μm. This thickness should be equal to or greater than the thickness of the coupling portion 12.

The insulating layers 9A, 9B and 9C make up a gap layer 9 that is provided between the first magnetic layer 8 and a second magnetic layer 14 to be described later.

The thin-film magnetic head further comprises the second magnetic layer 14 made of a magnetic material and formed on the insulating layer 9C and the coupling portion 12 over a region extending from the medium facing surface ABS to at least the coupling portion 12. The second magnetic layer 14 has a pole portion layer 14A including a magnetic pole portion and a yoke portion layer 14B that serves as a yoke. The pole portion layer 14A is formed on the insulating layer 9C over a region extending from the medium facing surface ABS to a predetermined position located between the medium facing surface ABS and the coupling portion 12. The yoke portion layer 14B magnetically connects an end of the coupling portion 12, the end being located closer to the second magnetic layer 14 (hereinafter referred to as the upper end), and an end surface of the pole portion layer 14A, the end surface being located farther from the medium facing surface ABS (hereinafter referred to as the rear end surface), to each other. In addition, the yoke portion layer 14B has such a shape as allows to form a magnetic path 20, inside the yoke portion layer 14B, the path 20 connecting the upper end of the coupling portion 12 and the rear end surface of the pole portion layer 14A in the shortest distance. The thin-film magnetic head further comprises a non-magnetic layer 15 that is formed on the pole portion layer 14A. Part of the yoke portion layer 14B located near the medium facing surface ABS is adjacent to the top surface of the pole portion layer 14A via the non-magnetic layer 15, and magnetically connected to the pole portion layer 14A via the non-magnetic layer 15. The thin-film magnetic head further comprises a protective layer 17 made of a non-conductive and non-magnetic material such as alumina and formed to cover the second magnetic layer 14.

The surface of the thin-film coil 10 closer to the second magnetic layer 14 is located closer to the first magnetic layer 8 than an end of the gap layer 9, the end being located in the medium facing surface ABS next to the second magnetic layer 14 (or the end of the insulating layer 9C closer to the second magnetic layer 14).

The pole portion layer 14A is preferably 0.1 to 0.8 μm in thickness and more preferably 0.3 to 0.8 μm. In this embodiment, as an example, the pole portion layer 14A is 0.5 μm in thickness. In addition, the length from the medium facing surface ABS to the rear end surface of the pole portion layer 14A is 2 μm or greater. In this embodiment, as an example, the length is 10 μm.

As shown in FIG. 3, the pole portion layer 14A includes a first portion $14A_1$ located next to the medium facing surface ABS and a second portion $14A_2$ located farther from the medium facing surface ABS than the first portion $14A_1$. The first portion $14A_1$ is the magnetic pole portion of the second magnetic layer 14. The magnetic pole portion of the first magnetic layer 8 includes a portion of the first magnetic layer 8 that is opposed to the first portion $14A_1$ via the gap layer 9.

The first portion $14A_1$ has a width equal to the track width. That is, the width of the first portion $14A_1$ in the medium facing surface ABS defines the track width. The second portion $14A_2$ has a width equal to that of the first portion $14A_1$ at the interface with the first portion $14A_1$. The width of the second portion $14A_2$ gradually increases from this interface with an increase in distance from the medium facing surface ABS, and finally becomes constant. A portion of the yoke portion layer 14B located near the medium facing surface ABS is laid over the second portion $14A_2$ of the pole portion layer 14A via the non-magnetic layer 15.

The width of the first portion $14A_1$ in the medium facing surface ABS, that is, the track width, is preferably 0.5 μm or less, and more preferably 0.3 μm or less. The portion of the second portion $14A_2$ overlapping the yoke portion layer 14B has a width greater than that of the first portion $14A_1$ in the medium facing surface ABS, and the width is 2 μm or more, for example.

For example, the yoke portion layer 14B has a thickness of 1 to 2 μm. The yoke portion layer 14B is magnetically connected to the rear end surface of the pole portion layer 14A as shown in FIG. 1, while being magnetically connected to both side surfaces of the pole portion layer 14A in the width direction, as shown in FIG. 3. For example, an end of the yoke portion layer 14B, the end closer to the medium facing surface ABS, is located apart from the medium facing surface ABS by 1.5 μm or more.

The pole portion layer 14A has a saturated magnetic flux density equal to or greater than that of the yoke portion layer 14B. As the magnetic material to form the pole portion layer 14A, it is preferable to use a high saturated magnetic flux density material having a saturated magnetic flux density of 1.4 T or more. For example, as the high saturated magnetic flux density material, available are a material containing iron and nitrogen atoms, a material containing iron, zirconia and oxygen atoms, and a material containing iron and nickel elements. More specifically, for example, as the high saturated magnetic flux density material, it is possible to use at least one of NiFe (Ni: 45 wt %, Fe: 55 wt %), FeN and its compounds, Co-based amorphous alloys, Fe—Co, Fe—M (including oxygen atoms as required), and Fe—Co—M (including oxygen atoms as required). In the foregoing, M is at least one element selected from the group consisting of Ni, N, C, B, Si, Al, Ti, Zr, Hf, Mo, Ta, Nb, and Cu (all of which stand for chemical elements).

As the magnetic material to form the yoke portion layer 14B, it is possible to use a material containing iron and nickel elements and having a saturated magnetic flux density of the order of 1.0 T, for example. Such a material has a good resistance to corrosion and a higher resistance than that of the material to form the pole portion layer 14A. Use of such a material will facilitate formation of the yoke portion layer 14B.

To form the yoke portion layer 14B, it is also possible to use a magnetic material that is the same in compositional family as the magnetic material used to form the pole portion layer 14A. In this case, to make the saturated magnetic flux density of the yoke portion layer 14B lower than that of the pole portion layer 14A, it is preferable to use, as the magnetic material for forming the yoke portion layer 14B, a material having a lower compositional ratio of iron atoms than that of the magnetic material used to form the pole portion layer 14A.

The non-magnetic layer 15 is identical to the pole portion layer 14A in planar shape. In addition, the non-magnetic layer 15 is exposed in the medium facing surface ABS. The non-magnetic layer 15 is preferably 0.5 μm or less in thickness. In this embodiment, as an example, the non-magnetic layer 15 is 0.3 μm in thickness. It is also possible to omit the non-magnetic layer 15.

The non-magnetic layer 15 may be formed of, for example, a material containing titanium or tantalum (including their alloys and oxides) or an inorganic, non-conductive and non-magnetic material such as alumina or silicon dioxide ($SiO_2$). If dry etching is used to form the pole portion layer 14A, it is preferable that the non-magnetic layer 15 is formed of a material having a lower etching rate for the dry etching than those of the materials that form the pole portion layer 14A and the insulating layer 9C, of the gap layer 9, which is disposed in contact with the pole portion layer 14A. For example, available for this purpose are materials containing titanium or tantalum (including their alloys and oxides).

The surface of the pole portion layer 14A exposed in the medium facing surface ABS has a shape as shown in FIGS.

4 and 5. It may have a shape of a rectangle, or a shape of a trapezoid or a triangle in which the lower side located on the trailing side in the traveling direction T of the recording medium (or on the air-inflow-end side of the slider) is shorter than the upper side. In addition, the side surfaces of the pole portion layer 14A may be concave. It is also preferable that the side of the surface of the pole portion layer 14A exposed in the medium facing surface ABS forms an angle of 80 to 88 degrees relative to the surface of the substrate 1.

As described above, the thin-film magnetic head according to this embodiment comprises the medium facing surface ABS that faces toward the recording medium, a read head, and a write head. The read head comprises the MR element 5 functioning as a read element, and the bottom shield layer 3 and the top shield layer 6 for shielding the MR element 5. The bottom and top shield layers 3 and 6 have portions that are located on a side of the medium facing surface ABS and opposed to each other with the MR element 5 interposed therebetween.

The write head comprises: the first magnetic layer 8 and the second magnetic layer 14 that include magnetic pole portions disposed on a side of the medium facing surface ABS so as to oppose to each other with a predetermined spacing interposed therebetween along the traveling direction T of the recording medium; the gap layer 9 made of a non-magnetic material and provided between the first magnetic layer 8 and the second magnetic layer 14; the coupling portion 12 for magnetically coupling the first magnetic layer 8 and the second magnetic layer 14 to each other at a distance from the medium facing surface ABS; and the thin-film coil 10 at least a part of which is disposed between the first and second magnetic layers 8 and 14 and insulated from the first and second magnetic layers 8 and 14.

In this embodiment, part of the thin-film coil 10 is disposed between the magnetic layers 8 and 14, and a surface of the part of the coil, the surface being located closer to the second magnetic layer 14 (the surface on the upper side of FIG. 1), is located closer to the first magnetic layer 8 (on the lower side of FIG. 1) than the end of the gap layer 9 (the end on the upper side of FIG. 1) located in the medium facing surface ABS next to the second magnetic layer 14.

In addition, the second magnetic layer 14 has the pole portion layer 14A including the magnetic pole portion, and the yoke portion layer 14B that serves as a yoke. The width of the pole portion layer 14A measured in the medium facing surface ABS defines the track width. The pole portion layer 14A has a saturated magnetic flux density equal to or greater than that of the yoke portion layer 14B. The yoke portion layer 14B magnetically connects the upper end of the coupling portion 12 and the rear end surface of the pole portion layer 14A to each other.

The thin-film magnetic head according to the present embodiment is suitable for the vertical magnetic recording scheme. When this thin-film magnetic head is used for the vertical magnetic recording scheme, the first portion $14A_1$ of the pole portion layer 14A of the second magnetic layer 14 serves as a main magnetic pole, while the magnetic pole portion of the first magnetic layer 8 serves as an auxiliary magnetic pole. When the thin-film magnetic head of this embodiment is used for the vertical magnetic recording scheme, it is possible to use either a two-layered medium or a single-layered medium as the recording medium.

In the thin-film magnetic head of this embodiment, the second magnetic layer 14 has the pole portion layer 14A and the yoke portion layer 14B. This makes it possible to form the pole portion layer 14A in a fine pattern, thereby allowing the track width to be reduced. Furthermore, the yoke portion layer 14B has a volume sufficient to introduce magnetic flux into the pole portion layer 14A, and the pole portion layer 14A has a saturated magnetic flux density equal to or greater than that of the yoke portion layer 14B. This prevents the magnetic flux from being saturated halfway through the second magnetic layer 14. With these features, the thin-film magnetic head according to this embodiment allows the magnetic pole portion to produce an increased magnetic field perpendicular to the surface of the recording medium and improves the recording density thereof.

Furthermore, in this embodiment, part of the thin-film coil 10 is disposed between the magnetic layers 8 and 14, and the surface of the part of the coil closer to the second magnetic layer 14 is located closer to the first magnetic layer 8 than the end of the gap layer 9 located in the medium facing surface ABS next to the second magnetic layer 14, and also than the upper end of the coupling portion 12. In addition, the yoke portion layer 14B magnetically connects the upper end of the coupling portion 12 and the rear end surface of the pole portion layer 14A to each other. Accordingly, the yoke portion layer 14B can form a strong magnetic coupling between the coupling portion 12 and the pole portion layer 14A in a short magnetic path.

With these features as described in the foregoing, this embodiment allows the magnetic pole portion of the second magnetic layer 14 to produce an increased magnetic field in a direction perpendicular to the surface of the recording medium and reduces the magnetic path length, thereby improving the high-frequency characteristics. In particular, when the pole portion layer 14A is formed of a high saturated magnetic flux density material, it is possible to especially increase the magnetic field in a direction perpendicular to the surface of the recording medium, and it is thereby possible to write data on a recording medium having an enhanced coercivity.

Furthermore, in the thin-film magnetic head of this embodiment, the magnetic field produced in a direction perpendicular to the surface of the recording medium is greater than a magnetic field in the longitudinal direction. Therefore, the magnetic energy produced by the head can be transferred to the recording medium efficiently. Accordingly, this thin-film magnetic head can be made impervious to heat fluctuations of the recording medium, and can thereby increase the linear recording density.

In the thin-film magnetic head of this embodiment, as shown in FIG. 1, it is preferable to dispose the first magnetic layer 8 on the trailing side in the traveling direction T of the recording medium (or on the air-inflow-end side of the slider including the thin-film magnetic head), and to dispose the second magnetic layer 14 on the leading side in the traveling direction T of the recording medium (or on the air-outflow-end side of the slider including the thin-film magnetic head). For the vertical magnetic recording scheme, this arrangement allows the magnetization reversal transition width to be reduced in the recording medium, as compared with a reverse of this arrangement. This makes it possible to form a magnetization pattern of a higher density on the recording medium, resulting in a higher linear recording density.

Furthermore, as shown in FIG. 1, in the thin-film magnetic head of this embodiment the yoke portion layer 14B of the second magnetic layer 14 is shaped so as to form the magnetic path 20 inside thereof, which connects the upper end of the coupling portion 12 and the rear end surface of the pole portion layer 14A in the shortest distance. This can especially reduce the magnetic path length and can thereby improve high-frequency characteristics.

Furthermore, as shown in FIG. 1, in the thin-film magnetic head of this embodiment the distance between the pole portion layer 14A and the first magnetic layer 8 in the medium facing surface ABS is equal to or greater than the thickness of the coupling portion 12. In addition, the yoke portion layer 14B gradually approaches the first magnetic layer 8 from the portion connected to the rear end surface of the pole portion layer 14A to the portion connected to the coupling portion 12. It is thereby possible to especially reduce the magnetic path length and to thereby improve high-frequency characteristics.

Furthermore, as shown in FIG. 1, in the thin-film magnetic head of this embodiment, at least part of the yoke portion layer 14B is formed in the shape of an arc that protrudes towards the first magnetic layer 8. This causes part of the yoke portion layer 14B to stay closer to the thin-film coil 10, thereby allowing the magnetic field generated by the thin-film coil 10 to be absorbed efficiently by the yoke portion layer 14B.

Furthermore, as shown in FIG. 3, in the thin-film magnetic head of this embodiment the yoke portion layer 14B is magnetically connected to the rear end surface and both side surfaces of the pole portion layer 14A. It is thereby possible to obtain a greater area of a connecting portion where the yoke portion layer 14B and the pole portion layer 14A are connected to each other, even if the pole portion layer 14A is small in volume. This prevents the magnetic flux from being saturated at this connecting portion. Consequently, it is possible to efficiently introduce the magnetic flux from the yoke portion layer 14B into the pole portion layer 14A, and to thereby increase the intensity of magnetic field applied to the recording medium.

Furthermore, as shown in FIG. 1, in the thin-film magnetic head of this embodiment the end of the yoke portion layer 14B closer to the medium facing surface ABS is located at a distance from the medium facing surface ABS. This makes it possible to prevent the magnetic field, produced from the end of the yoke portion layer 14B closer to the medium facing surface ABS, from causing writing of information onto the recording medium.

Furthermore, as shown in FIG. 3, in the thin-film magnetic head of this embodiment, the portion of the pole portion layer 14A that is in contact with the yoke portion layer 14B has a width greater than the width of the pole portion layer 14A measured in the medium facing surface ABS. This allows the portion of the pole portion layer 14A that is in contact with the yoke portion layer 14B to be large in area, and thereby makes it possible to prevent a saturation of magnetic flux at this portion. Consequently, it is possible to efficiently introduce the magnetic flux from the yoke portion layer 14B into the pole portion layer 14A. Furthermore, the portion of the pole portion layer 14A exposed in the medium facing surface ABS can be made smaller in area, to make it possible to increase the intensity of magnetic field applied to the recording medium.

In the thin-film magnetic head of this embodiment, the length from the medium facing surface ABS to the rear end surface of the pole portion layer 14A is 2 μm or more. This allows to attain a large area of the portion of the pole portion layer 14A that is in contact with the yoke portion layer 14B, without increasing the thickness or width of the pole portion layer 14A. Saturation of magnetic flux at this portion is thereby prevented. Consequently, it is possible to introduce the magnetic flux efficiently from the yoke portion layer 14B into the pole portion layer 14A.

Furthermore, as shown in FIG. 1, the thin-film magnetic head of this embodiment has the non-magnetic layer 15 that is in contact with the surface of the pole portion layer 14A farther from the gap layer 9. Without the non-magnetic layer 15, the surface of the pole portion layer 14A farther from the gap layer 9 would be damaged when forming the pole portion layer 14A by dry etching or when forming the yoke portion layer 14B by electroplating, which would result in surface irregularities of the order of, for example, 0.1 to 0.3 μm on this surface. Since this embodiment is provided with the non-magnetic layer 15, it is possible to prevent the surface of the pole portion layer 14A farther from the gap layer 9 from being damaged when forming the pole portion layer 14A by dry etching or when forming the yoke portion layer 14B by electroplating, and thereby possible to make the surface flat. Particularly, since the non-magnetic layer 15 is exposed in the medium facing surface ABS, the end of the pole portion layer 14A farther from the gap layer 9 can be kept flat in the medium facing surface ABS. This allows the magnetic field generated from the pole portion layer 14A in the medium facing surface ABS to be made uniform in the direction intersecting the track. Consequently, it is possible to prevent the bit pattern of the recording medium from being distorted in shape, and to thereby improve the linear recording density.

Furthermore, in this embodiment, part of the yoke portion layer 14B located near the medium facing surface ABS is adjacent to the surface of the pole portion layer 14A farther from the gap layer 9 via the non-magnetic layer 15, and magnetically connected to the pole portion layer 14A via the non-magnetic layer 15. Consequently, it is possible to introduce a magnetic flux from the yoke portion layer 14B to the medium-facing-surface-ABS side of the pole portion layer 14A via the non-magnetic layer 15, through the surface of the pole portion layer 14A farther from the gap layer 9, too.

If the non-magnetic layer 15 is formed of a material having a less etching rate than those of the materials forming the pole portion layer 14A and a portion of the gap layer 9 that is in contact with the pole portion layer 14A, it is possible to prevent the surface of the pole portion layer 14A farther from the gap layer 9 from being damaged when forming the pole portion layer 14A by dry etching.

In the thin-film magnetic head of this embodiment, as shown in FIG. 1, part of the thin-film coil 10 is disposed between the first and second magnetic layers 8 and 14, and the part of the coil is located closer to the first magnetic layer 8 than the midpoint between the first and second magnetic layers 8 and 14. This arrangement allows the first magnetic layer 8 that is larger in volume than the second magnetic layer 14 to efficiently absorb the magnetic field produced by the thin-film coil 10. It is thereby possible to increase the absorptivity of magnetic field in the first and second magnetic layers 8 and 14 as compared with the case where the thin-film coil 10 is located closer to the second magnetic layer 14.

As shown in FIG. 1, in the thin-film magnetic head of this embodiment the gap layer 9 comprises: a first portion (the insulating layer 9B) that is made of a material exhibiting fluidity during its formation and is filled at least in between the windings of the thin-film coil 10; and a second portion (the insulating layers 9A, 9C) made of a material having a better resistance to corrosion, rigidity, and insulation property than those of the first portion. The second portion covers the thin-film coil 10 and the first portion, and touches the first magnetic layer 8, the second magnetic layer 14 and the coupling portion 12. The second portion of the gap layer 9 is exposed in the medium facing surface ABS. Although it is difficult to completely fill in the spaces between the windings of the thin-film coil 10 with a non-magnetic material by sputtering, it is made easy by using a non-magnetic material having fluidity like organic materials. Nevertheless, organic materials lack reliability in resistance to dry etching, resistance to corrosion, resistance to heat, rigidity and the like. In this embodiment, as described above, the first portion (the insulating layer 9B) is formed of a material that exhibits fluidity during its formation and is filled in between the windings of the thin-film coil 10. In addition, the second portion (the insulating layers 9A, 9C) is formed of a material having a better resistance to corrosion, rigidity, and insulation property than those of the first portion, to cover the thin-film coil 10 and the first portion and to touch the first magnetic layer 8, the second magnetic layer 14 and the coupling portion 12. Accordingly, it is possible to completely fill the spaces between the windings of the thin-film coil 10 with the non-magnetic material and to thereby increase the reliability of the gap layer 9.

The thin-film magnetic head of this embodiment further comprises the MR element 5 serving as a read element. It is thereby possible to improve the read performance as compared with the case where reading is performed by using an induction-type electromagnetic transducer. Since the MR element 5 is shielded with the shield layers 3 and 6, the resolution of read operations is improved.

Figure 6:
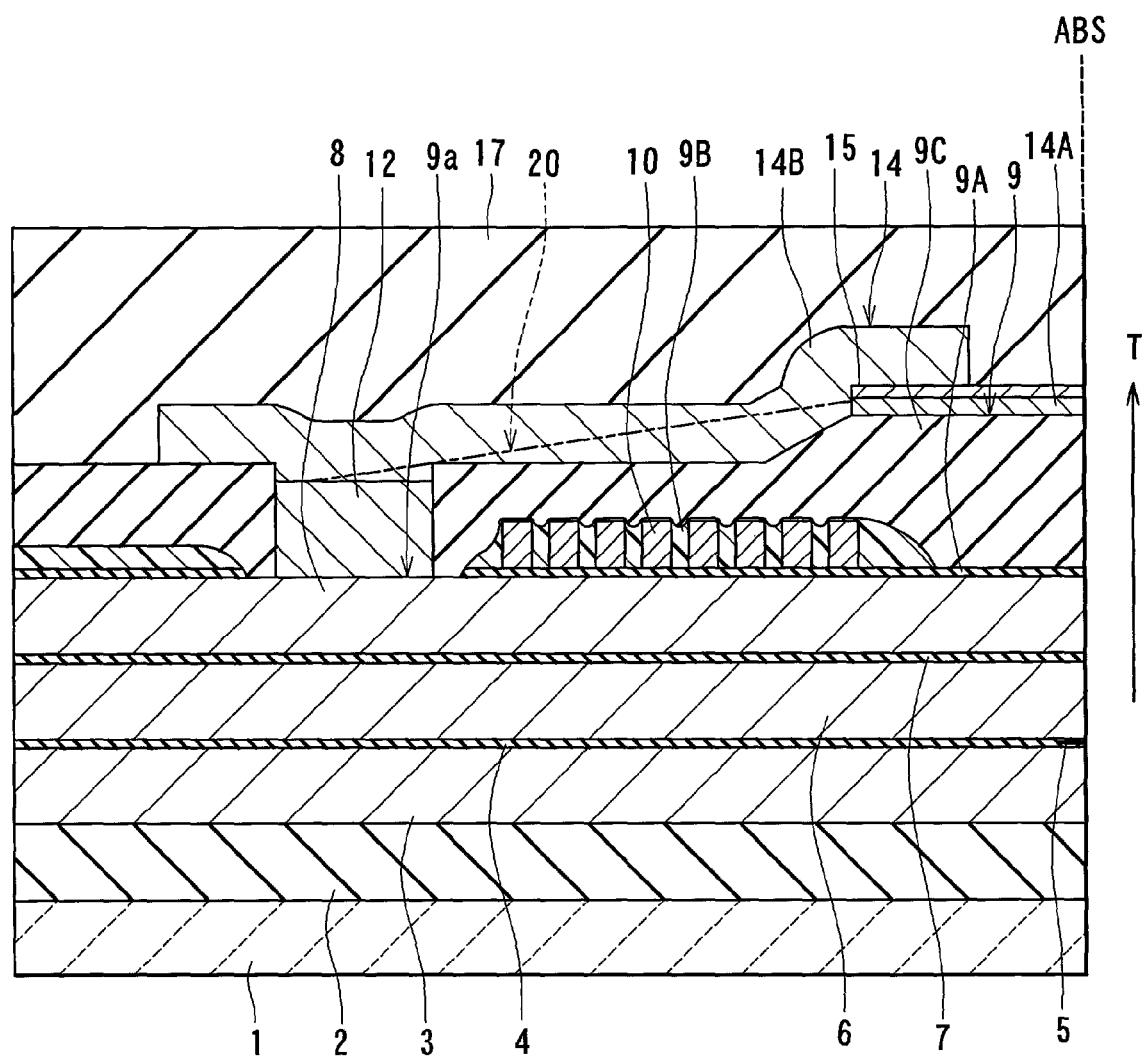
FIG. 6 is a cross-sectional view illustrating the structure of a thin-film magnetic head according to a first modified example of the first embodiment of the invention.
Figure 7:
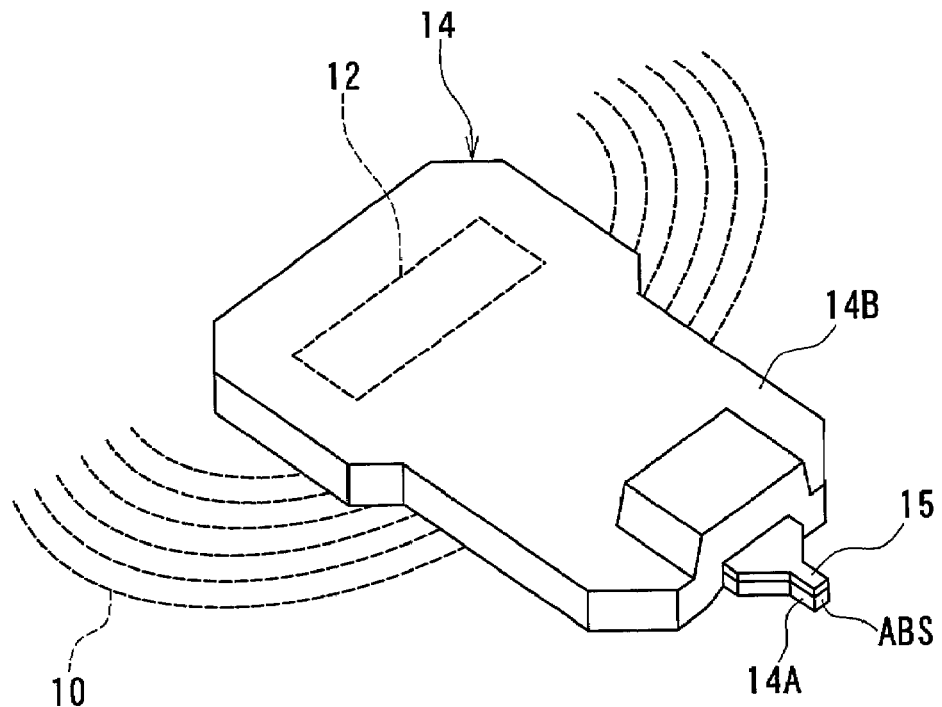
FIG. 7 is a perspective view illustrating the main part of the thin-film magnetic head shown in FIG. 6.
Figure 8:
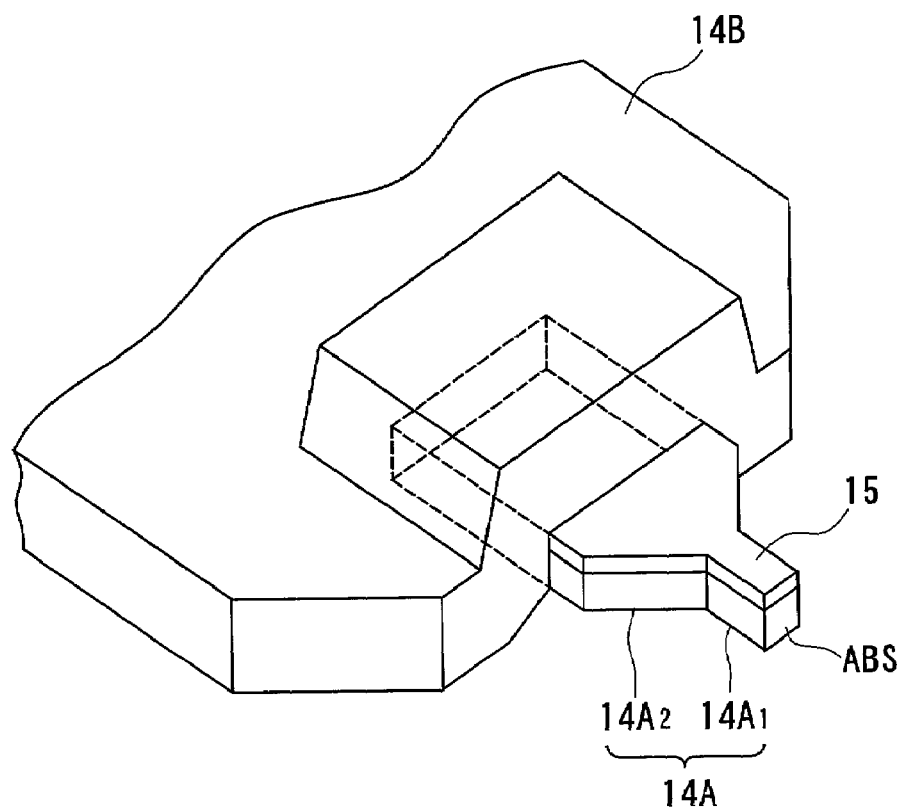
FIG. 8 is an enlarged perspective view illustrating the vicinity of the magnetic pole portion shown in FIG. 7.

Now, referring to FIGS. 6 to 8, a first modified example of the thin-film magnetic head according to this embodiment is explained below. FIG. 6 is a cross-sectional view illustrating the structure of a thin-film magnetic head of the first modified example. FIG. 6 illustrates a cross section orthogonal to the medium facing surface and the surface of the substrate. FIG. 7 is a perspective view illustrating the main part of the thin-film magnetic head shown in FIG. 6. FIG. 8 is an enlarged perspective view illustrating the vicinity of the magnetic pole portion shown in FIG. 7.

In the thin-film magnetic head of the first modified example, the length from the medium facing surface ABS to the rear end surface of the pole portion layer 14A is shorter than that of the thin-film magnetic head shown in FIG. 1. In this modified example, the length is 5 μm as an example. The planar shape of the non-magnetic layer 15 is the same as that of the pole portion layer 14A. The remainder of the structure of the thin-film magnetic head of the first modified example is the same as that of the thin-film magnetic head shown in FIG. 1.

Figure 9:
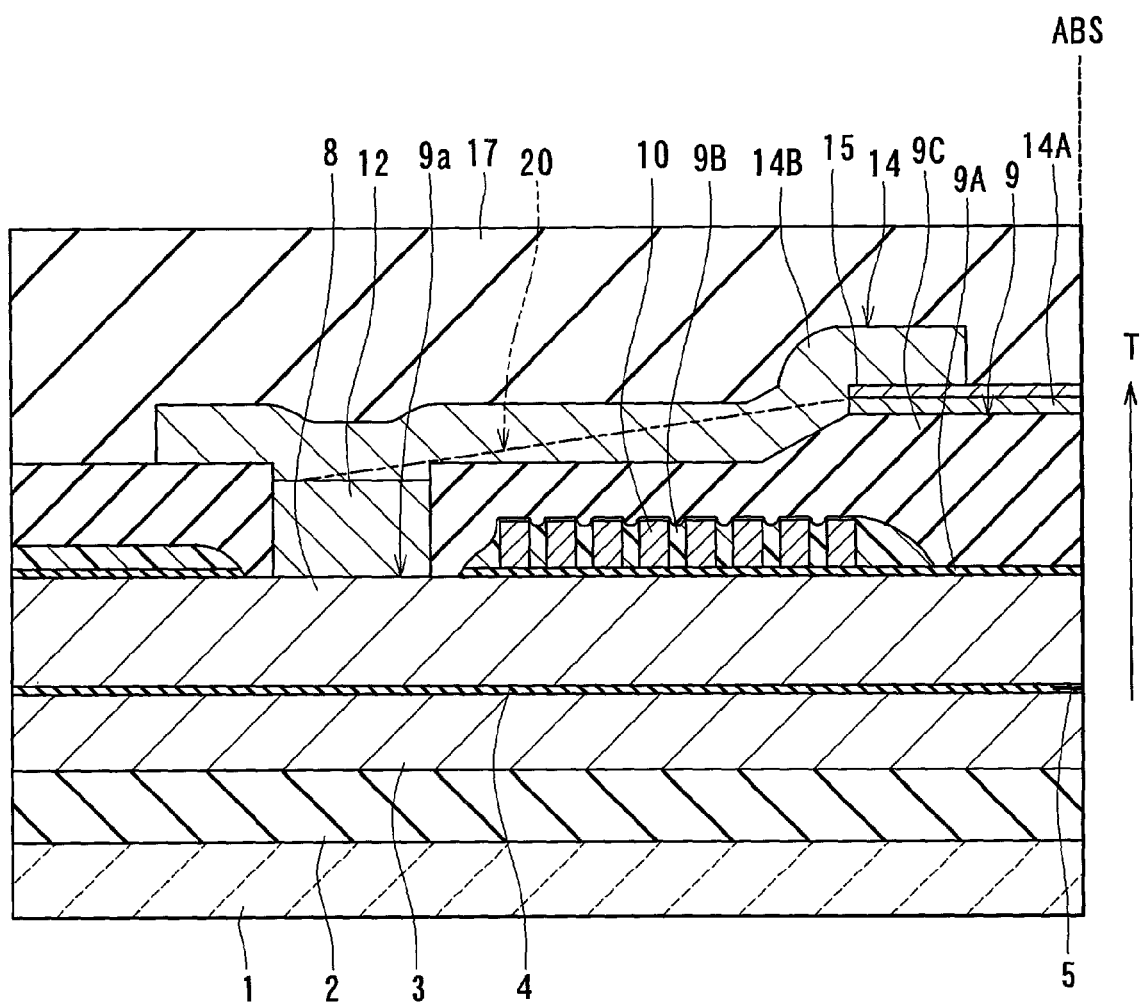
FIG. 9 is a cross-sectional view illustrating the structure of a thin-film magnetic head according to a second modified example of the first embodiment of the invention.

Now, referring to FIG. 9, a second modified example of the thin-film magnetic head according to this embodiment is explained below. FIG. 9 is a cross-sectional view illustrating the structure of a thin-film magnetic head of the second modified example. FIG. 9 illustrates a cross section orthogonal to the medium facing surface and the surface of the substrate.

In the thin-film magnetic head of the second modified example, the top shield layer 6 and the non-magnetic layer 7 of the thin-film magnetic head of the first modified example are eliminated and the first magnetic layer 8 is allowed to function as the top shield layer 6, too. It simplifies the structure of the thin-film magnetic head and facilitates manufacture of the head. The remainder of the structure of the thin-film magnetic head of the second modified example is the same as that of the thin-film magnetic head of the first modified example.

Now, referring to FIGS. 10 to 25, a method of manufacturing the thin-film magnetic head according to this embodiment is explained below. Here, the method is explained with reference to the thin-film magnetic head shown in FIG. 6 as an example. However, the same method may be used to manufacture the thin-film magnetic head shown in FIG. 1. The following description is also applicable to the manufacture of the thin-film magnetic head shown in FIG. 9 except that the steps of forming the top shield layer 6 and the non-magnetic layer 7 are eliminated.

According to the method of manufacturing the thin-film magnetic head of this embodiment, the insulating layer 2 is first formed on the substrate 1. Then, the bottom shield layer 3 is formed on the insulating layer 2. In FIGS. 10 to 25, the substrate 1 and the insulating layer 2 are not shown.

Figure 10:
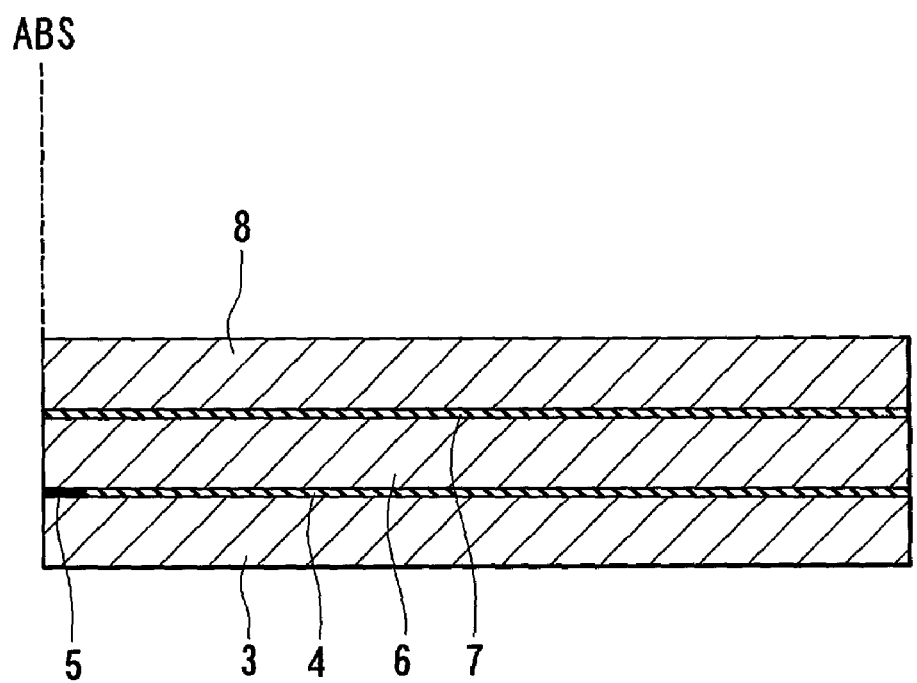
FIG. 10 is a cross-sectional view illustrating a step of a method of manufacturing the thin-film magnetic head according to the first embodiment of the invention.

Then, as shown in FIG. 10, an insulating film to be a part of the insulating layer 4 is formed on the bottom shield layer 3. On this insulating film, formed are the MR element 5 and leads (not shown) to be connected to the MR element 5. Then, the MR element 5 and the leads are covered with another insulating film that makes the other part of the insulating layer 4, and the MR element 5 and the leads are embedded in the insulating layer 4.

Then, the top shield layer 6 is formed on the insulating layer 4, and the non-magnetic layer 7 is formed on the top shield layer 6. Then, on the non-magnetic layer 7, the first magnetic layer 8 is formed into a predetermined shape. Then, although not shown, the non-magnetic layer 7 and the first magnetic layer 8 are covered with a non-magnetic material such as alumina. The non-magnetic material is then polished to expose the first magnetic layer 8, and the top surface of the first magnetic layer 8 is flattened.

Figure 11:
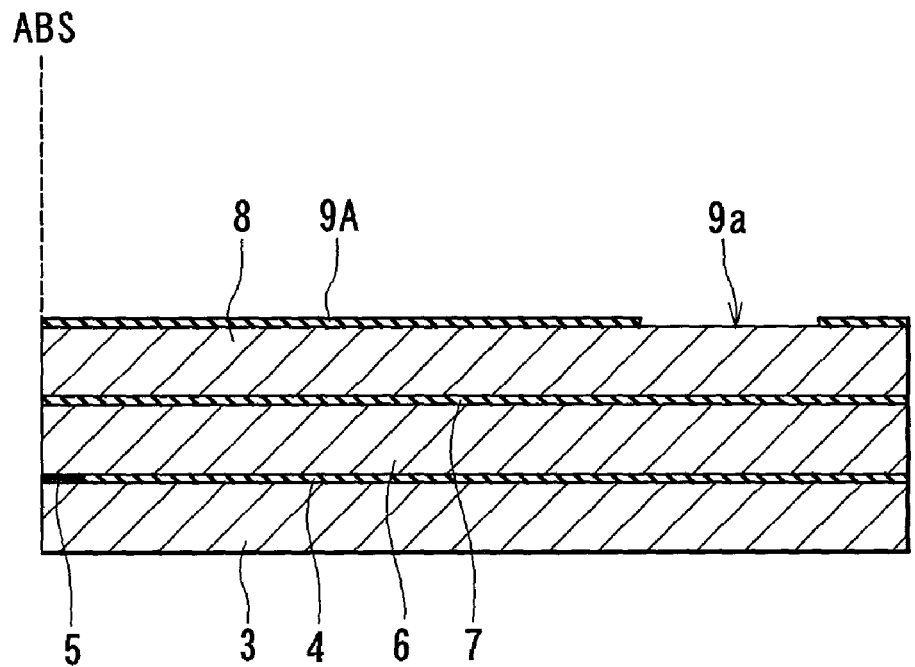
FIG. 11 is a cross-sectional view illustrating a step that follows FIG. 10.

Then, as shown in FIG. 11, a non-conductive and non-magnetic material such as alumina is sputtered onto the first magnetic layer 8 to form the insulating layer 9A. Subsequently, through the use of a known photolithography technique and dry etching, the contact hole 9a is formed in the insulating layer 9A where the coupling portion 12 is to be formed.

Figure 12:
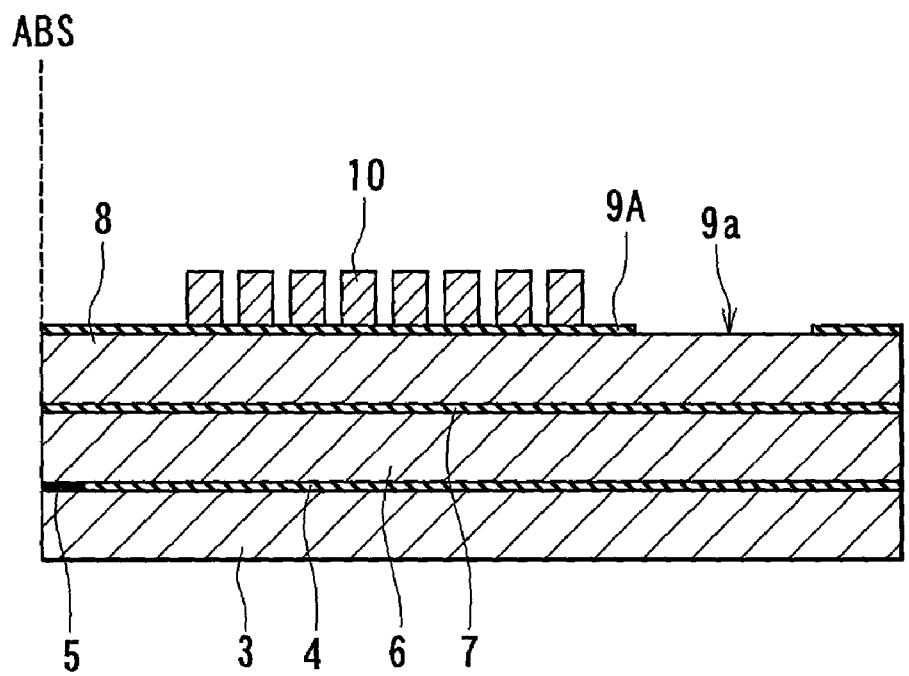
FIG. 12 is a cross-sectional view illustrating a step that follows FIG. 11.

Then, as shown in FIG. 12, the thin-film coil 10 is formed on the insulating layer 9A with a known photolithography technique and a known deposition technique (e.g., electroplating).

Figure 13:
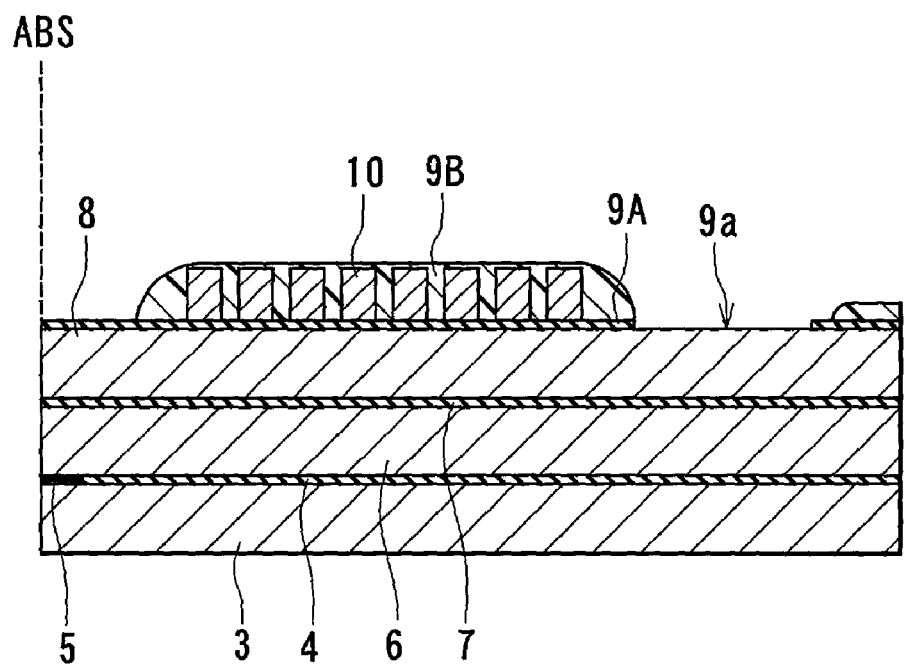
FIG. 13 is a cross-sectional view illustrating a step that follows FIG. 12.

Then, as shown in FIG. 13, the insulating layer 9B is formed with a known photolithography technique to fill at least spaces between the windings of the thin-film coil 10.

Figure 14:
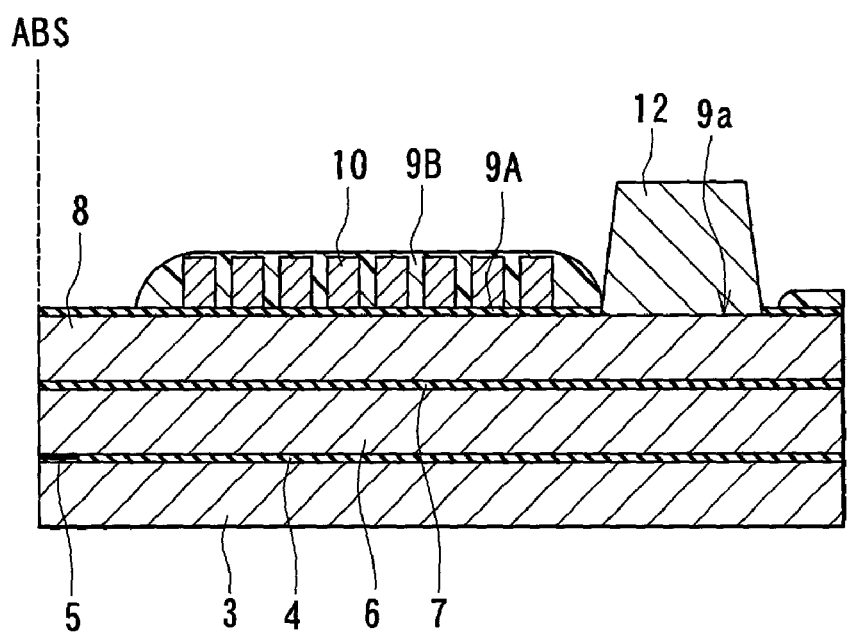
FIG. 14 is a cross-sectional view illustrating a step that follows FIG. 13.

Then, as shown in FIG. 14, with a known photolithography technique and a known deposition technique (e.g., electroplating), the coupling portion 12 is formed on the first magnetic layer 8 where the contact hole 9a is formed. For example, the coupling portion 12 has a thickness of 2 to 4 μm.

Figure 15:
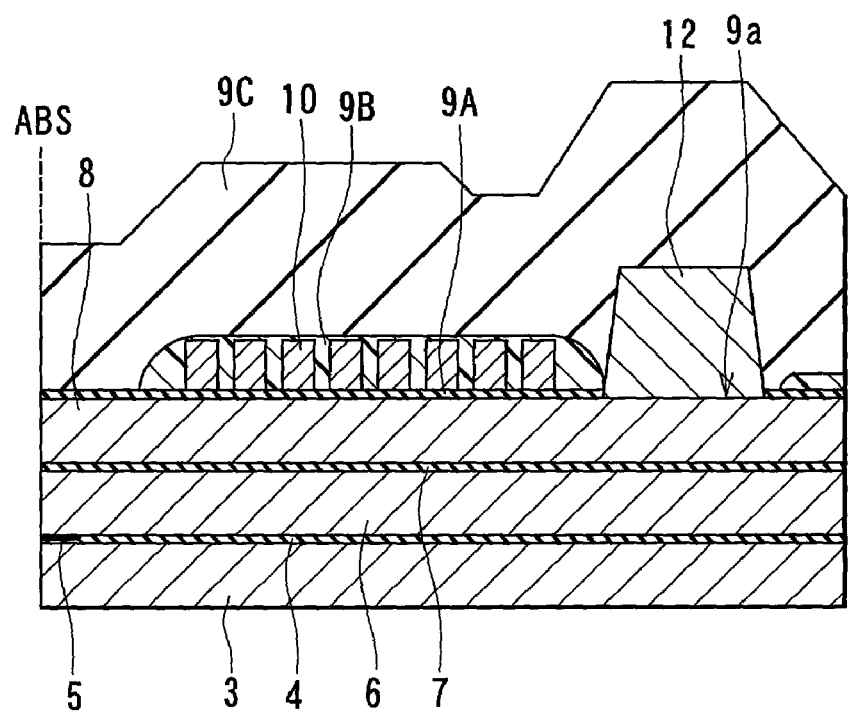
FIG. 15 is a cross-sectional view illustrating a step that follows FIG. 14.

Then, as shown in FIG. 15, the insulating layer 9C is formed by sputtering, so as to cover the thin-film coil 10, the insulating layer 9A, the insulating layer 9B and the coupling portion 12. At this stage, the insulating layer 9C has a thickness equal to or greater than that of the coupling portion 12, that is, for example, 2 to 6 μm.

Figure 16:
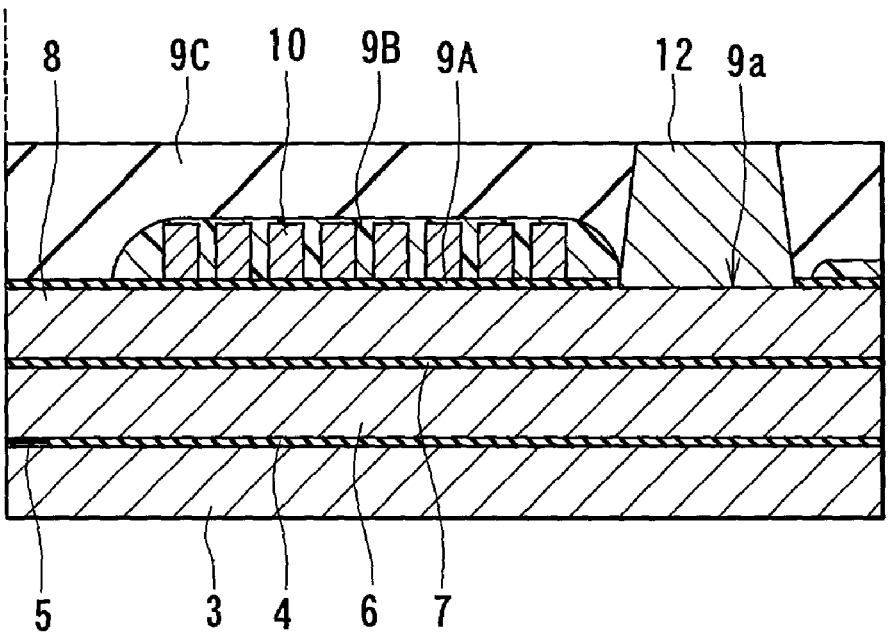
FIG. 16 is a cross-sectional view illustrating a step that follows FIG. 15.

Then, as shown in FIG. 16, the surface of the insulating layer 9C is polished by chemical mechanical polishing, for example, to expose the coupling portion 12, then the top surfaces of the insulating layer 9C and the coupling portion 12 are flattened. At this stage, the distance from the top surface of the first magnetic layer 8 to the top surface of the insulating layer 9C and the coupling portion 12 is 2 to 4 μm, for example. The coupling portion 12 is not necessarily required to be exposed at this stage, but may be exposed in a later step.

Figure 17:
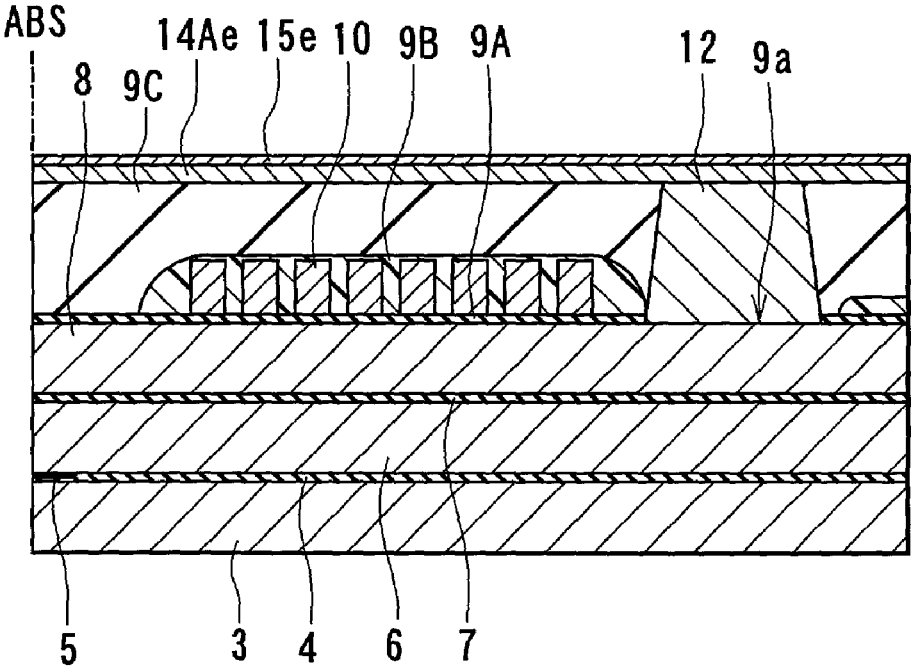
FIG. 17 is a cross-sectional view illustrating a step that follows FIG. 16.

Then, as shown in FIG. 17, on the insulating layer 9C and the coupling portion 12, a layer 14Ae to be etched is formed of a material for forming the pole portion layer 14A of the second magnetic layer 14. The layer 14Ae preferably has a thickness of 0.1 to 0.8 μm, and more preferably a thickness of 0.3 to 0.8 μm. The layer 14Ae may be formed by electroplating or sputtering. If the layer 14Ae has a high surface roughness (e.g., its arithmetic mean roughness Ra is equal to or greater than 12 angstroms), it is preferable to polish the surface of the layer 14Ae through chemical mechanical polishing or the like, so as to flatten the surface.

Then, a non-magnetic layer 15e is formed on the layer 14Ae. The non-magnetic layer 15e is preferably equal to or less than 0.5 μm in thickness.

Then, although not shown, an electrode layer for electroplating is formed by sputtering on the non-magnetic layer 15e. The electrode layer is equal to or less than 0.1 μm in thickness and made of an iron-nickel alloy, for example.

Figure 18:
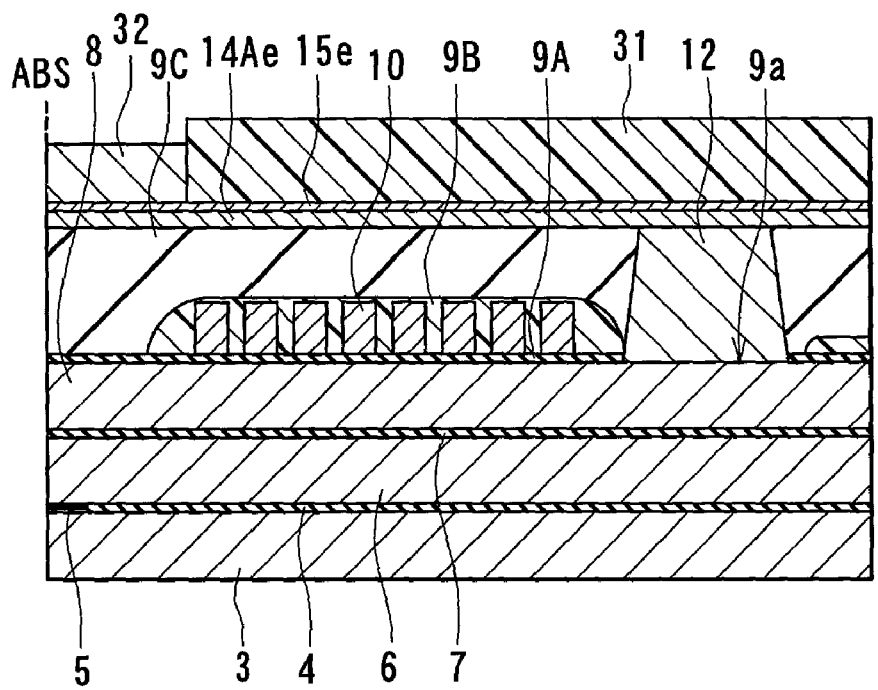
FIG. 18 is a cross-sectional view illustrating a step that follows FIG. 17.

Then, as shown in FIG. 18, a resist frame 31, which has a gap portion corresponding to the shape of the pole portion layer 14A, is formed of a photoresist on the aforementioned electrode layer by photolithography. Using the resist frame 31, a plating film that serves as a mask 32 corresponding to the shape of the pole portion layer 14A is formed on the aforementioned electrode layer by electroplating (frame plating). This plating film is 1 to 4 μm in thickness and made of an iron-nickel alloy, for example. The resist frame 31 is then removed.

Figure 19:
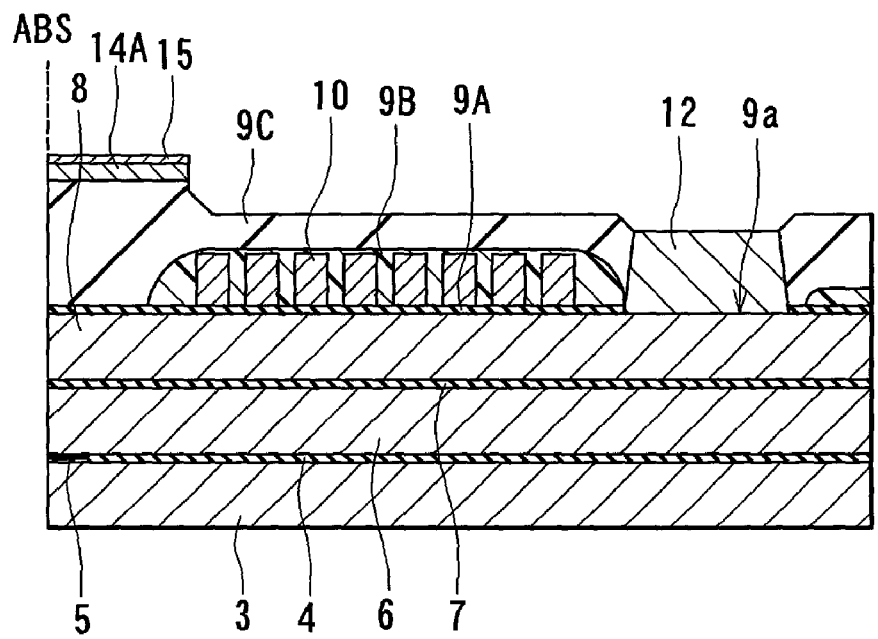
FIG. 19 is a cross-sectional view illustrating a step that follows FIG. 18.

Next, as shown in FIG. 19, using the mask 32, the non-magnetic layer 15e and the layer 14Ae are etched by dry etching such as ion milling to define the outer shapes of the non-magnetic layer 15 and the pole portion layer 14A. At this stage, in the mask 32, at least the portion corresponding to the medium facing surface ABS is preferably removed completely, except in the case where the mask 32 is non-magnetic and sufficiently reliable in terms of resistance to corrosion and the like.

Through the aforementioned etching, the surface of the pole portion layer 14A exposed in the medium facing surface ABS is allowed to have a shape as shown in FIGS. 4 and 5. It may have a shape of a rectangle, or a shape of a trapezoid or a triangle in which the lower side located on the trailing side in the traveling direction T of the recording medium (or on the air-inflow-end side of the slider) is shorter than the upper side. The side surfaces of the pole portion layer 14A may be concave. Also, through the aforementioned etching, the width of the pole portion layer 14 in the medium facing surface ABS may be defined so as to agree with the specification of the track width.

Through the aforementioned etching, the outer shapes of the non-magnetic layer 15 and the pole portion layer 14A are defined and the coupling portion 12 is exposed. In order for the coupling portion 12 to be exposed at this stage, the coupling portion 12 should previously have a greater thickness than desired.

Instead of forming the mask 32 of the plating film as described above, a photoresist may be formed into a patterned resist corresponding to the shape of the pole portion layer 14A on the non-magnetic layer 15e through photolithography. Then, this patterned resist may be used as a mask to etch the non-magnetic layer 15e and the layer 14Ae, so as to define the outer shapes of the non-magnetic layer 15 and the pole portion layer 14A and to expose the coupling portion 12. Thereafter, the patterned resist may be removed.

Figure 20:
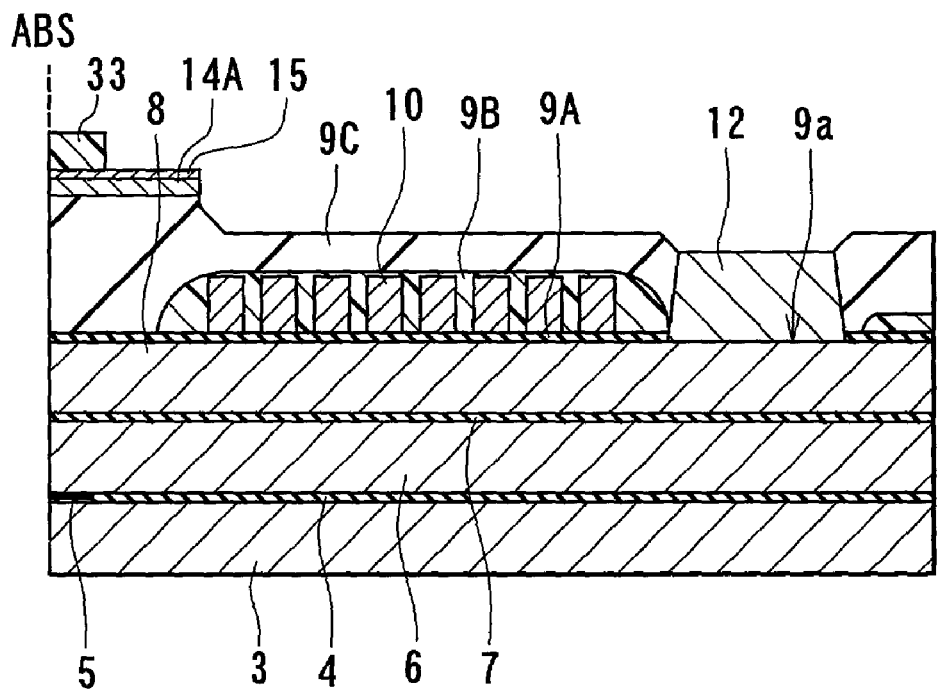
FIG. 20 is a cross-sectional view illustrating a step that follows FIG. 19.

Then, as shown in FIG. 20, a resist cover 33 is formed of a photoresist by photolithography to cover portions of the pole portion layer 14A and non-magnetic layer 15 located near the medium facing surface ABS. The resist cover 33 is preferably formed to have a thickness equal to or less than that of a frame for forming the yoke portion layer to be described later.

Figure 21:
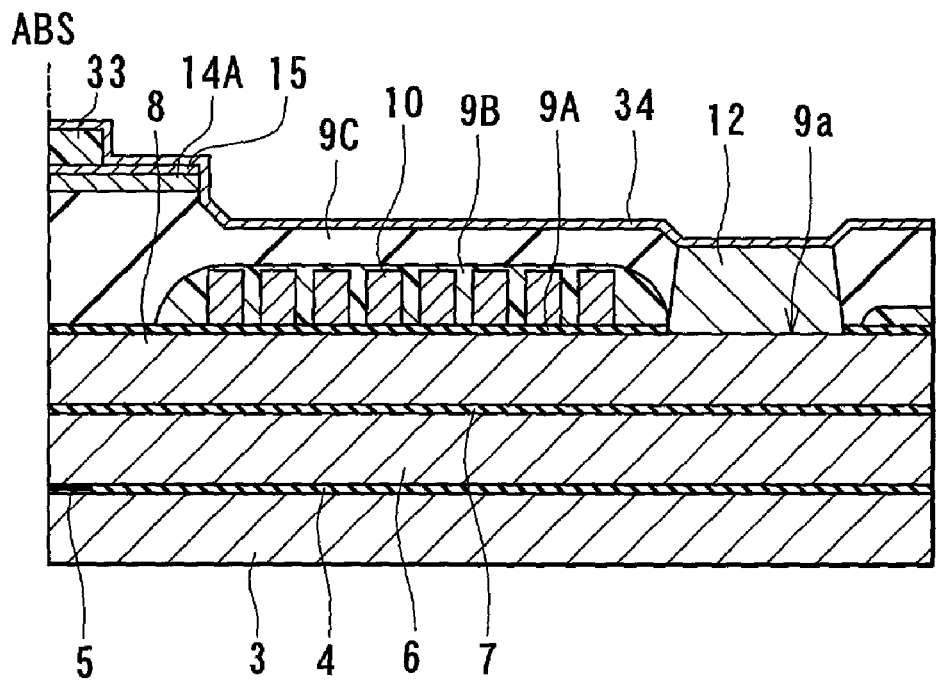
FIG. 21 is a cross-sectional view illustrating a step that follows FIG. 20.

Then, as shown in FIG. 21, an electrode layer 34 for electroplating is formed by sputtering on the resist cover 33, the pole portion layer 14A (and the non-magnetic layer 15), the insulating layer 9C (the gap layer 9), and the coupling portion 12. The electrode layer 34 may have a thickness of 0.1 μm or less, and may be formed of an iron-nickel alloy, with Ti (titanium) deposited to underlie the electrode layer 34.

Figure 22:
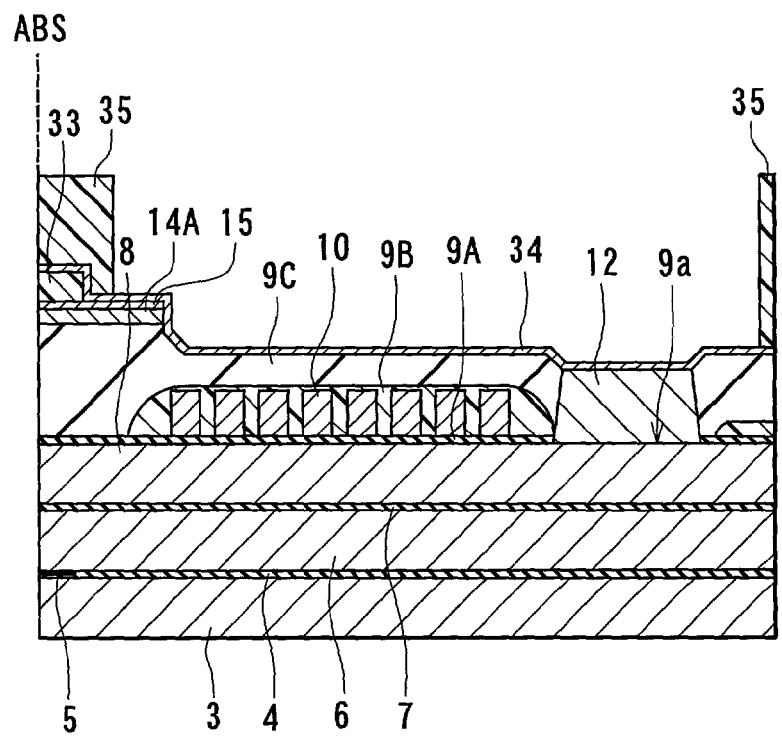
FIG. 22 is a cross-sectional view illustrating a step that follows FIG. 21.

Then, as shown in FIG. 22, a resist frame 35 having a gap portion corresponding to the shape of the yoke portion layer 14B is formed of a photoresist on the electrode layer 34.

Figure 23:
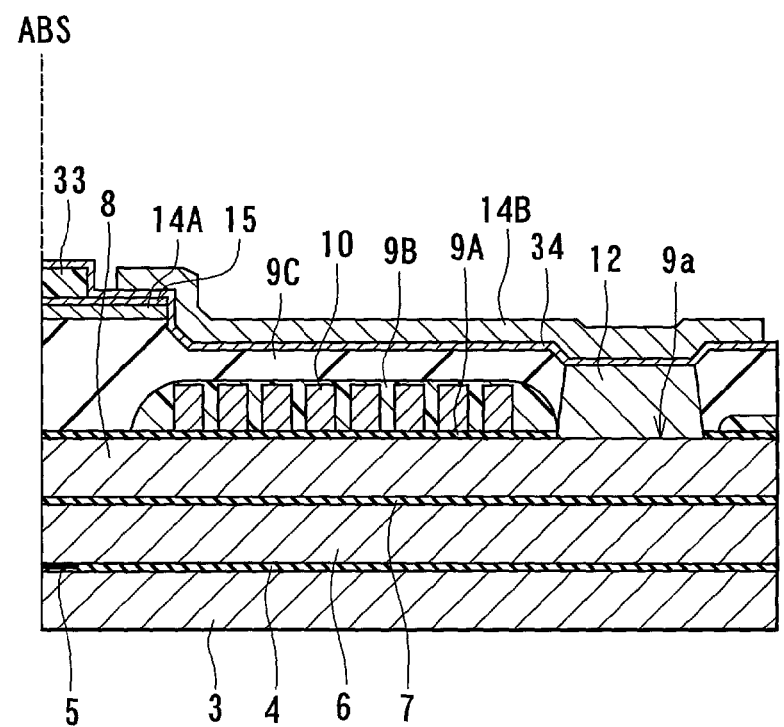
FIG. 23 is a cross-sectional view illustrating a step that follows FIG. 22.

Then, as shown in FIG. 23, using the resist frame 35, the yoke portion layer 14B is formed on the electrode layer 34 by electroplating (frame plating). The resist frame 35 is then removed. Although the yoke portion layer 14B can be formed using the lift-off method, electroplating is most preferably used to allow the shape of the yoke portion layer 14B to follow the shape of the base thereof.

Figure 24:
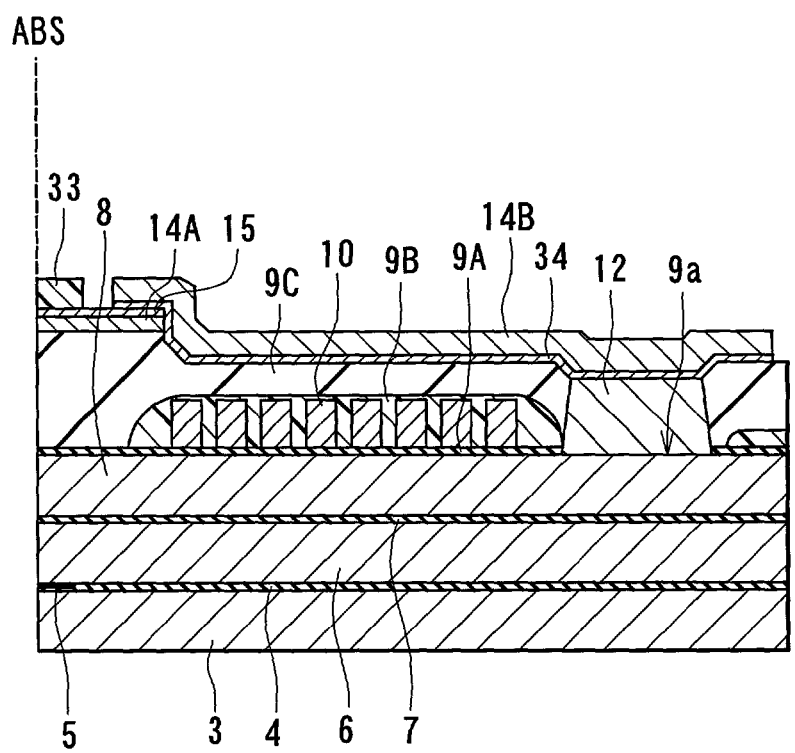
FIG. 24 is a cross-sectional view illustrating a step that follows FIG. 23.

Then, as shown in FIG. 24, the electrode layer 34 except for the portion underlying the yoke portion layer 14B is removed by dry etching.

Figure 25:
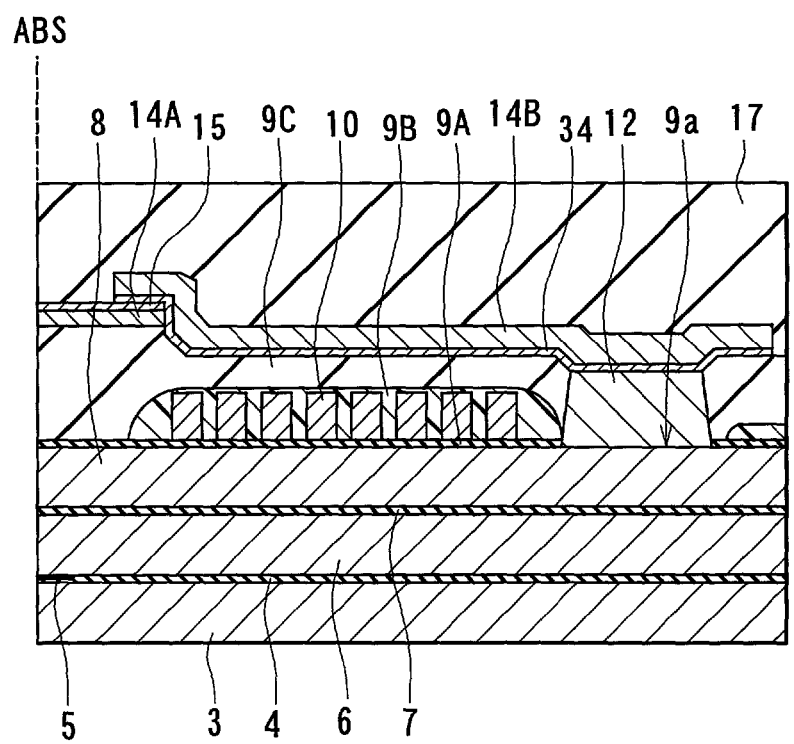
FIG. 25 is a cross-sectional view illustrating a step that follows FIG. 24.

Then, as shown in FIG. 25, the resist cover 33 is removed. Subsequently, the protective layer 17 is formed so as to cover the second magnetic layer 14. Then, through the steps of forming leads, terminals and the like on the protective layer 17, cutting the substrate for each slider, polishing the medium facing surface ABS, preparing rails for flying and so on, the thin-film magnetic head is completed.

The method of manufacturing the thin-film magnetic head according to this embodiment can provide the following functions and effects in addition to those provided by the thin-film magnetic head according to this embodiment.

In this embodiment, the step of forming the pole portion layer 14A of the second magnetic layer 14 includes the steps of: forming the layer 14Ae to be etched, made of a material for forming the pole portion layer 14A, on the gap layer 9 and the coupling portion 12; and defining the outer shape of the pole portion layer 14A and exposing the coupling portion 12 by selectively etching the layer 14Ae by dry etching. In this embodiment, the layer 14Ae is etched by dry etching, so as to define the shape of the base of the yoke portion layer 14B such that the base has a gentle slope from the rear end surface of the pole portion layer 14A to the upper end of the coupling portion 12. Accordingly, by forming the yoke portion layer 14B on this base, it is possible to form the magnetic path that connects the coupling portion 12 and the pole portion layer 14A in the shortest distance.

In this embodiment, if the top surface of the layer 14Ae is flattened by polishing after the step of forming the layer 14Ae, the end of the pole portion layer 14A farther from the gap layer 9 can be completely made flat in the medium facing surface ABS. This allows the magnetic field produced from the pole portion layer 14A in the medium facing surface ABS to be made uniform in the direction intersecting the track. Consequently, it is possible to prevent the bit pattern of the recording medium from being distorted, and to thereby improve the linear recording density.

Furthermore, in this embodiment, the top surfaces of the insulating layer 9C to be a base of the layer 14Ae and the coupling portion 12 are flattened before the step of forming the layer 14Ae. This allows the end of the pole portion layer 14A closer to the gap layer 9 to be made flat in the medium facing surface ABS. If the layer 14Ae is formed by sputtering, a good uniformity in thickness of the layer 14Ae as deposited can be obtained, so that the end of the pole portion layer 14A farther from the gap layer 9 can also be made flat in the medium facing surface ABS. As a result, the magnetic field produced from the pole portion layer 14A in the medium facing surface ABS can be made uniform in the direction intersecting the track. Consequently, it is possible to prevent the bit pattern of the recording medium from being distorted, and to thereby improve the linear recording density.

Furthermore, in this embodiment, the step of forming the pole portion layer 14A includes, after the step of forming the layer 14Ae, the steps of: forming the non-magnetic layer 15e on the layer 14Ae; and forming the mask 32 corresponding to the shape of the pole portion layer 14A on the non-magnetic layer 15e. In the step of etching the layer 14Ae, the mask 32 may be used to etch the non-magnetic layer 15e and the layer 14Ae. In this case, it is possible to define the outer shape of the pole portion layer 14A with the top surface of the layer 14Ae being protected by the non-magnetic layer 15e, which makes it possible to maintain the flatness of the end of the pole portion layer 14A farther from the gap layer 9.

Furthermore, in the step of forming the mask 32, the resist frame 31 having a gap portion corresponding to the shape of the pole portion layer 14A may be formed on the non-magnetic layer 15e, so as to form the mask 32 inside the gap portion of the resist frame 31. In this case, it is possible to form the mask 32 to have a better resistance to dry etching compared to the case where the mask 32 is formed using a resist. As a result, even when the pole portion layer 14A is made of a material that has a good resistance to dry etching, it is possible to define the outer shape of the pole portion layer 14A by dry etching using the mask 32.

In the step of forming the yoke portion layer 14B in this embodiment, electroplating may be employed to form the yoke portion layer 14B. In this case, the yoke portion layer 14B can be formed easily into a shape that well follows the shape of the base thereof.

The step of forming the yoke portion layer 14B may include the steps of: forming the resist cover 33 for covering part of the pole portion layer 14A located near the medium facing surface ABS; forming the electrode layer 34 for electroplating on the resist cover 33, the pole portion layer 14A, the gap layer 9 and the coupling portion 12; and forming the yoke portion layer 14B by electroplating using the electrode layer 34. In this case, it is possible to prevent the electrode layer from adhering to and remaining on the side surfaces of part of the pole portion layer 14A located near the medium facing surface ABS, and to thereby prevent the track width from being expanded due to the electrode layer adhering thereto or remaining thereon. It is also possible to prevent degradation in reliability of the thin-film magnetic head caused by the etched material adhering to or remaining on the side surfaces of part of the pole portion layer 14A located near the medium facing surface ABS, when removing the electrode layer by dry etching.

Second Embodiment

Figure 26:
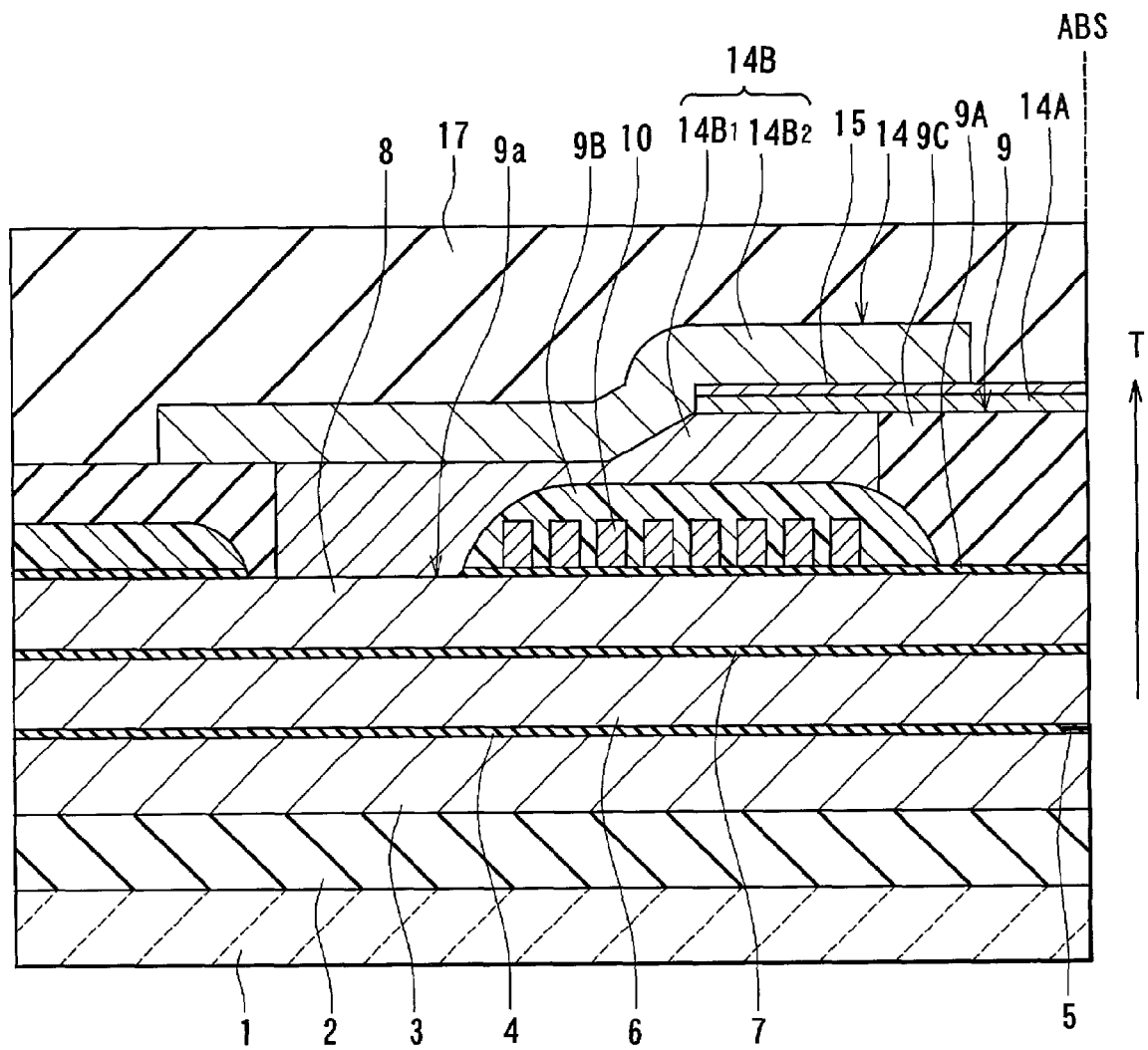
FIG. 26 is a cross-sectional view illustrating the structure of a thin-film magnetic head according to a second embodiment of the invention.

A thin-film magnetic head according to a second embodiment of the invention will now be explained with reference to FIGS. 26 to 28. FIG. 26 is a cross-sectional view illustrating the structure of the thin-film magnetic head of this embodiment. FIG. 26 shows a cross section orthogonal to the medium facing surface and the surface of the substrate. In addition, the arrow indicated by symbol T in FIG. 26 shows the traveling direction of a recording medium.

Figure 27:
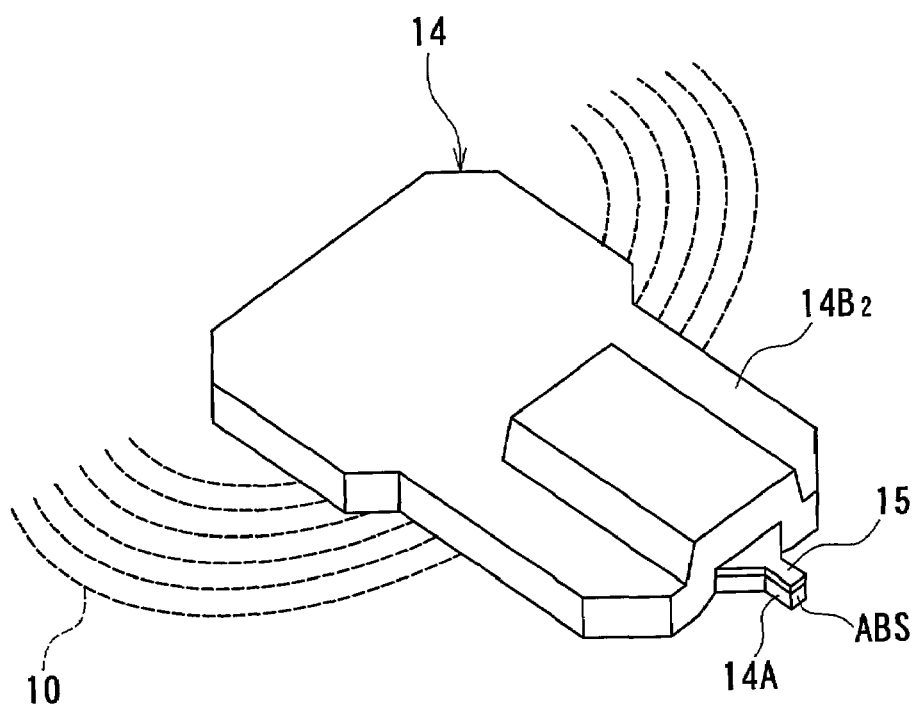
FIG. 27 is a perspective view illustrating the main part of the thin-film magnetic head shown in FIG. 26.

FIG. 27 is a perspective view illustrating the main part of the thin-film magnetic head shown in FIG. 26. FIG. 28 is an enlarged perspective view illustrating the vicinity of the magnetic pole portion shown in FIG. 27.

As shown in FIG. 26, the thin-film magnetic head of this embodiment comprises: the substrate 1 made of a ceramic material such as aluminum oxide and titanium carbide ($Al_2O_3.TiC$); the insulating layer 2 made of an insulating material such as alumina ($Al_2O_3$) and formed on the substrate 1; the bottom shield layer 3 made of a magnetic material and formed on the insulating layer 2; the MR (magnetoresistive) element 5 as a read element formed on the bottom shield layer 3 via the insulating layer 4; and the top shield layer 6 made of a magnetic material and formed on the MR element 5 via the insulating layer 4. Each of the bottom shield layer 3 and the top shield layer 6 has a thickness of, for example, 1 to 2 µm.

One end of the MR element 5 is located in the medium facing surface (or the air bearing surface) ABS. The MR element 5 may be an element made of a magnetosensitive film that exhibits a magnetoresistive effect, such as an anisotropic magnetoresistive (AMR) element, a giant magnetoresistive (GMR) element, or a tunneling magnetoresistive (TMR) element.

The thin-film magnetic head further comprises: the non-magnetic layer 7 formed on the top shield layer 6; the first magnetic layer 8 made of a magnetic material and formed on the non-magnetic layer 7; the insulating layer 9A formed on a portion of the first magnetic layer 8 in which a thin-film coil 10 is to be formed; the thin-film coil 10 formed on the insulating layer 9A; and the insulating layer 9B that is filled at least between windings of the thin-film coil 10 and that is not exposed in the medium facing surface ABS. The contact hole 9a is formed in the insulating layer 9A at a distance from the medium facing surface ABS. In this embodiment, the insulating layer 9B is formed to entirely cover the thin-film coil 10.

For example, the first magnetic layer 8 has a thickness of 1 to 2 µm. The magnetic material for making the first magnetic layer 8 may be an iron-nickel-based alloy or Permalloy, or a high saturated magnetic flux density material to be described later.

The insulating layer 9A is made of a non-conductive and non-magnetic material such as alumina, and has a thickness of 0.1 to 1 µm, for example.

The thin-film coil 10 is made of a conductive material such as copper, and the winding thereof is 0.3 to 2 µm in thickness, for example. Thin-film coil 10 can have any number of turns of the winding as well as any pitch of the winding. In this embodiment, as an example, the winding of the thin-film coil 10 has a thickness of 1.3 µm, a width of 0.8 µm, a pitch of 1.3 µm, and the number of turns of 8. The thin-film coil 10 is wound around the contact hole 9a.

The insulating layer 9B is made of a non-conductive and non-magnetic material that exhibits fluidity during its formation. More specifically, the insulating layer 9B may be formed of an organic, non-conductive and non-magnetic material such as photoresist (a photosensitive resin), or a spin-on-glass (SOG) film of coating glass.

The thin-film magnetic head further comprises the insulating layer 9C which is formed on the insulating layer 9A in a region extending from a part of the insulating layer 9B located near the medium facing surface ABS to the medium facing surface ABS. The insulating layer 9C is exposed in the medium facing surface ABS. The insulating layer 9C is made of a non-conductive and non-magnetic material which has a better resistance to corrosion, rigidity, and insulating strength than those of the insulating layer 9B. As such a material, an inorganic, non-conductive and non-magnetic material such as alumina and silicon dioxide ($SiO_2$) may be used. The total thickness of the insulating layers 9A and 9C in the medium facing surface ABS is, for example, 3 to 6 μm.

The insulating layers 9A, 9B and 9C make up the gap layer 9 to be provided between the first magnetic layer 8 and the second magnetic layer 14 as described later.

The surface of the thin-film coil 10 closer to the second magnetic layer 14 is located closer to the first magnetic layer 8 than the end of the gap layer 9 located in the medium facing surface ABS next to the second magnetic layer 14 (or the end of the insulating layer 9C closer to the second magnetic layer 14).

The thin-film magnetic head further comprises the second magnetic layer 14 made of a magnetic material and formed on the gap layer 9, and the protective layer 17 made of a non-conductive and non-magnetic material such as alumina and formed to cover the second magnetic layer 14.

The second magnetic layer 14 has the pole portion layer 14A including the magnetic pole portion and the yoke portion layer 14B that serves as a yoke. The yoke portion layer 14B includes a first layer $14B_1$ and a second layer $14B_2$. The first layer $14B_1$ is in contact with and magnetically connected to the first magnetic layer 8 and the surface of the pole portion layer 14A closer to the gap layer 9. The second layer $14B_2$ is in contact with and magnetically connected to the first layer $14B_1$, the end surface of the pole portion layer 14A farther from the medium facing surface ABS (hereinafter referred to as the rear end surface), and both side surfaces of the pole portion layer 14A in the width direction.

The first layer $14B_1$ of the yoke portion layer 14B is formed on the first magnetic layer 8 and the insulating layer 9B to extend from where the contact hole 9a is formed toward the medium facing surface ABS, to the end surface of the insulating layer 9C farther from the medium facing surface ABS. The thickness of the first layer $14B_1$ at the position of the contact hole 9a is greater than the total thickness of the insulating layers 9A and 9B, and is equal to or greater than 3 μm, for example. For example, the end of the first layer $14B_1$ closer to the medium facing surface ABS is located at a distance of 1.5 μm or more from the medium facing surface ABS, and thus located closer to the medium facing surface ABS than the rear end surface of the pole portion layer 14A. In this embodiment, as an example, the distance from the medium facing surface ABS to the end of the first layer $14B_1$ closer to the medium facing surface ABS is 5 μm. The first layer $14B_1$, may be made of an iron-nickel-based alloy or Permalloy, or a high saturated magnetic flux density material to be described later.

The top surfaces of part of the first layer $14B_1$, of the yoke portion layer 14B located near the medium facing surface ABS and the insulating layer 9C are flattened. The pole portion layer 14A is formed on the flattened top surfaces of the first layer $14B_1$ and the insulating layer 9C. Accordingly, the first layer $14B_1$ of the yoke portion layer 14B is in contact with and magnetically connected to the surface of the pole portion layer 14A closer to the gap layer 9.

The thin-film magnetic head further comprises the non-magnetic layer 15 formed on the pole portion layer 14A. The second layer $14B_2$ of the yoke portion layer 14B is disposed on the first layer $14B_1$ and the non-magnetic layer 15. The second layer $14B_2$ is in contact with and magnetically connected to the first layer $14B_1$, the rear end surface of the pole portion layer 14A, and both side surfaces of the pole portion layer 14A in the a width direction. Part of the second layer $14B_2$ located near the medium facing surface ABS is adjacent to the top surface of the pole portion layer 14A via the non-magnetic layer 15, and magnetically connected to the pole portion layer 14A via the non-magnetic layer 15. For example, the second layer $14B_2$ of the yoke portion layer 14B is 0.5 to 2 μm in thickness. For example, the second layer $14B_2$ may be made of an iron-nickel-based alloy or Permalloy, or a high saturated magnetic flux density material to be described later.

The pole portion layer 14A is preferably 0.1 to 0.8 μm in thickness and more preferably 0.3 to 0.8 μm. In this embodiment, as an example, the pole portion layer 14A is 0.5 μm in thickness. In addition, the length from the medium facing surface ABS to the rear end surface of the pole portion layer 14A is 2 μm or greater. In this embodiment, as an example, the length is 10 μm.

Figure 28:
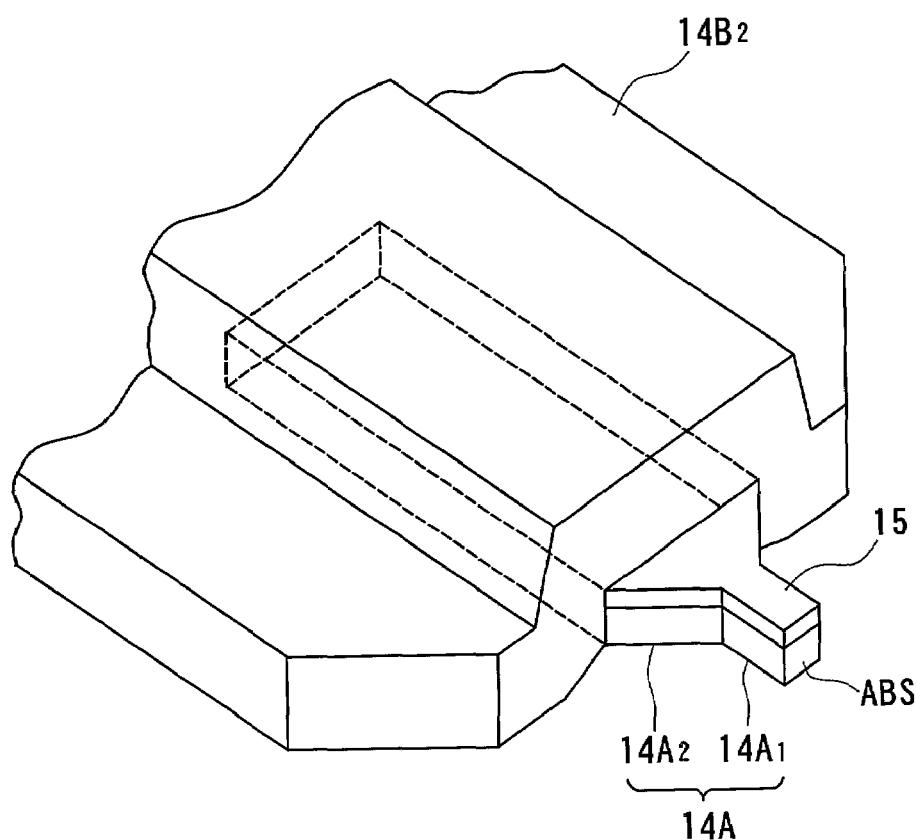
FIG. 28 is an enlarged perspective view illustrating the vicinity of the magnetic pole portion shown in FIG. 27.

As shown in FIG. 28, the pole portion layer 14A includes the first portion $14A_1$ located next to the medium facing surface ABS, and the second portion $14A_2$ located farther from the medium facing surface ABS than the first portion $14A_1$. The first portion $14A_1$ is the magnetic pole portion of the second magnetic layer 14. The magnetic pole portion of the first magnetic layer 8 includes a portion of the first magnetic layer 8 that is opposed to the first portion $14A_1$ via the gap layer 9.

The first portion $14A_1$ has a width equal to the track width. That is, the width of the first portion $14A_1$ in the medium facing surface ABS defines the track width. The second portion $14A_2$ has a width equal to that of the first portion $14A_1$ at the interface with the first portion $14A_1$. The width of the second portion $14A_2$ gradually increases from this interface with an increase in distance from the medium facing surface ABS, and finally becomes constant. The second portion $14A_2$ of the pole portion layer 14A is laid over a portion of the first layer $14B_1$ of the yoke portion layer 14B located near the medium facing surface ABS. A part of the second layer $14B_2$ of the yoke portion layer 14B located near the medium facing surface ABS is laid over the second portion $14A_2$ 0f the pole portion layer 14A via the non-magnetic layer 15.

The width of the first portion $14A_1$ in the medium facing surface ABS, that is, the track width, is preferably 0.5 μm or less, and more preferably 0.3 μm or less. The portion of the second portion $14A_2$ overlapping the yoke portion layer 14B has a width greater than that of the first portion $14A_1$ in the medium facing surface ABS, and the width is 2 μm or more, for example.

An end of the second layer $14B_2$ of the yoke portion layer 14B that is closer to the medium facing surface ABS is located, for example, at a distance of 1.5 μm or more from the medium facing surface ABS, and located closer to the medium facing surface ABS than the rear end surface of the pole portion layer 14A.

Furthermore, in this embodiment, an end of the second layer $14B_2$ of the yoke portion layer 14B opposite to the medium facing surface ABS is located farther from the medium facing surface ABS than the portion where the first layer $14B_1$ and the first magnetic layer 8 are magnetically coupled to each other.

The pole portion layer 14A has a saturated magnetic flux density equal to or greater than that of the yoke portion layer 14B. As the magnetic material to form the pole portion layer 14A, it is preferable to use a high saturated magnetic flux density material having a saturated magnetic flux density of 1.4 T or more. For example, as the high saturated magnetic flux density material, available are a material containing iron and nitrogen atoms, a material containing iron, zirconia, and oxygen atoms, and a material containing iron and nickel elements. More specifically, for example, as the high saturated magnetic flux density material, it is possible to use at least one of NiFe (Ni: 45 wt %, Fe: 55 wt %), FeN and its-compounds, Co-based amorphous alloys, Fe—Co, Fe—M (including oxygen atoms as required), and Fe—Co—M (including oxygen atoms as required). In the foregoing, M is at least one element selected from the group consisting of Ni, N, C, B, Si, Al, Ti, Zr, Hf, Mo, Ta, Nb, and Cu (all of which stand for chemical elements).

As the magnetic material to form the yoke portion layer 14B, it is possible to use a material containing iron and nickel elements and having a saturated magnetic flux density of the order of 1.0 T, for example. Such a material has a good resistance to corrosion and a higher resistance than that of the material to form the pole portion layer 14A. Use of such a material will facilitate formation of the yoke portion layer 14B.

To form the yoke portion layer 14B, it is also possible to use a magnetic material that is the same in compositional family as the magnetic material used to form the pole portion layer 14A. In this case, to make the saturated magnetic flux density of the yoke portion layer 14B lower than that of the pole portion layer 14A, it is preferable to use, as the magnetic material for forming the yoke portion layer 14B, a material having a lower compositional ratio of iron atoms than that of the magnetic material used to form the pole portion layer 14A.

The non-magnetic layer 15 is identical to the pole portion layer 14A in planar shape. In addition, the non-magnetic layer 15 is exposed in the medium facing surface ABS. The non-magnetic layer 15 is preferably 0.5 μm or less in thickness. In this embodiment, as an example, the non-magnetic layer 15 is 0.3 μm in thickness. It is also possible to omit the non-magnetic layer 15.

To form the non-magnetic layer 15, it is possible to use a material containing titanium or tantalum (including their alloys and oxides) or an inorganic, non-conductive and non-magnetic material such as alumina or silicon dioxide ($SiO_2$), for example. If dry etching is used to form the pole portion layer 14A, it is preferable that the non-magnetic layer 15 is formed of a material having a lower etching rate for the dry etching than those of the materials that form the pole portion layer 14A and the insulating layer 9C, of the gap layer 9, which is disposed in contact with the pole portion layer 14A. For example, available for this purpose are materials containing titanium or tantalum (including their alloys and oxides).

As described above, the thin-film magnetic head of this embodiment comprises the medium facing surface ABS that faces toward the recording medium, a read head, and a write head. The read head comprises the MR element 5 functioning as a read element, and the bottom shield layer 3 and the top shield layer 6 for shielding the MR element 5. The bottom and top shield layers 3 and 6 have portions that are located on a side of the medium facing surface and opposed to each other with the MR element 5 interposed therebetween.

The write head comprises: the first magnetic layer 8 and the second magnetic layer 14 that are magnetically coupled to each other at a distance from the medium facing surface ABS and include magnetic pole portions disposed on a side of the medium facing surface ABS so as to oppose to each other with a predetermined spacing interposed therebetween along the traveling direction of the recording medium; the gap layer 9 made of a non-magnetic material and provided between the first magnetic layer 8 and the second magnetic layer 14; and the thin-film coil 10 at least a part of which is disposed between the first and second magnetic layers 8 and 14 and insulated from the first and second magnetic layers 8 and 14.

In this embodiment, part of the thin-film coil 10 is disposed between the magnetic layers 8 and 14, and a surface of the part of the coil, the surface being located closer to the second magnetic layer 14 (the surface on the upper side of FIG. 26), is located closer to the first magnetic layer 8 (on the lower side of FIG. 26) than the end of the gap layer 9 (the end on the upper side of FIG. 26) located in the medium facing surface ABS next to the second magnetic layer 14.

In addition, the second magnetic layer 14 has: the pole portion layer 14A including the magnetic pole portion, the width of the pole portion layer 14A measured in the medium facing surface ABS defining the track width; and the yoke portion layer 14B that serves as a yoke and magnetically connects the pole portion layer 14A and the first magnetic layer 8 to each other. The pole portion layer 14A has a saturated magnetic flux density equal to or greater than that of the yoke portion layer 14B. The yoke portion layer 14B is magnetically connected to the pole portion layer 14A at least at the surface of the pole portion layer 14A closer to the gap layer 9, the rear end surface of the pole portion layer 14A, and both side surfaces of the pole portion layer 14A in the width direction.

The thin-film magnetic head according to the present embodiment is suitable for the vertical magnetic recording scheme. When this thin-film magnetic head is used for the vertical magnetic recording scheme, the first portion $14A_1$ of the pole portion layer 14A of the second magnetic layer 14 serves as a main magnetic pole, while the magnetic pole portion of the first magnetic layer 8 serves as an auxiliary magnetic pole. When the thin-film magnetic head of this embodiment is used for the vertical magnetic recording scheme, it is possible to use either a two-layered medium or a single-layered medium as the recording medium.

In the thin-film magnetic head of this embodiment, the second magnetic layer 14 has the pole portion layer 14A and the yoke portion layer 14B. The surface of at least part of the thin-film coil 10 closer to the second magnetic layer 14 is located closer to the first magnetic layer 8 than the end of the gap layer 9 located in the medium facing surface ABS next to the second magnetic layer 14. In addition, the yoke portion layer 14B is magnetically connected to the pole portion layer 14A at least at the surface of the pole portion layer 14A closer to the gap layer 9, the rear end surface of the pole portion layer 14A, and both side surfaces of the pole portion layer 14A in the width direction. Therefore, according to this embodiment, the yoke portion layer 14B forms a short magnetic path between the portion thereof magnetically coupled to the first magnetic layer 8 and the pole portion layer 14A, and it is possible to dispose the yoke portion layer 14B close to the thin-film coil 10.

Furthermore, in this embodiment, the pole portion layer 14A has a saturated magnetic flux density equal to or greater than that of the yoke portion layer 14B. In addition, the yoke portion layer 14B is magnetically connected to the pole portion layer 14A at least at the surface of the pole portion layer 14A closer to the gap layer, the rear end surface of the pole portion layer 14A, and both side surfaces of the pole portion layer 14A in the width direction. That is, the yoke portion layer 14B and the pole portion layer 14A are magnetically connected to each other in a large area. Therefore, this embodiment makes it possible to prevent a saturation of the magnetic flux halfway through the second magnetic layer 14.

With the features, according to this embodiment it is possible to improve electromagnetic conversion efficiency; to increase the intensity of the magnetic field generated from the magnetic pole portion of the second magnetic layer in a direction perpendicular to the surface of the recording medium; and to reduce the magnetic path length. The high-frequency characteristics are thereby improved. In particular, when the pole portion layer 14A is formed of a high saturated magnetic flux density material, it is possible to especially increase the intensity of the magnetic field in a direction perpendicular to the surface of the recording medium, and it is thereby possible to write data on a recording medium having an enhanced coercivity.

Furthermore, in the thin-film magnetic head of this embodiment, the magnetic field produced in a direction perpendicular to the surface of the recording medium is greater than a magnetic field in the longitudinal direction. Therefore, the magnetic energy produced by the head can be efficiently transferred to the recording medium. Accordingly, this thin-film magnetic head can be made impervious to heat fluctuations of the recording medium, and can thereby increase the linear recording density.

As shown in FIG. 26, in the thin-film magnetic head of this embodiment it is preferable to dispose the first magnetic layer 8 on the trailing side in the traveling direction T of the recording medium (or on the air-inflow-end side of the slider including the thin-film magnetic head), and to dispose the second magnetic layer 14 on the leading side in the traveling direction T of the recording medium (or on the air-outflow-end side of the slider including the thin-film magnetic head). For the vertical magnetic recording scheme, this arrangement allows the magnetization reversal transition width to be reduced in the recording medium, as compared with a reverse of this arrangement. This makes it possible to form a magnetization pattern of a higher density on the recording medium, resulting in a higher linear recording density.

Furthermore, as shown in FIG. 26, in the thin-film magnetic head of this embodiment the yoke portion layer 14B includes: the first layer $14B_1$ that is in contact with and magnetically connected to the first magnetic layer 8 and the surface of the pole portion layer 14A closer to the gap layer 9; and the second layer $14B_2$ that is in contact with and magnetically connected to the first layer $14B_1$, the rear end surface of the pole portion layer 14A, and both side surfaces of the pole portion layer 14A in the width direction. Formation of the yoke portion layer 14B is thereby facilitated.

The second layer $14B_2$ of the yoke portion layer 14B is further magnetically connected to the surface of the pole portion layer 14A farther from the gap layer 9. This allows a magnetic flux to be introduced into the pole portion layer 14A from the second layer $14B_2$ of the yoke portion layer 14B through the surface of the pole portion layer 14A farther from the gap layer 9, too, thereby making it possible to improve electromagnetic conversion efficiency.

Furthermore, as shown in FIG. 26, in the thin-film magnetic head of this embodiment the end of each of the first and second layers $14B_1$ and $14B_2$ of the yoke portion layer 14B closer to the medium facing surface ABS is located at a distance from the medium facing surface ABS. This makes it possible to prevent the magnetic field, produced from the end of each of the first and second layers $14B_1$ and $14B_2$ of the yoke portion layer 14B closer to the medium facing surface ABS, from causing writing of information onto the recording medium.

Furthermore, as shown in FIG. 26, in the thin-film magnetic head of this embodiment, the portion of the pole portion layer 14A that is in contact with the yoke portion layer 14B has a width greater than the width of the pole portion layer 14A measured in the medium facing surface ABS. This allows the portion of the pole portion layer 14A that is in contact with the yoke portion layer 14B to be large in area, and thereby makes it possible to prevent a saturation of magnetic flux at this portion. Consequently, it is possible to efficiently introduce the magnetic flux from the yoke portion layer 14B into the pole portion layer 14A. Furthermore, the portion of the pole portion layer 14A exposed in the medium facing surface ABS can be made smaller in area, to make it possible to increase the magnetic field applied to the recording medium.

In the thin-film magnetic head of this embodiment, the length from the medium facing surface ABS to the rear end surface of the pole portion layer 14A is 2 μm or more. This allows to increase the area of the portion of the pole portion layer 14A that is in contact with the yoke portion layer 14B, without increasing the thickness or width of the pole portion layer 14A. Saturation of magnetic flux is thereby prevented at this portion. Consequently, it is possible to introduce the magnetic flux efficiently from the yoke portion layer 14B into the pole portion layer 14A.

Furthermore, as show in FIG. 26, the thin-film magnetic head of this embodiment has the non-magnetic layer 15 that is in contact with the surface of the pole portion layer 14A farther from the gap layer 9. This makes it possible to prevent the surface of the pole portion layer 14A farther from the gap layer 9 from being damaged when forming the pole portion layer 14A by dry etching or when forming the yoke portion layer 14B by electroplating, and thereby possible to make the surface flat. Particularly, this embodiment allows the end of the pole portion layer 14A farther from the gap layer 9 to be kept flat in the medium facing surface ABS, since the non-magnetic layer 15 is exposed in the medium facing surface ABS. This allows the If magnetic field generated from the pole portion layer 14A in the medium facing surface ABS to be made uniform in the direction intersecting the track. Consequently, it is possible to prevent the bit pattern of the recording medium from being distorted in shape, and to thereby improve the linear recording density.

Furthermore, in this embodiment, part of the yoke portion layer 14B located near the medium facing surface ABS, that is, part of the second layer $14B_2$ located near the medium facing surface ABS, is adjacent to the surface of the pole portion layer 14A farther from the gap layer 9 via the non-magnetic layer 15, and magnetically connected to the pole portion layer 14A via the non-magnetic layer 15. Consequently, it is possible to introduce a magnetic flux to the medium-facing-surface-ABS side of the pole portion layer 14A from part of the yoke portion layer 14B, too, via the non-magnetic layer 15.

If the non-magnetic layer 15 is formed of a material having a less etching rate than those of the materials forming the pole portion layer 14A and the portion of the gap layer 9 touching the pole portion layer 14A, it is possible to prevent the surface of the pole portion layer 14A farther from the gap layer 9 from being damaged when forming the pole portion layer 14A by dry etching.

In the thin-film magnetic head of this embodiment, as shown in FIG. 26, part of the thin-film coil 10 is disposed between the first magnetic layer 8 and the second magnetic layer 14, and the part of the coil is located closer to the first magnetic layer 8 than a midpoint between the first magnetic layer 8 and the pole portion layer 14A of the second magnetic layer 14. This arrangement allows the first magnetic layer 8 that is larger in volume than the second magnetic layer 14 to efficiently absorb the magnetic field produced by the thin-film coil 10. It is thereby possible to increase the absorptivity of magnetic field in the first and second magnetic layers 8 and 14 in comparison with the case where the thin-film coil 10 is located closer to the second magnetic layer 14.

As shown in FIG. 26, in the thin-film magnetic head of this embodiment, the gap layer 9 comprises: the first portion (the insulating layer 9B) that is made of a material exhibiting fluidity during its formation, filled at least in between the windings of the thin-film coil 10 and not exposed in the medium facing surface; and the second portion (the insulating layers 9A, 9C) that is made of a material having a better resistance to corrosion, rigidity, and insulation property than those of the first portion, and is exposed in the medium facing surface. The first portion (the insulating layer 9B) is completely covered with the second portion (the insulating layers 9A, 9C) and the first layer 14B$_1$ of the yoke portion layer 14B. Although it is difficult to completely fill in the spaces between the windings of the thin-film coil 10 with a non-magnetic material by sputtering, it is made easy by using a non-magnetic material having fluidity like organic materials. Nevertheless, organic materials lack reliability in resistance to dry etching, resistance to corrosion, resistance to heat, rigidity and the like. In this embodiment, as described above, the first portion (the insulating layer 9B) is formed of a material that exhibits fluidity during its formation, and is filled in between the windings of the thin-film coil 10. In addition, the second portion (the insulating layers 9A, 9C), which covers part of the first portion and is exposed in the medium facing surface, is formed of a material having a better resistance to corrosion, rigidity, and insulation property than those of the first portion. Accordingly, it is possible to completely fill the spaces between the windings of the thin-film coil 10 with the non-magnetic material and to thereby increase the reliability of the gap layer 9.

The thin-film magnetic head of this embodiment further comprises the MR element 5 serving as a read element. It is thereby possible to improve the read performance as compared with the case where reading is performed by using an induction-type electromagnetic transducer. Since the MR element 5 is shielded with the shield layers 3 and 6, the resolution of read operations is improved.

Figure 29:
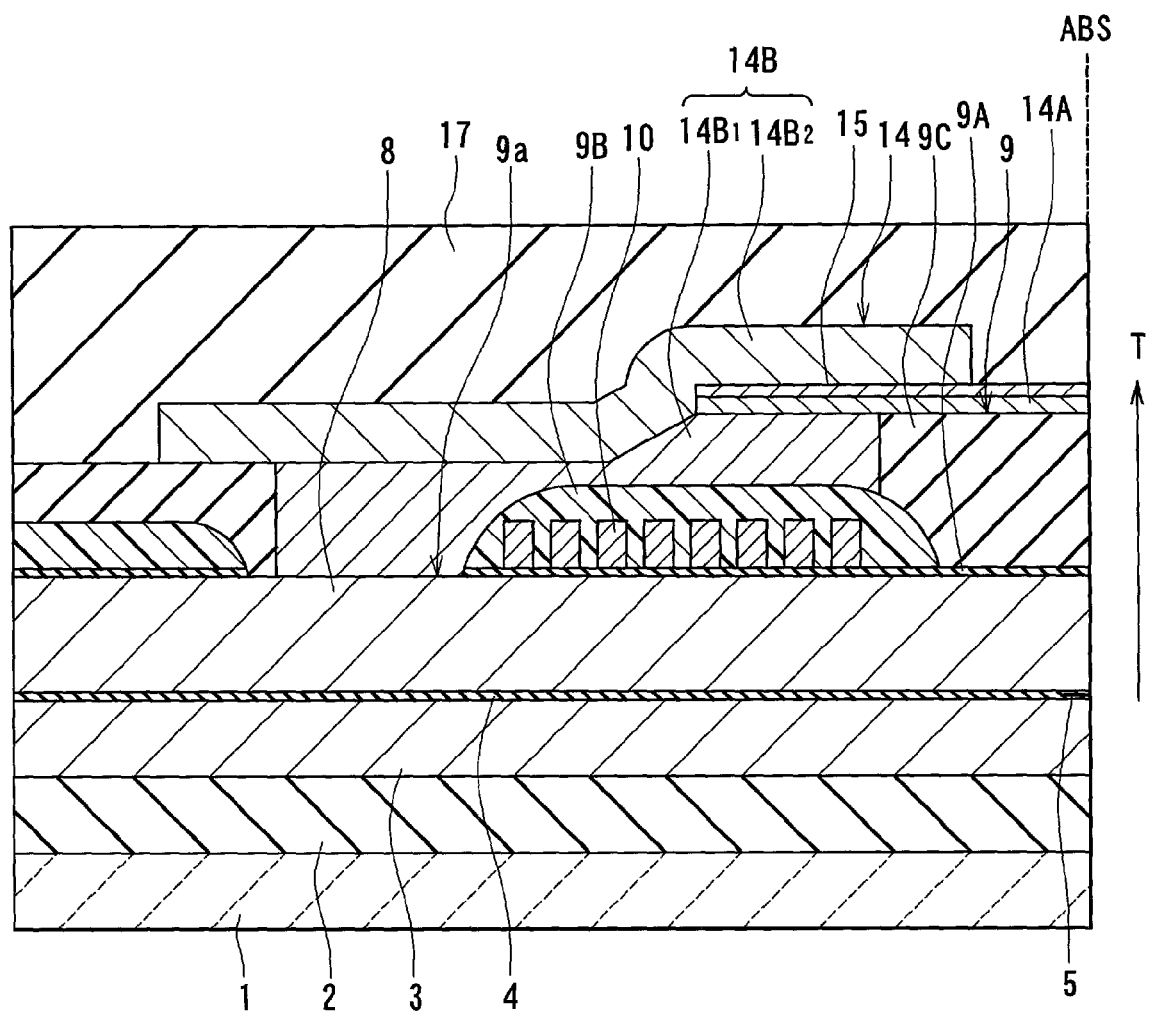
FIG. 29 is a cross-sectional view illustrating the structure of a thin-film magnetic head according to a modified example of the second embodiment of the invention.

Now, referring to FIG. 29, a modified example of the thin-film magnetic head according to this embodiment is explained below. FIG. 29 is a cross-sectional view illustrating the structure of a thin-film magnetic head of the modified example. FIG. 29 illustrates a cross section orthogonal to the medium facing surface and the surface of the substrate.

In the thin-film magnetic head of this modified example, the top shield layer 6 and the non-magnetic layer 7 of the thin-film magnetic head shown in FIG. 26 are eliminated and the first magnetic layer 8 also serves as the top shield layer 6. It simplifies the structure of the thin-film magnetic head and facilitates manufacture of the head. The remainder of the structure of the thin-film magnetic head of this modified example is the same as that of the thin-film magnetic head shown in FIG. 26.

Now, referring to FIGS. 30 to 42, a method of manufacturing the thin-film magnetic head according to this embodiment is explained below. Here, the method is explained with reference to the thin-film magnetic head shown in FIG. 26 as an example. However, the same method may be used to manufacture the thin-film magnetic head shown in FIG. 29, except that the steps of forming the top shield layer 6 and the non-magnetic layer 7 are eliminated in the manufacture of the head shown in FIG. 29. In FIGS. 30 to 42, the substrate 1 and the insulating layer 2 are not shown.

The method of manufacturing the thin-film magnetic head of this embodiment employs the same steps as those of the first embodiment up to the step of forming the thin-film coil 10 on the insulating layer 9A, as shown in FIG. 12.

Figure 30:
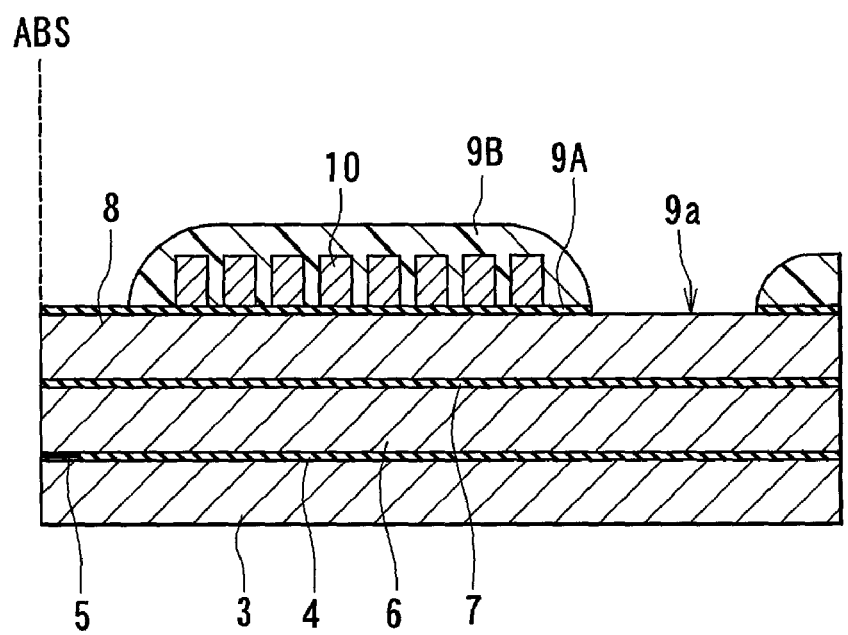
FIG. 30 is a cross-sectional view illustrating a step of a method of manufacturing the thin-film magnetic head according to the second embodiment of the invention.

Then, as shown in FIG. 30, the insulating layer 9B that fills at least the spaces between the windings of the thin-film coil 10 is formed with a known photolithography technique. In this embodiment, the insulating layer 9B is formed so as to cover the thin-film coil 10 completely. However, after formation of the insulating layer 9B that fills the spaces between the windings of the thin-film coil 10, another insulating layer may be formed to cover the thin-film coil 10 and the insulating layer 9B.

Figure 31:
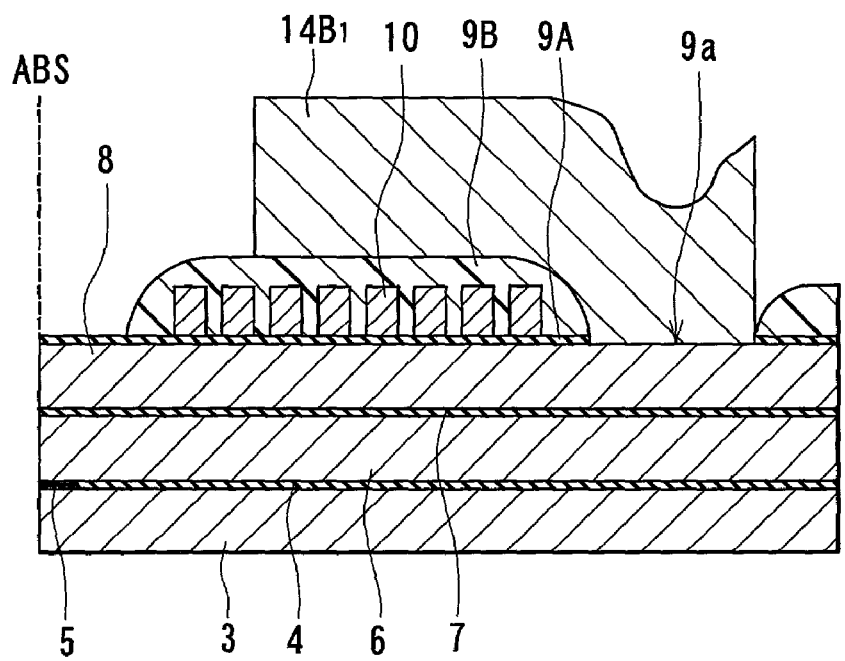
FIG. 31 is a cross-sectional view illustrating a step that follows FIG. 30.

Then, as shown in FIG. 31, with a known photolithography technique and a known deposition technique (e.g., electroplating), the first layer 14B$_1$ of the yoke portion layer 14B is formed on the first magnetic layer 8 and the insulating layer 9B to extend from where the contact hole 9a is formed to a predetermined position towards the medium facing surface ABS. At this stage, for example, the first layer 14B$_1$ is shaped to have a thickness of 3 μm or more, a depth (or a length perpendicular to the medium facing surface ABS) of 2 to 10 μm, and a width of 5 to 20 μm.

Figure 32:
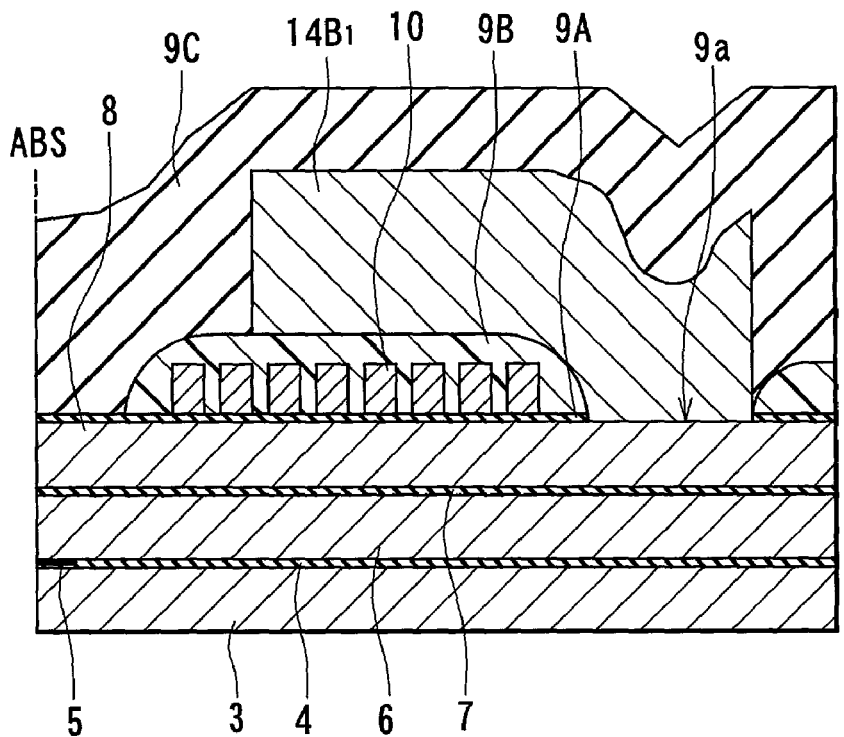
FIG. 32 is a cross-sectional view illustrating a step that follows FIG. 31.

Then, as shown in FIG. 32, the insulating layer 9C is formed by sputtering, so as to cover the insulating layer 9A, the insulating layer 9B, and the first layer 14B$_1$ of the yoke portion layer 14B. At this stage, the insulating layer 9C has a thickness equal to or greater than that of the first layer 14B$_1$.

Figure 33:
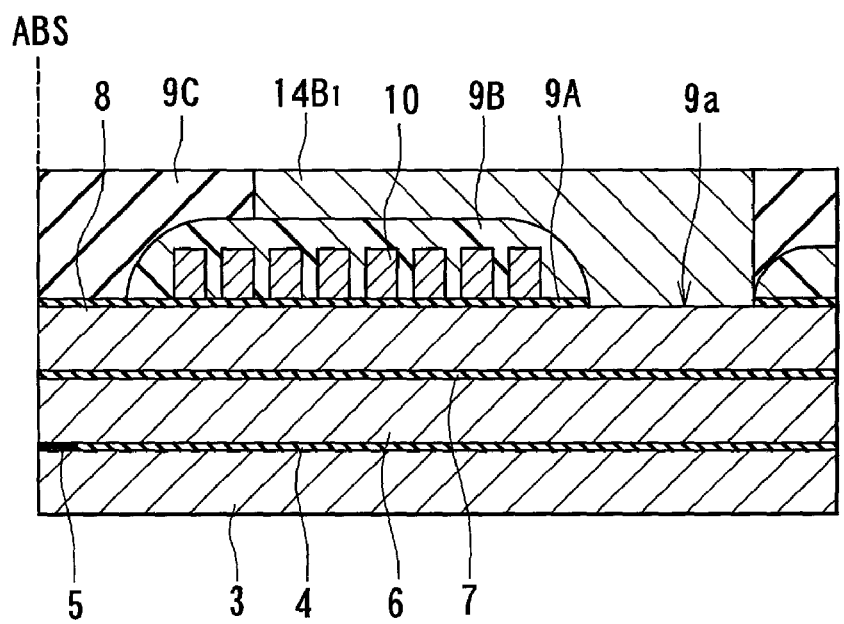
FIG. 33 is a cross-sectional view illustrating a step that follows FIG. 32.

Then, as shown in FIG. 33, the surface of the insulating layer 9C is polished by chemical mechanical polishing, for example, so that the first layer 14B$_1$ of the yoke portion layer 14B is exposed, and the top surfaces of the insulating layer 9C and the first layer 14B$_1$ are flattened. At this stage, the distance from the top surface of the first magnetic layer 8 to the top surface of the insulating layer 9C is 3 to 6 μm, for example.

Figure 34:
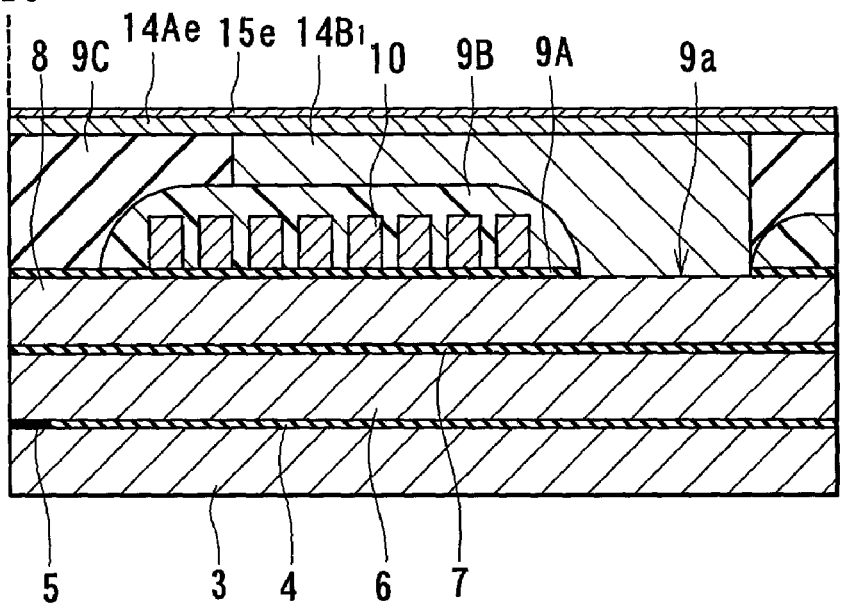
FIG. 34 is a cross-sectional view illustrating a step that follows FIG. 33.

Then, as shown in FIG. 34, on the insulating layer 9C and the first layer 14B$_1$, the layer 14Ae to be etched is formed of a material for forming the pole portion layer 14A of the second magnetic layer 14. The layer 14Ae preferably has a thickness of 0.1 to 0.8 μm, and more preferably a thickness of 0.3 to 0.8 μm. The layer 14Ae may be formed by electroplating or sputtering. If the layer 14Ae has a high surface roughness (e.g., its arithmetic mean roughness Ra is equal to or greater than 12 angstroms), it is preferable to polish the surface of the layer 14Ae through chemical mechanical polishing or the like, so as to flatten the surface.

Then, the non-magnetic layer 15e is formed on the layer 14Ae. The non-magnetic layer 15e is preferably equal to or less than 0.5 μm in thickness.

Then, although not shown, an electrode layer for electroplating is formed by sputtering on the non-magnetic layer 15e. The electrode layer is equal to or less than 0.1 μm in thickness and made of an iron-nickel alloy, for example.

Figure 35:
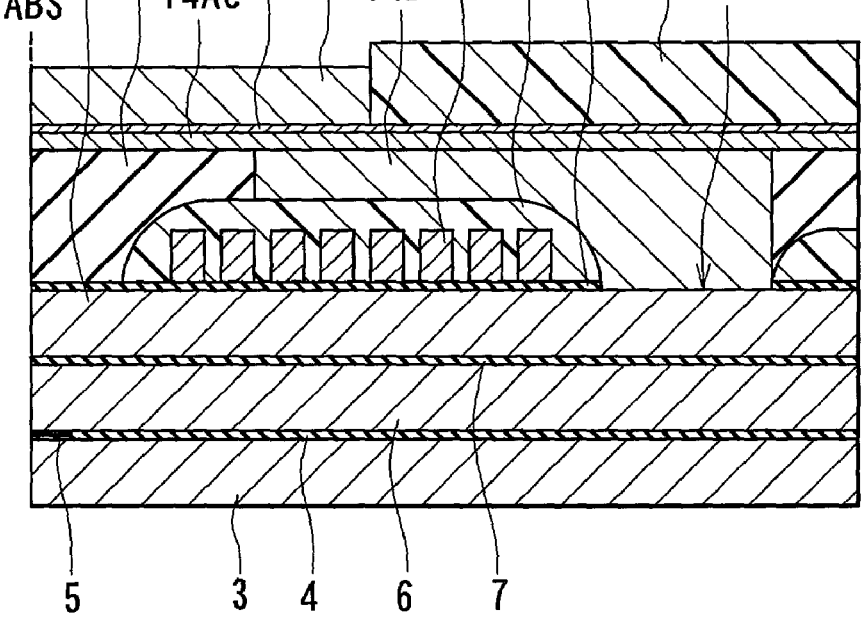
FIG. 35 is a cross-sectional view illustrating a step that follows FIG. 34.

Then, as shown in FIG. 35, the resist frame 31, which has a gap portion corresponding to the shape of the pole portion layer 14A, is formed of a photoresist on the aforementioned electrode layer by photolithography. Using the resist frame 31, a plating film that serves as the mask 32 corresponding to the shape of the pole portion layer 14A is formed on the aforementioned electrode layer by electroplating (frame plating). This plating film is 1 to 4 µm in thickness and made of an iron-nickel alloy, for example. The resist frame 31 is then removed.

Figure 36:
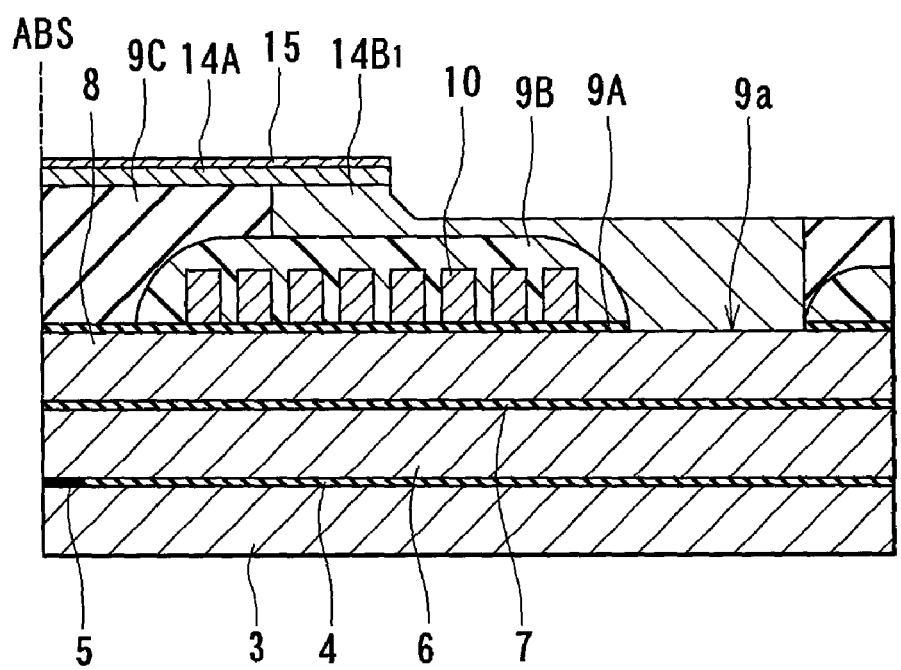
FIG. 36 is a cross-sectional view illustrating a step that follows FIG. 35.

Then, as shown in FIG. 36, using the mask 32, the non-magnetic layer 15e and the layer 14Ae are etched by dry etching such as ion milling to form the non-magnetic layer 15 and the pole portion layer 14A. At this stage, in the mask 32, at least the portion corresponding to the medium facing surface ABS is preferably removed completely, except in the case where the mask 32 is non-magnetic and sufficiently reliable in terms of resistance to corrosion and the like.

Through the aforementioned etching, the surface of the pole portion layer 14A exposed in the medium facing surface ABS is allowed to have a shape as shown in FIGS. 4 and 5. It may have a shape of a rectangle, or a shape of a trapezoid or a triangle in which the lower side located on the trailing side in the traveling direction T of the recording medium (or on the air-inflow-end side of the slider) is shorter than the upper side. The side surfaces of the pole portion layer 14A may be concave. Also, through the aforementioned etching, the width of the pole portion layer 14 in the medium facing surface ABS may be defined so as to agree with the specification of the track width.

Through the aforementioned etching, the non-magnetic layer 15 and the pole portion layer 14A are formed and the first layer $14B_1$ of the yoke portion layer 14B is exposed.

Instead of forming the mask 32 of the plating film as described above, a photoresist may be formed into a patterned resist corresponding to the shape of the pole portion layer 14A on the non-magnetic layer 15e through photolithography. Then, this patterned resist may be used as a mask to etch the non-magnetic layer 15e and the layer 14Ae, so as to form the non-magnetic layer 15 and the pole portion layer 14A and to expose the first layer $14B_1$ of the yoke portion layer 14B. Thereafter, the patterned resist may be removed.

Figure 37:
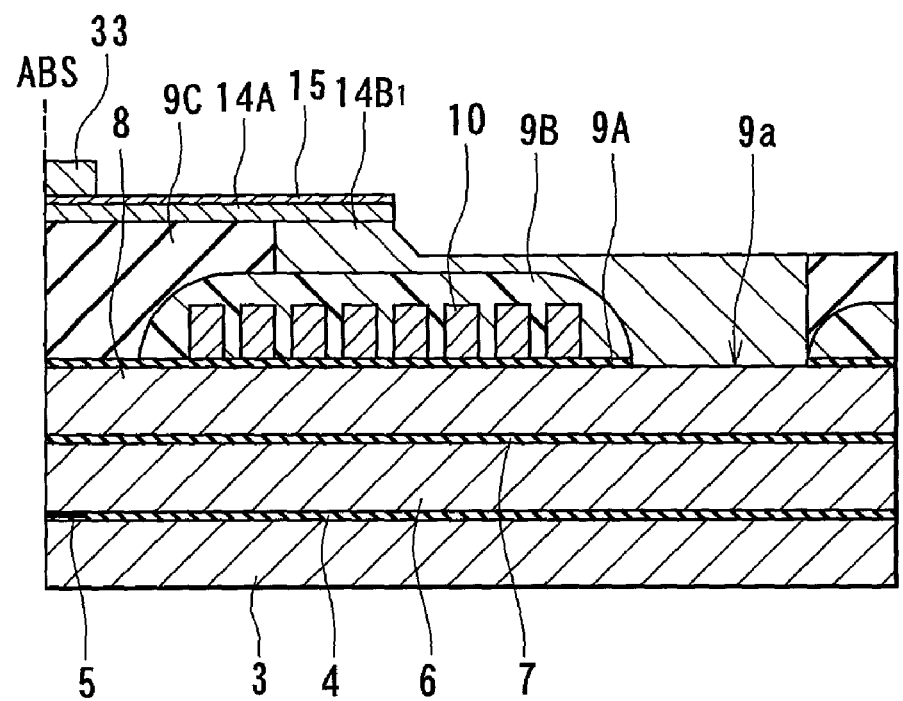
FIG. 37 is a cross-sectional view illustrating a step that follows FIG. 36.

Then, as shown in FIG. 37, the resist cover 33 is formed of a photoresist by photolithography to cover portions of the pole portion layer 14A and non-magnetic layer 15 located near the medium facing surface ABS. The resist cover 33 is preferably formed to have a thickness equal to or less than that of a frame for forming the yoke portion layer to be described later.

Figure 38:
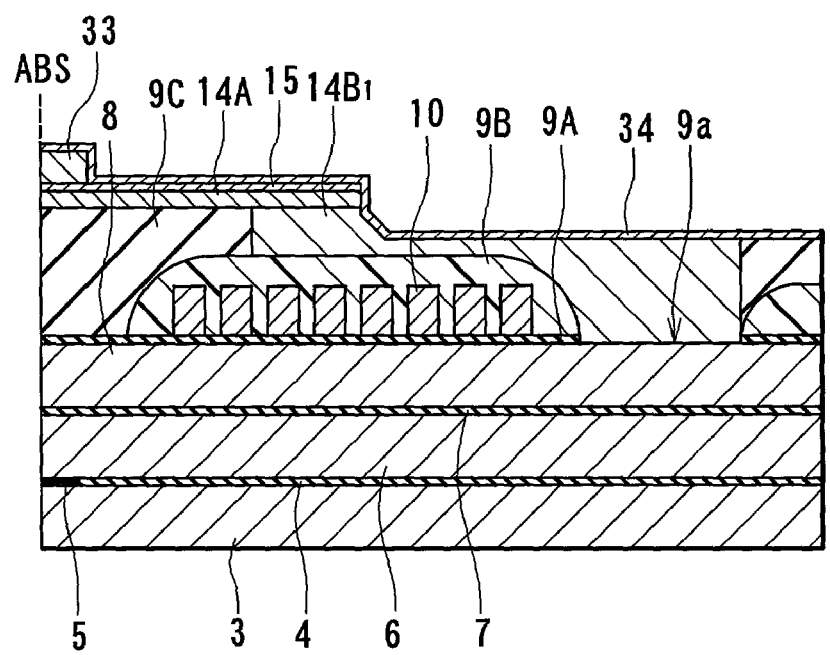
FIG. 38 is a cross-sectional view illustrating a step that follows FIG. 37.

Then, as shown in FIG. 38, the electrode layer 34 for electroplating is formed by sputtering on the resist cover 33, the pole portion layer 14A (and the non-magnetic layer 15), and the first layer $14B_1$ of the yoke portion layer 14B. The electrode layer 34 may have a thickness of 0.1 µm or less, and may be formed of an iron-nickel alloy, with Ti (titanium) deposited to underlie the electrode layer 34.

Figure 39:
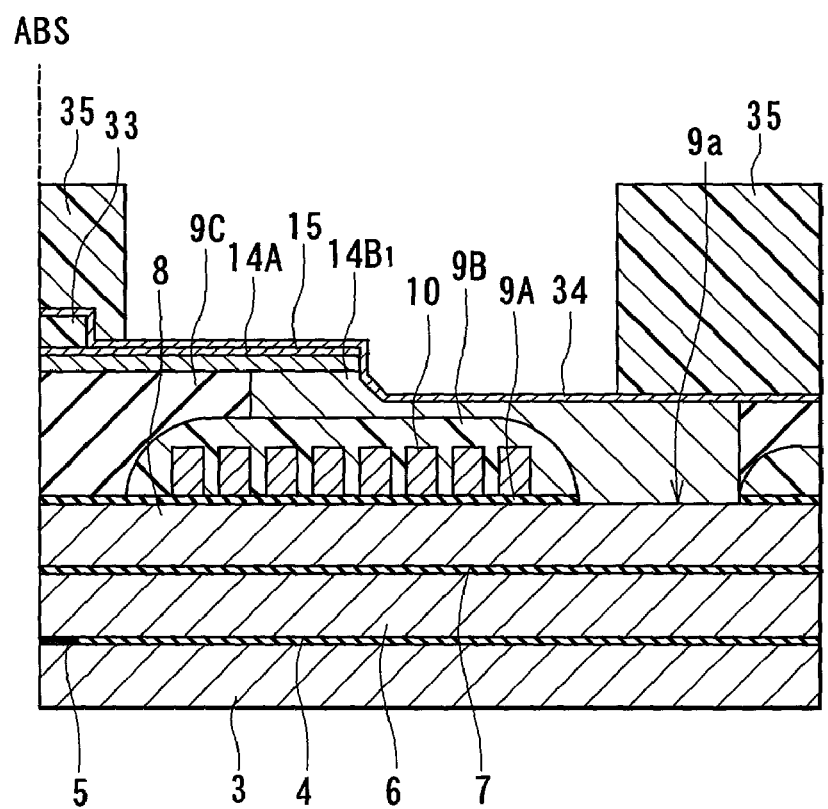
FIG. 39 is a cross-sectional view illustrating a step that follows FIG. 38.

Then, as shown in FIG. 39, the resist frame 35 having a gap portion corresponding to the shape of the second layer $14B_2$ of the yoke portion layer 14B is formed of a photoresist on the electrode layer 34.

Figure 40:
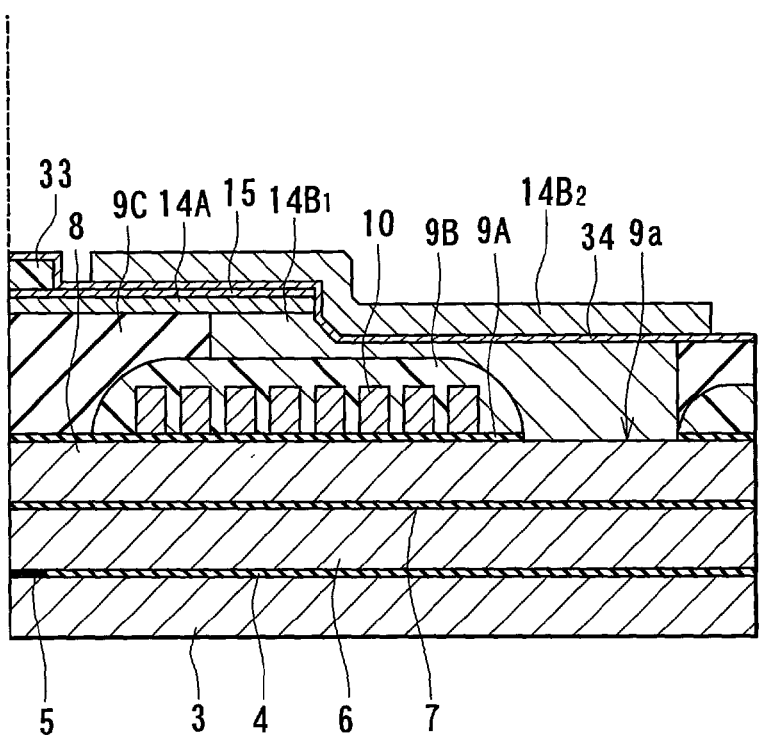
FIG. 40 is a cross-sectional view illustrating a step that follows FIG. 39.

Then, as shown in FIG. 40, using the resist frame 35, the a second layer $14B_2$ of the yoke portion layer 14B is formed on the electrode layer 34 by electroplating (frame plating). The resist frame 35 is then removed. Although the second layer $14B_2$ can be formed using the lift-off method, electroplating is most preferably used to allow the shape of the second layer $14B_2$ to follow the shape of the base thereof.

Figure 41:
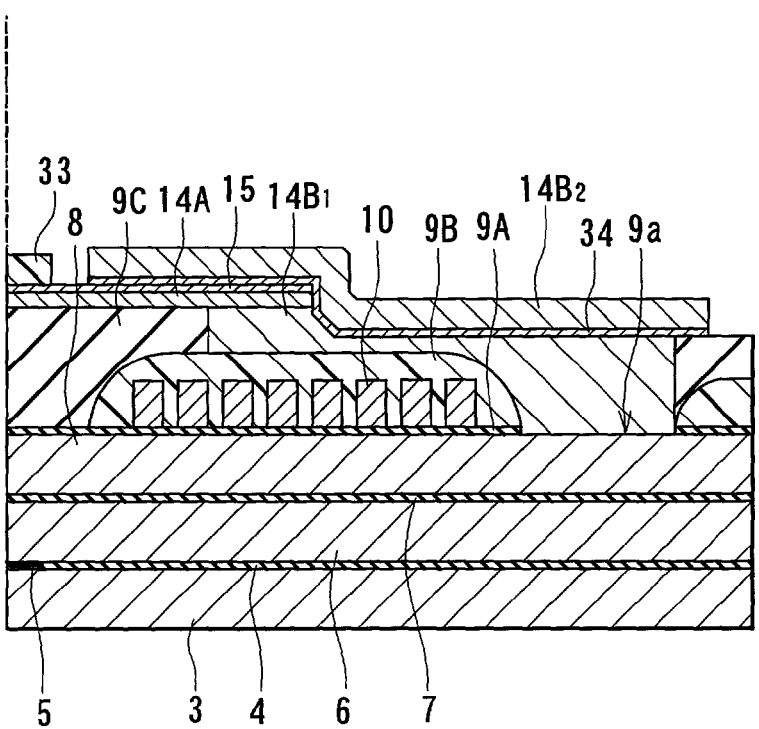
FIG. 41 is a cross-sectional view illustrating a step that follows FIG. 40.

Then, as shown in FIG. 41, the electrode layer 34 except for the portion underlying the second layer $14B_2$ of the yoke portion layer 14B is removed by dry etching.

Figure 42:
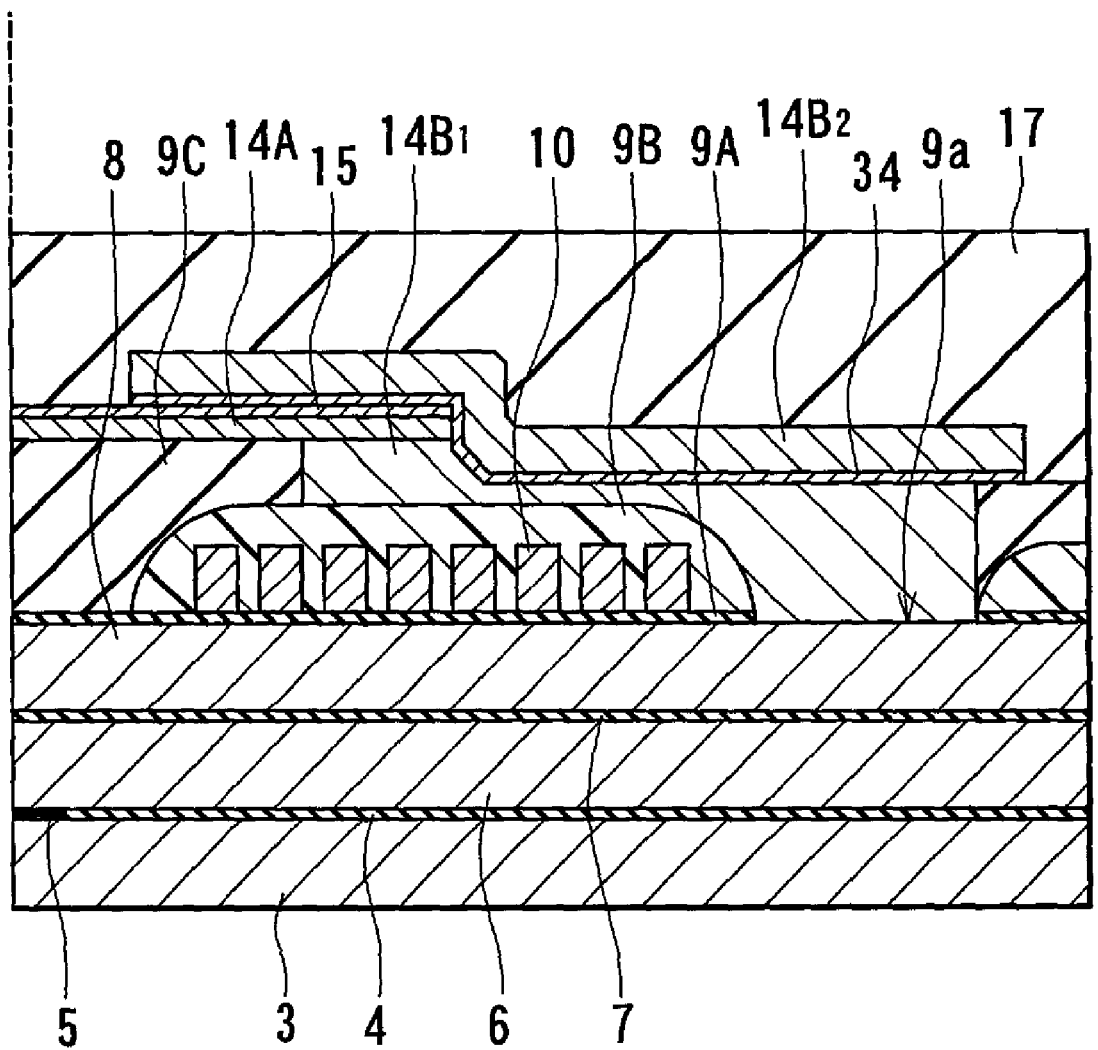
FIG. 42 is a cross-sectional view illustrating a step that follows FIG. 41.

Then, as shown in FIG. 42, the resist cover 33 is removed. Subsequently, the protective layer 17 is formed so as to cover the second magnetic layer 14. Then, through the steps of forming leads, terminals and the like on the protective layer 17, cutting the substrate for each slider, polishing the medium facing surface ABS, preparing rails for flying and so on, the thin-film magnetic head is completed.

As described above, the method of manufacturing the thin-film magnetic head of this embodiment comprises the steps of: forming the first magnetic layer 8; and forming the gap layer 9, the thin-film coil 10, and the second magnetic layer 14 on the first magnetic layer 8 such that the surface of at least part of the thin-film coil 10 closer to the second magnetic layer 14 is located closer to the first magnetic layer 8 than the end of the gap layer 9 located in the medium facing surface ABS next to the second magnetic layer 14, and such that the yoke portion layer 14B is magnetically connected to the pole portion layer 14A at least at the surface of the pole portion layer 14A closer to the gap layer 9, the rear end surface of the pole portion layer 14A, and both side surfaces of the pole portion layer 14A in the width direction. The method of manufacturing the thin-film magnetic head provides the same functions and effects as those of the thin-film magnetic head according to this embodiment.

According to the method of manufacturing the thin-film magnetic head of this embodiment, the step of forming the gap layer 9, the thin-film coil 10, and the second magnetic layer 14 on the first magnetic layer 8 includes the steps of: forming, on the first magnetic layer 8, the thin-film coil 10 and the insulating layer 9B that forms a part of the gap layer 9 for insulating the thin-film coil 10 from its surrounding; forming the first layer $14B_1$ of the yoke portion layer 14B on the first magnetic layer 8 and the insulating layer 9B; forming the insulating layer 9C that forms the other part of the gap layer 9, on the first magnetic layer 8, the insulating layer 9B and the first layer $14B_1$; polishing the insulating layer 9C to expose the first layer $14B_1$ and flattening the top surfaces of the first layer $14B_1$ and the insulating layer 9C; forming the layer 14Ae to be etched, the layer 14Ae being made of a material for forming the pole portion layer 14A, on the flattened first layer $14B_1$ and insulating layer 9C; etching the layer 14Ae selectively by dry etching, so as to define the outer shape of the pole portion layer 14A that is in contact with the first layer $14B_1$ and to expose the first layer $14B_1$; and forming the second layer $14B_2$ of the yoke portion layer 14B on the first layer $14B_1$.

As described above, according to this embodiment, the first layer $14B_1$ of the yoke portion layer 14B is formed before the pole portion layer 14A is formed, and the second layer $14B_2$ of the yoke portion layer 14B is formed after the pole portion layer 14A has been formed. This facilitates the formation of the yoke portion layer 14B that is magnetically connected to the pole portion layer 14A at least at the surface of the pole portion layer 14A closer to the gap layer 9, the rear end surface of the pole portion layer 14A, and both side surfaces of the pole portion layer 14A in the width direction.

Furthermore, according to this embodiment, prior to the step of forming the layer 14Ae to be etched, the top surfaces of the insulating layer 9C and the first layer $14B_1$ of the yoke portion layer 14B serving as the base of the layer 14Ae are flattened by polishing. This allows the end of the pole portion layer 14A closer to the gap layer 9 to be flat in the medium facing surface ABS. If the layer 14Ae is formed by sputtering, a good uniformity in thickness of the layer 14Ae as deposited can be obtained, so that the end of the pole portion layer 14A farther from the gap layer 9 can also be made flat in the medium facing surface ABS. The magnetic field produced from the pole portion layer 14A in the medium facing surface ABS can thereby be made uniform in the direction intersecting the track. Consequently, it is possible to prevent the bit pattern of the recording medium from being distorted, and to thereby improve the linear recording density.

Furthermore, in this embodiment, if the top surface of the layer 14Ae is flattened by polishing after the step of forming the layer 14Ae, the end of the pole portion layer 14A farther from the gap layer 9 can be completely made flat in the medium facing surface ABS. This allows the magnetic field produced from the pole portion layer 14A in the medium facing surface ABS to be made uniform in the direction intersecting the track. Consequently, it is possible to prevent the bit pattern of the recording medium from being distorted, and to thereby improve the linear recording density.

Furthermore, in this embodiment, the step of forming the pole portion layer 14A includes, after the step of forming the layer 14Ae, the steps of: forming the non-magnetic layer 15e on the layer 14Ae; and forming the mask 32 corresponding to the shape of the pole portion layer 14A on the non-magnetic layer 15e. In the step of etching the layer 14Ae, the mask 32 may be used to etch the non-magnetic layer 15e and the layer 14Ae. In this case, it is possible to define the outer shape of the pole portion layer 14A with the top surface of the layer 14Ae being protected by the non-magnetic layer 15e, which makes it possible to maintain the flatness of the end of the pole portion layer 14A farther from the gap layer 9.

Furthermore, in the step of forming the mask 32, the resist frame 31 having a gap portion corresponding to the shape of the pole portion layer 14A may be formed on the non-magnetic layer 15e, so as to form the mask 32 inside the gap portion of the resist frame 31. In this case, it is possible to form the mask 32 to have a better resistance to dry etching compared to the case where the mask 32 is formed using a resist. As a result, even when the pole portion layer 14A is made of a material that has a good resistance to dry etching, it is possible to define the outer shape of the pole portion layer 14A by dry etching using the mask 32.

In this embodiment, the second layer $14B_2$ of the yoke portion layer 14B may be formed by electroplating. In this case, the second layer $14B_2$ can be easily formed into a shape that well follows the shape of the base thereof.

The step of forming the second layer $14B_2$ of the yoke portion layer 14B may include the steps of: forming the resist cover 33 for covering part of the pole portion layer 14A located near the medium facing surface ABS; forming the electrode layer 34 for electroplating on the resist cover 33, the pole portion layer 14A (and the non-magnetic layer 15) and the first layer $14B_1$ of the yoke portion layer 14B; and forming the second layer $14B_2$ by electroplating using the electrode layer 34. In this case, it is possible to prevent the electrode layer from adhering to and remaining on the side surfaces of part of the pole portion layer 14A located near the medium facing surface ABS, and to thereby prevents the track width from being expanded due to the electrode layer adhering thereto or remaining thereon. It is also possible to prevent degradation in reliability of the thin-film magnetic head caused by the etched material adhering to or remaining on the side surfaces of part of the pole portion layer 14A located near the medium facing surface ABS, when removing the electrode layer by dry etching.

The remainder of the structure, functions and effects of this embodiment are similar to those of the first embodiment.

Third Embodiment

Figure 43:
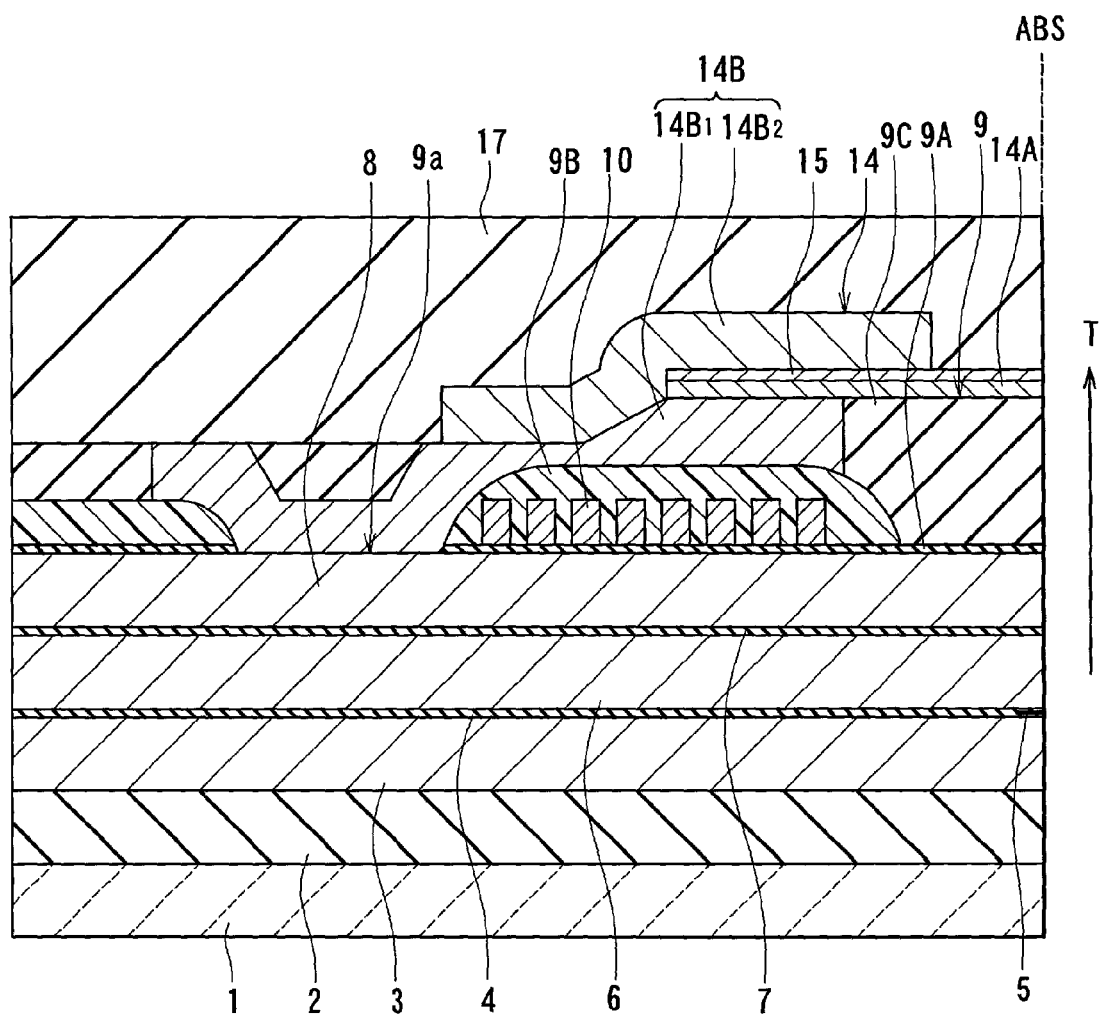
FIG. 43 is a cross-sectional view illustrating the structure of a thin-film magnetic head according to a third embodiment of the invention.
Figure 44:
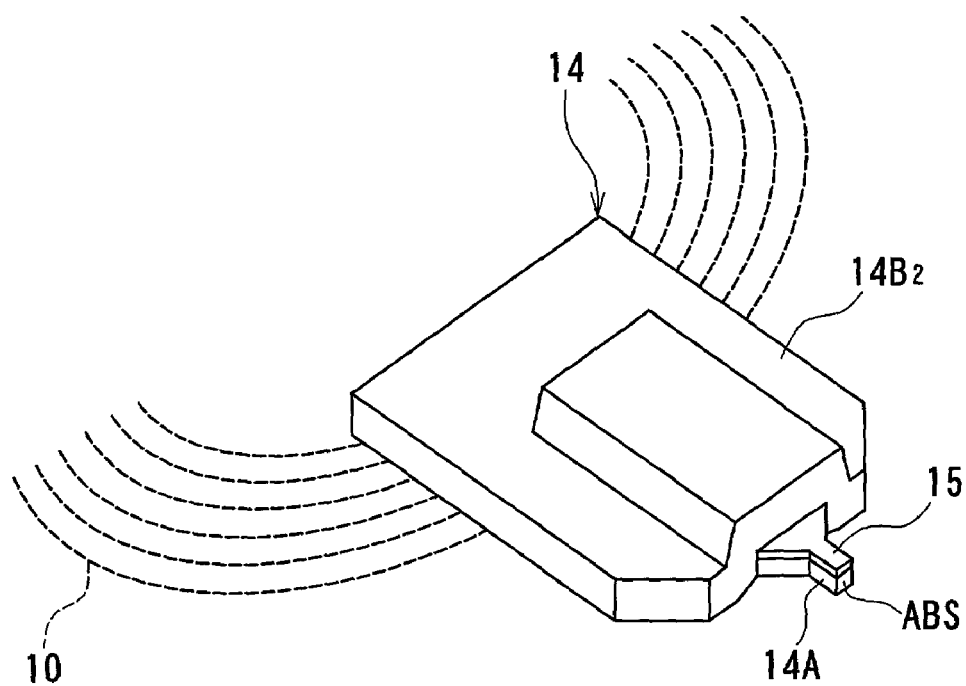
FIG. 44 is a perspective view illustrating the main part of the thin-film magnetic head shown in FIG. 43.

A thin-film magnetic head according to a third embodiment of the invention will now be explained with reference to FIGS. 43 and 44. FIG. 43 is a cross-sectional view illustrating the structure of the thin-film magnetic head of this embodiment. FIG. 43 shows a cross section orthogonal to the medium facing surface and the surface of the substrate. In addition, the arrow indicated by symbol T in FIG. 43 shows the traveling direction of a recording medium. FIG. 44 is a perspective view illustrating the main part of the thin-film magnetic head shown in FIG. 43.

In this embodiment, the first layer $14B_1$ of the yoke portion layer 14B is smaller in thickness than in the second embodiment. The thickness of the first layer $14B_1$ at the position of the contact hole 9a is equal to or less than the total thickness of the insulating layers 9A, 9B. The first layer $14B_1$ preferably has a thickness of 1 μm or more at the position of the contact hole 9a.

In this embodiment, the first layer $14B_1$ of the yoke portion layer 14B extends from the portion magnetically coupled to the first magnetic layer 8 by 2 μm or more in a direction opposite to the medium facing surface. In this embodiment, the first layer $14B_1$ of the yoke portion layer 14B preferably extends further in both directions of the width.

Furthermore, in this embodiment the end of the second layer $14B_2$ of the yoke portion layer 14B opposite to the medium facing surface ABS is located closer to the medium facing surface ABS than the portion where the first layer $14B_1$ and the first magnetic layer 8 are magnetically coupled to each other. However, the end of the second layer $14B_2$ opposite to the medium facing surface ABS is located farther from the medium facing surface ABS than the end of the pole portion layer 14A opposite to the medium facing surface ABS, and preferably located away from the medium facing surface ABS by 10 μm or more.

Now, referring to FIGS. 45 to 56, a method of manufacturing the thin-film magnetic head according to this embodiment is explained below.

The method of manufacturing the thin-film magnetic head of this embodiment employs the same steps as those of the second embodiment up to the step of forming the thin-film coil 10 and the insulating layer 9B on the insulating layer 9A, as shown in FIG. 30.

Figure 45:
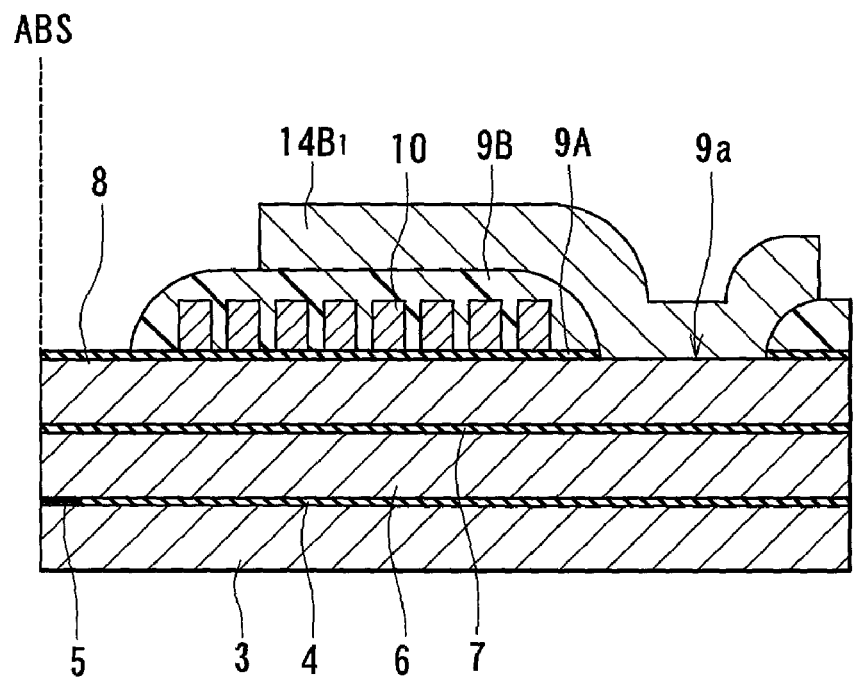
FIG. 45 is a cross-sectional view illustrating a step of a method of manufacturing the thin-film magnetic head according to the third embodiment of the invention.

In this embodiment, as shown in FIG. 45, the first layer $14B_1$ of the yoke portion layer 14B is formed on the first magnetic layer 8 and the insulating layer 9B with a known photolithography technique and a known deposition technique (e.g., electroplating). At this stage, for example, the first layer $14B_1$ has a thickness of 1 to 4 μm, a depth of 2 to 10 μm, and a width of 5 to 20 μm.

Figure 46:
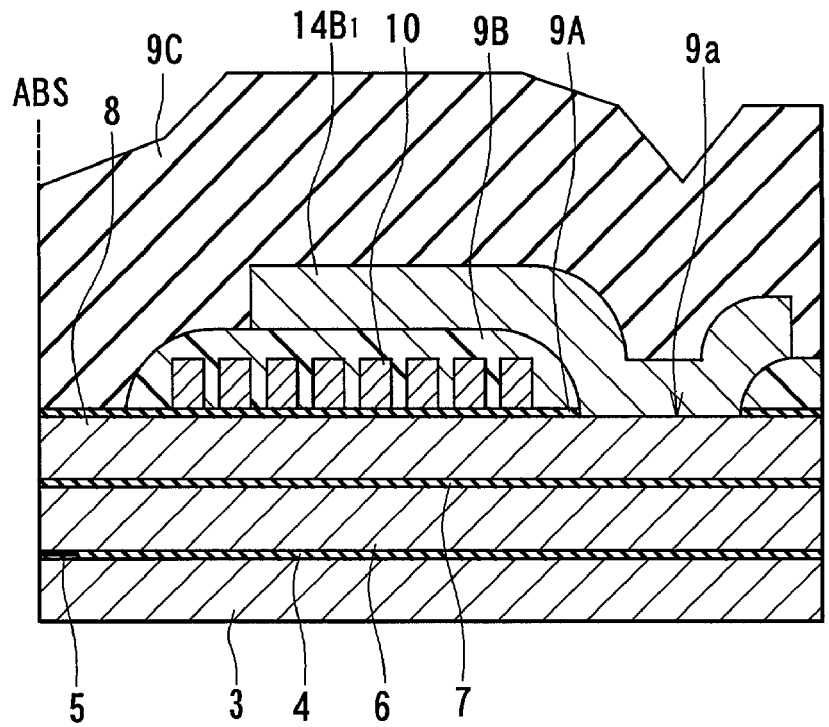
FIG. 46 is a cross-sectional view illustrating a step that follows FIG. 45.

Then, as shown in FIG. 46, the insulating layer 9C is formed by sputtering, so as to cover the insulating layer 9A, the insulating layer 9B, and the first layer $14B_1$ of the yoke portion layer 14B. At this stage, the insulating layer 9C has a thickness equal to or greater than that of the first layer $14B_1$.

Figure 47:
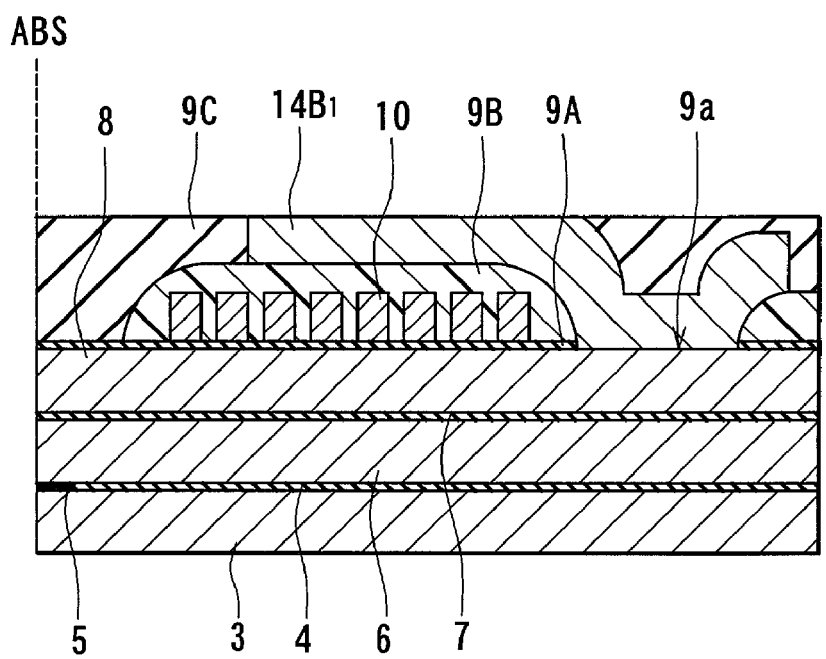
FIG. 47 is a cross-sectional view illustrating a step that follows FIG. 46.

Then, as shown in FIG. 47, the surface of the insulating layer 9C is polished by chemical mechanical polishing, for example, so that the first layer $14B_1$ of the yoke portion layer 14B is exposed, and the top surfaces of the insulating layer 9C and the first layer $14B_1$ are flattened. At this stage, the distance from the top surface of the first magnetic layer 8 to the top surface of the insulating layer 9C is 3 to 6 μm, for example.

Figure 48:
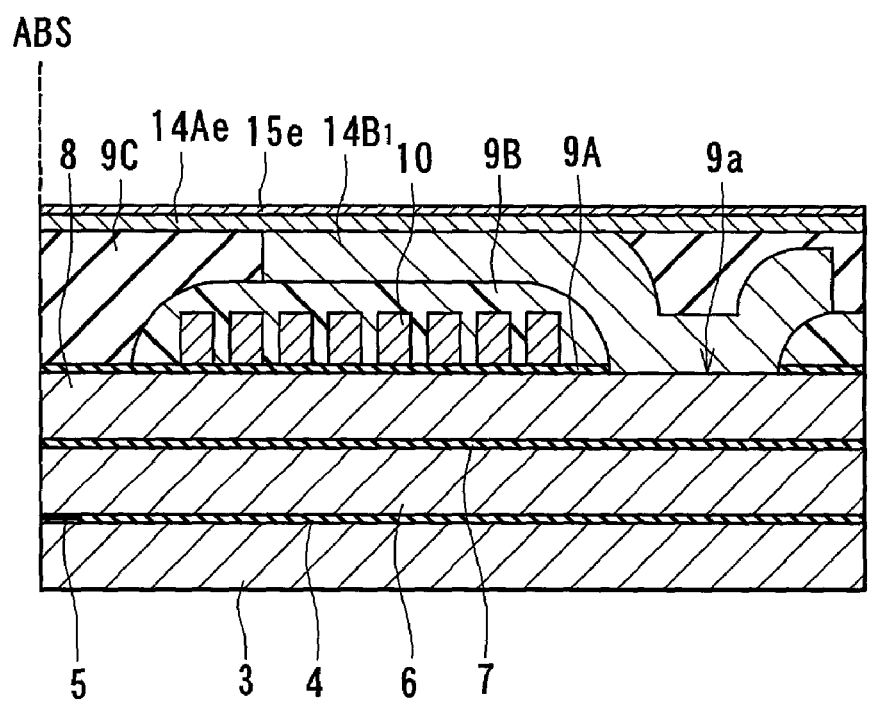
FIG. 48 is a cross-sectional view illustrating a step that follows FIG. 47.

Then, as shown in FIG. 48, on the insulating layer 9C and the first layer $14B_1$, the layer 14Ae to be etched is formed of a material for forming the pole portion layer 14A of the second magnetic layer 14. The layer 14Ae preferably has a thickness of 0.1 to 0.8 μm, and more preferably a thickness of 0.3 to 0.8 μm. The layer 14Ae may be formed by electroplating or sputtering. If the layer 14Ae has a high surface roughness (e.g., its arithmetic mean roughness Ra is equal to or greater than 12 angstroms), it is preferable to polish the surface of the layer 14Ae through chemical mechanical polishing or the like, so as to flatten the surface.

Then, the non-magnetic layer 15e is formed on the layer 14Ae. The non-magnetic layer 15e is preferably equal to or less than 0.5 µm in thickness.

Then, although not shown, an electrode layer for electroplating is formed by sputtering on the non-magnetic layer 15e. The electrode layer is equal to or less than 0.1 µm in thickness and made of an iron-nickel alloy, for example.

Figure 49:
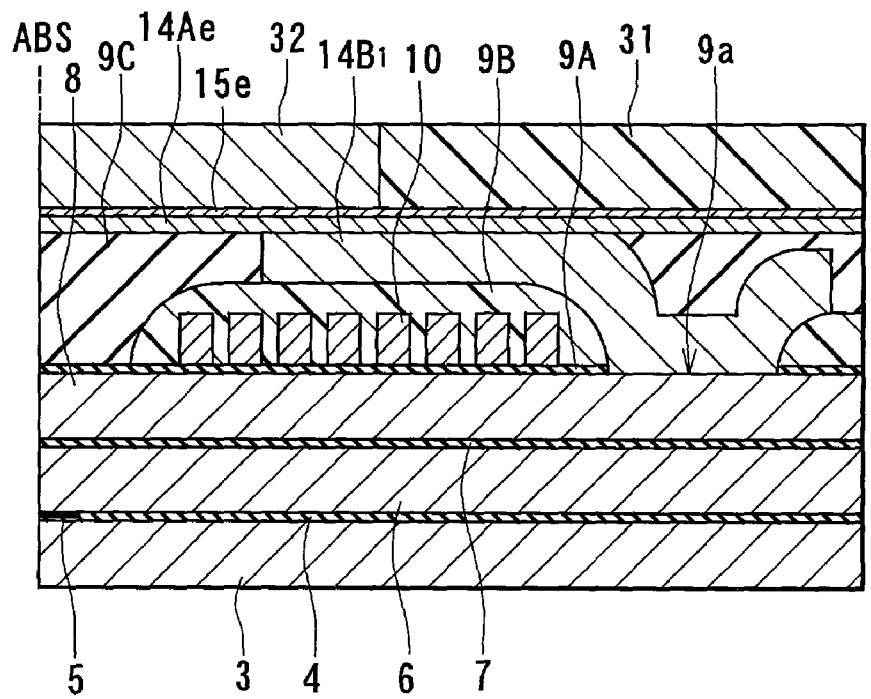
FIG. 49 is a cross-sectional view illustrating a step that follows FIG. 48.

Then, as shown in FIG. 49, the resist frame 31, which has a gap portion corresponding to the shape of the pole portion layer 14A, is formed of a photoresist on the aforementioned electrode layer by photolithography. Using the resist frame 31, a plating film that serves as the mask 32 corresponding to the shape of the pole portion layer 14A is formed on the aforementioned electrode layer by electroplating (frame plating). This plating film is 1 to 4 µm in thickness and made of an iron-nickel alloy, for example. The resist frame 31 is then removed.

Figure 50:
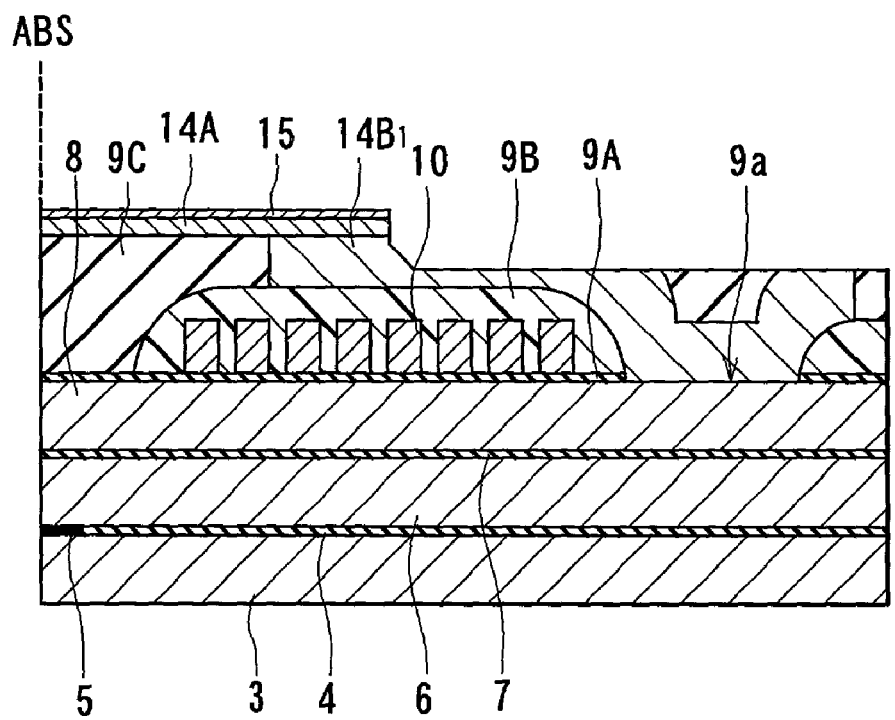
FIG. 50 is a cross-sectional view illustrating a step that follows FIG. 49.

Then, as shown in FIG. 50, using the mask 32, the non-magnetic layer 15e and the layer 14Ae are etched by dry etching such as ion milling to form the non-magnetic layer 15 and the pole portion layer 14A. At this stage, in the mask 32, at least the portion corresponding to the medium facing surface ABS is preferably removed completely, except in the case where the mask 32 is non-magnetic and sufficiently reliable in terms of resistance to corrosion and the like. Through the aforementioned etching, the non-magnetic layer 15 and the pole portion layer 14A are formed and the first layer 14B$_1$ of the yoke portion layer 14B is exposed.

Instead of forming the mask 32 of the plating film as described above, a photoresist may be formed into a patterned resist corresponding to the shape of the pole portion layer 14A on the non-magnetic layer 15e through photolithography. Then, this patterned resist may be used as a mask to etch the non-magnetic layer 15e and the layer 14Ae, so as to form the non-magnetic layer 15 and the pole portion layer 14A and to expose the first layer 14B$_1$ of the yoke portion layer 14B. Thereafter, the patterned resist may be removed.

Figure 51:
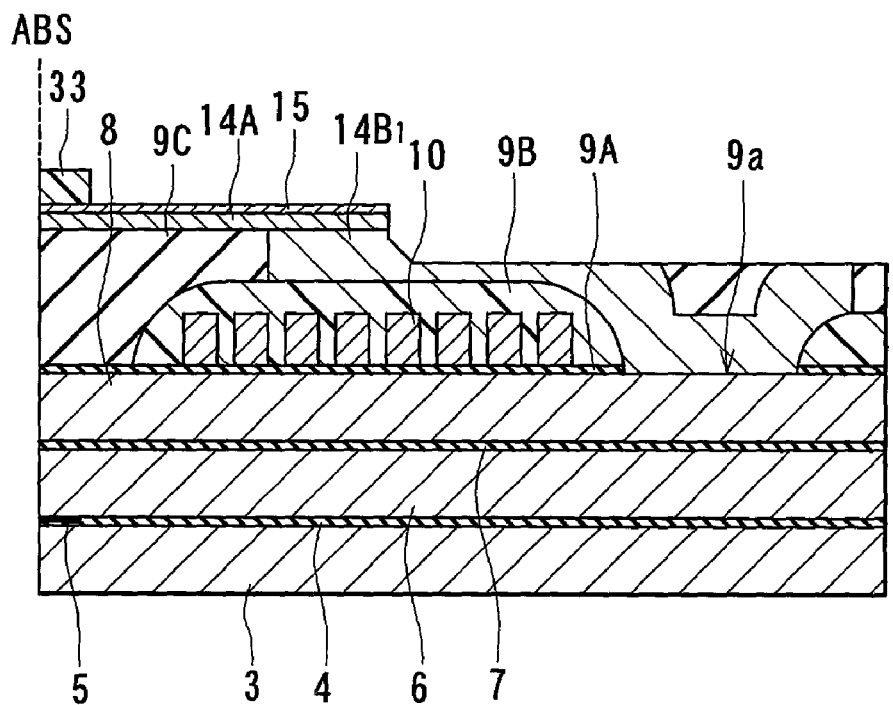
FIG. 51 is a cross-sectional view illustrating a step that follows FIG. 50.

Then, as shown in FIG. 51, the resist cover 33 is formed of a photoresist by photolithography to cover portions of the pole portion layer 14A and non-magnetic layer 15 located near the medium facing surface ABS. The resist cover 33 is preferably formed to have a thickness equal to or less than that of a frame for forming the yoke portion layer to be described later.

Figure 52:
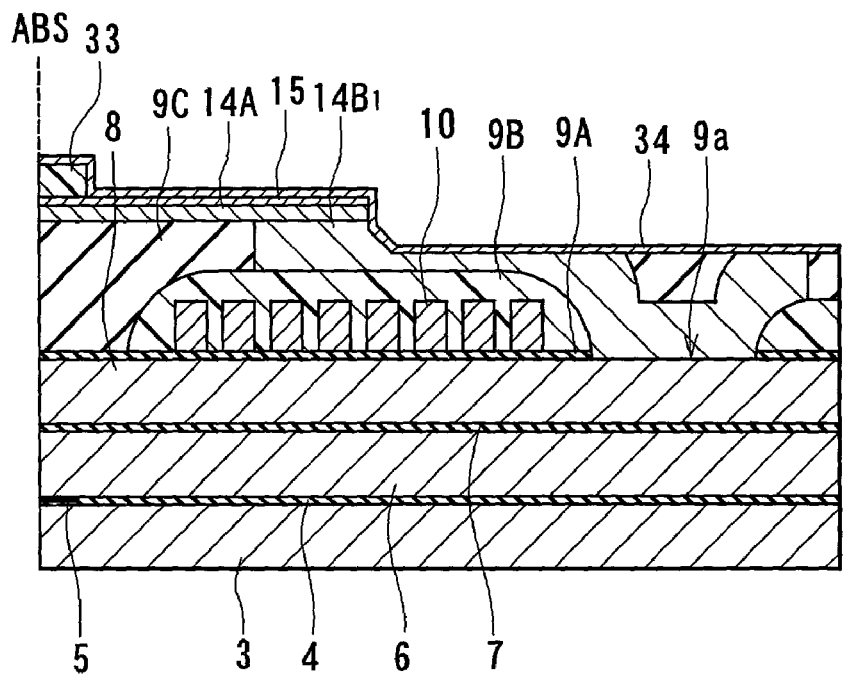
FIG. 52 is a cross-sectional view illustrating a step that follows FIG. 51.

Then, as shown in FIG. 52, the electrode layer 34 for electroplating is formed by sputtering on the resist cover 33, the pole portion layer 14A (and the non-magnetic layer 15), and the first layer 14B$_1$, of the yoke portion layer 14B. The electrode layer 34 may have a thickness of 0.1 µm or less, and may be formed of an iron-nickel alloy, with Ti (titanium) deposited to underlie the electrode layer 34.

Figure 53:
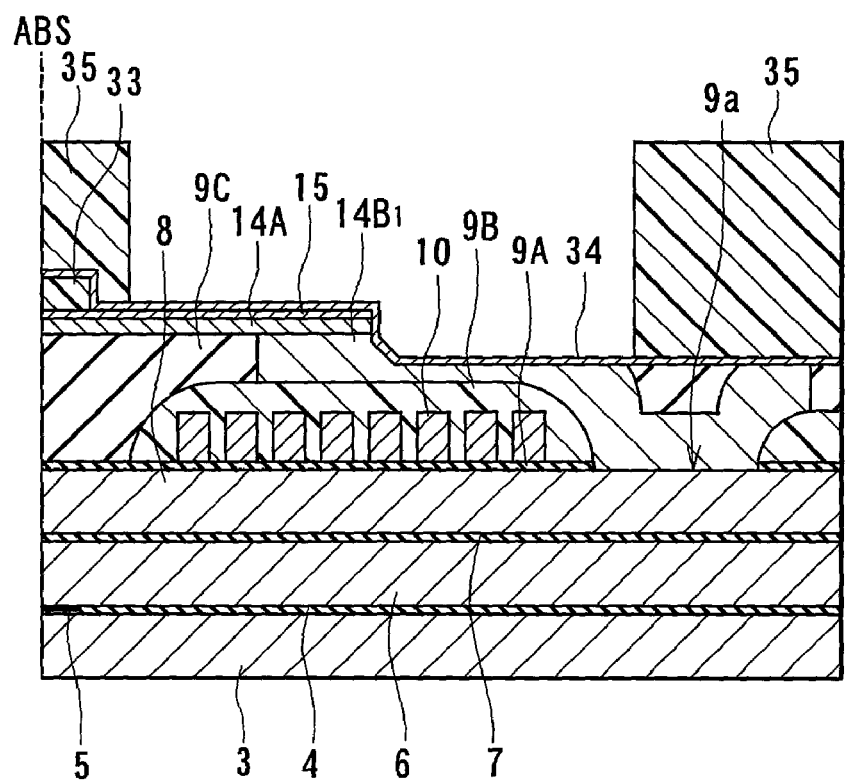
FIG. 53 is a cross-sectional view illustrating a step that follows FIG. 52.

Then, as shown in FIG. 53, the resist frame 35 having a gap portion corresponding to the shape of the second layer 14B$_2$ of the yoke portion layer 14B is formed of a photoresist on the electrode layer 34.

Figure 54:
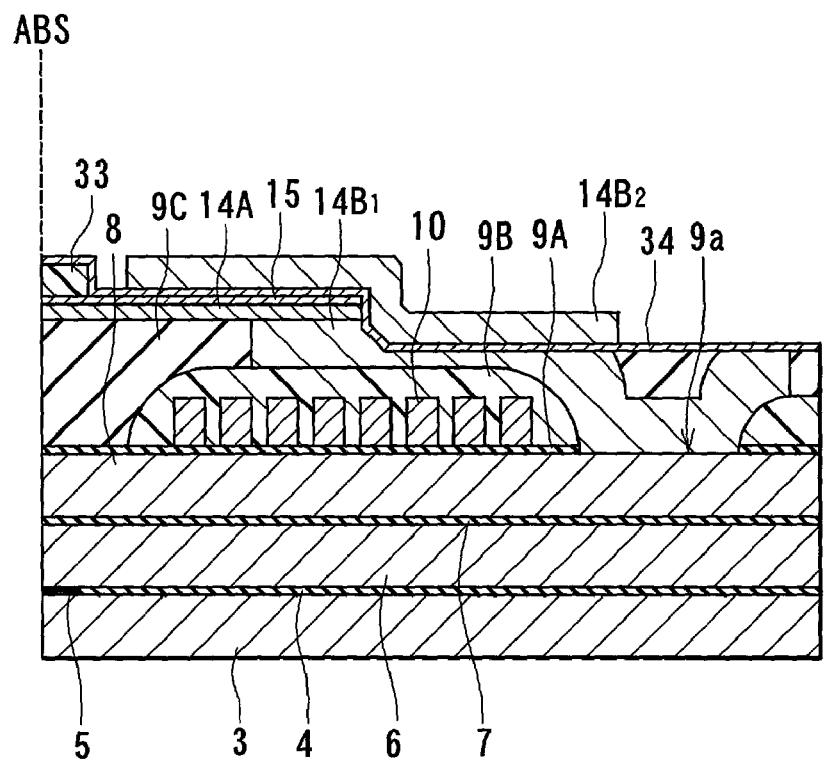
FIG. 54 is a cross-sectional view illustrating a step that follows FIG. 53.

Then, as shown in FIG. 54, using the resist frame 35, the second layer 14B$_2$ of the yoke portion layer 14B is formed on the electrode layer 34 by electroplating (frame plating). The resist frame 35 is then removed.

Figure 55:
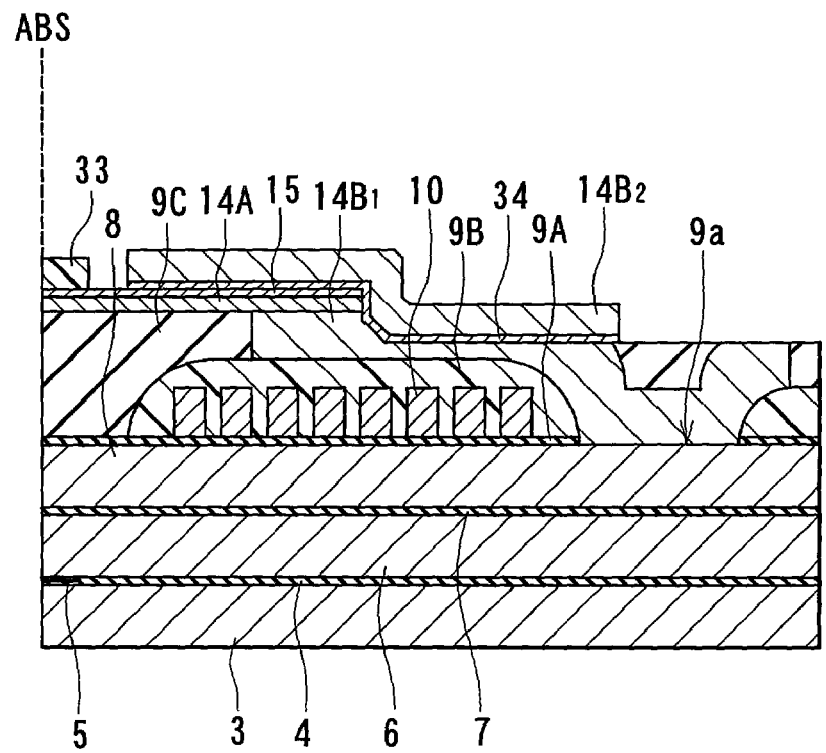
FIG. 55 is a cross-sectional view illustrating a step that follows FIG. 54.

Then, as shown in FIG. 55, the electrode layer 34 except for the portion underlying the second layer 14B$_2$ of the yoke portion layer 14B is removed by dry etching.

Figure 56:
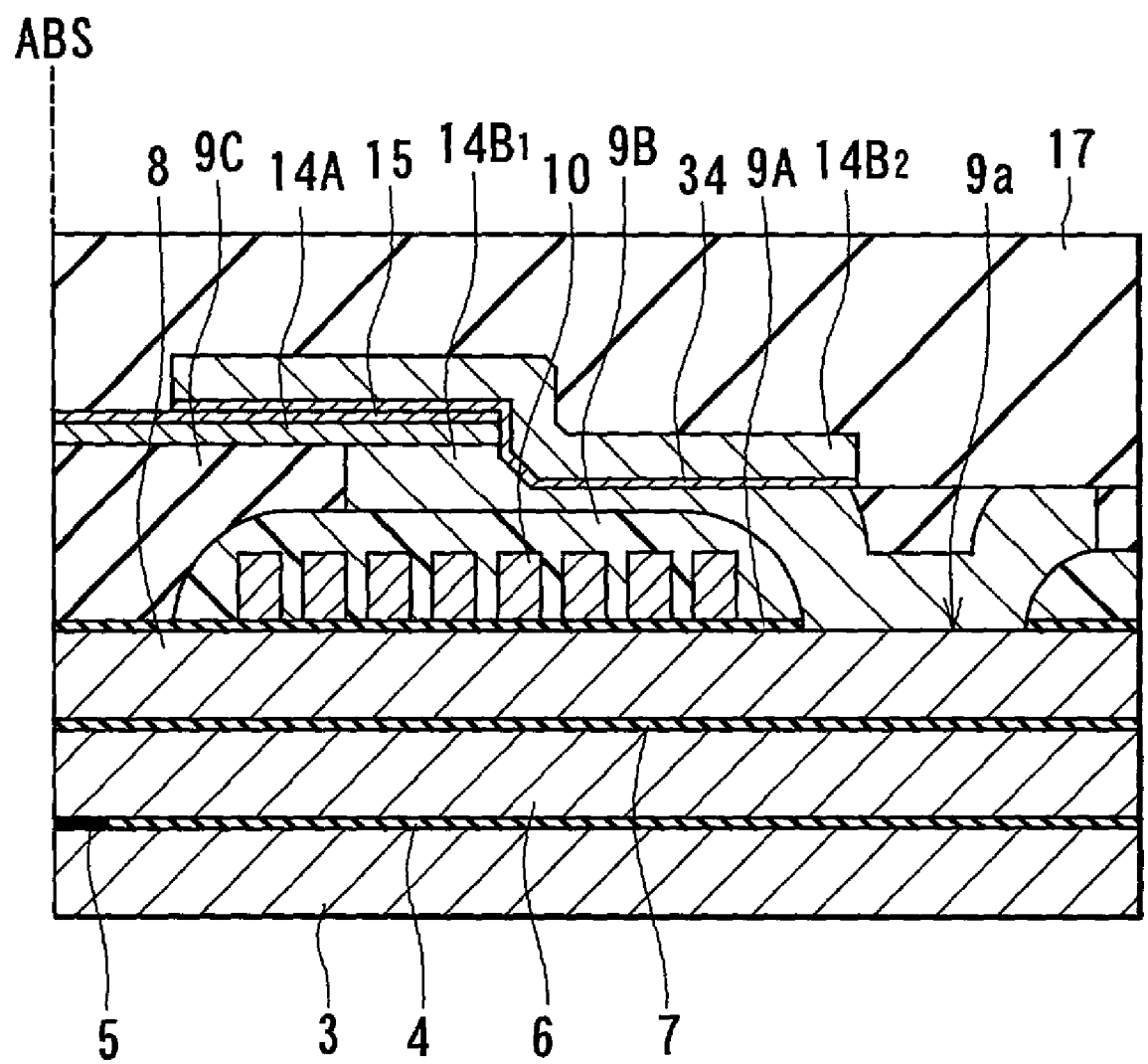
FIG. 56 is a cross-sectional view illustrating a step that follows FIG. 55.

Then, as shown in FIG. 56, the resist cover 33 is removed. Subsequently, the protective layer 17 is formed so as to cover the second magnetic layer 14. Then, through the steps of forming leads, terminals and the like on the protective layer 17, cutting the substrate for each slider, polishing the medium facing surface ABS, preparing rails for flying and so on, the thin-film magnetic head is completed.

Like the thin-film magnetic head shown in FIG. 29, this embodiment may be modified such that the top shield layer 6 and the non-magnetic layer 7 are eliminated and the first magnetic layer 8 functions as the top shield layer 6, too. The remainder of the structure, functions and effects of this embodiment are similar to those of the second embodiment.

Fourth Embodiment

Figure 57:
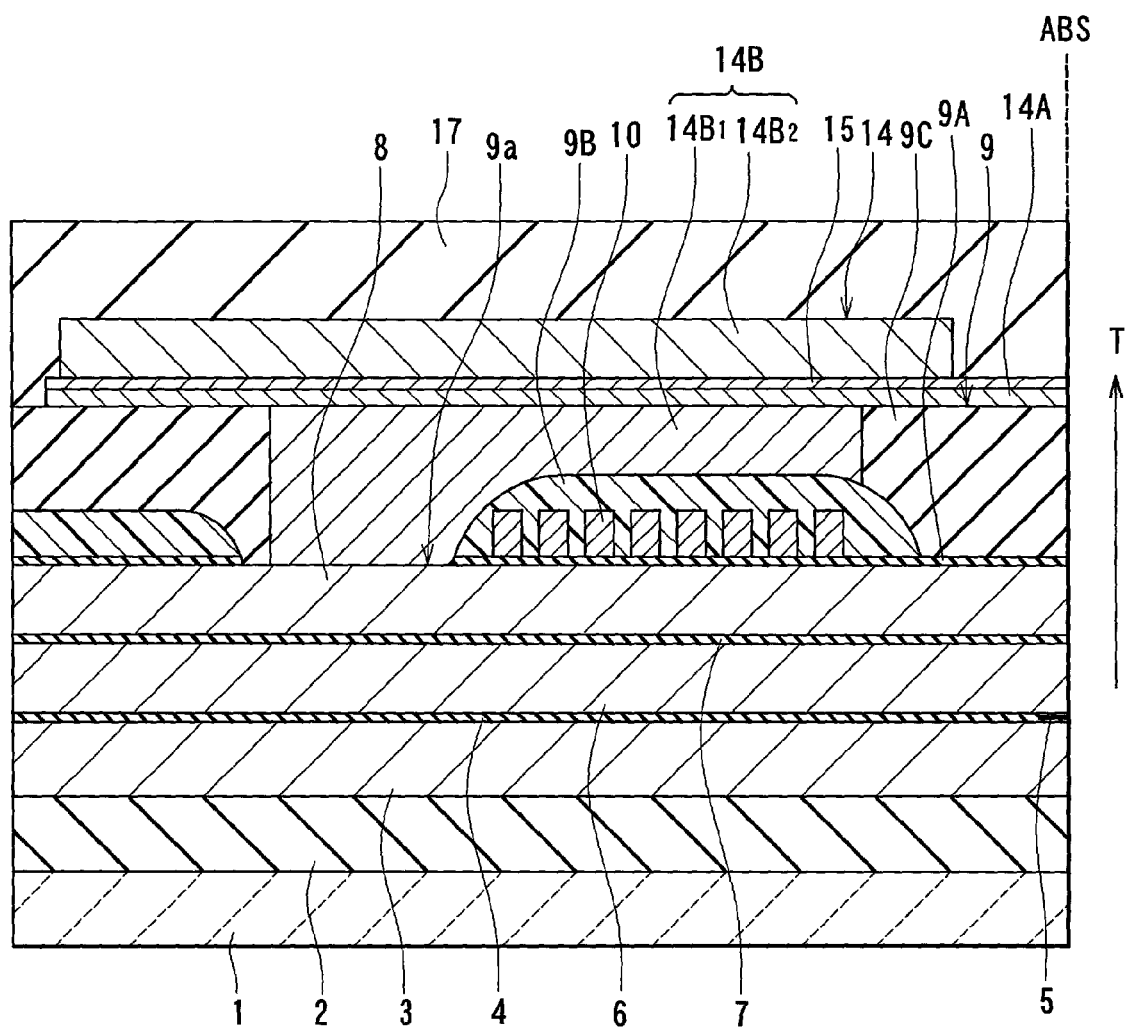
FIG. 57 is a cross-sectional view illustrating the structure of a thin-film magnetic head according to a fourth embodiment of the invention.
Figure 58:
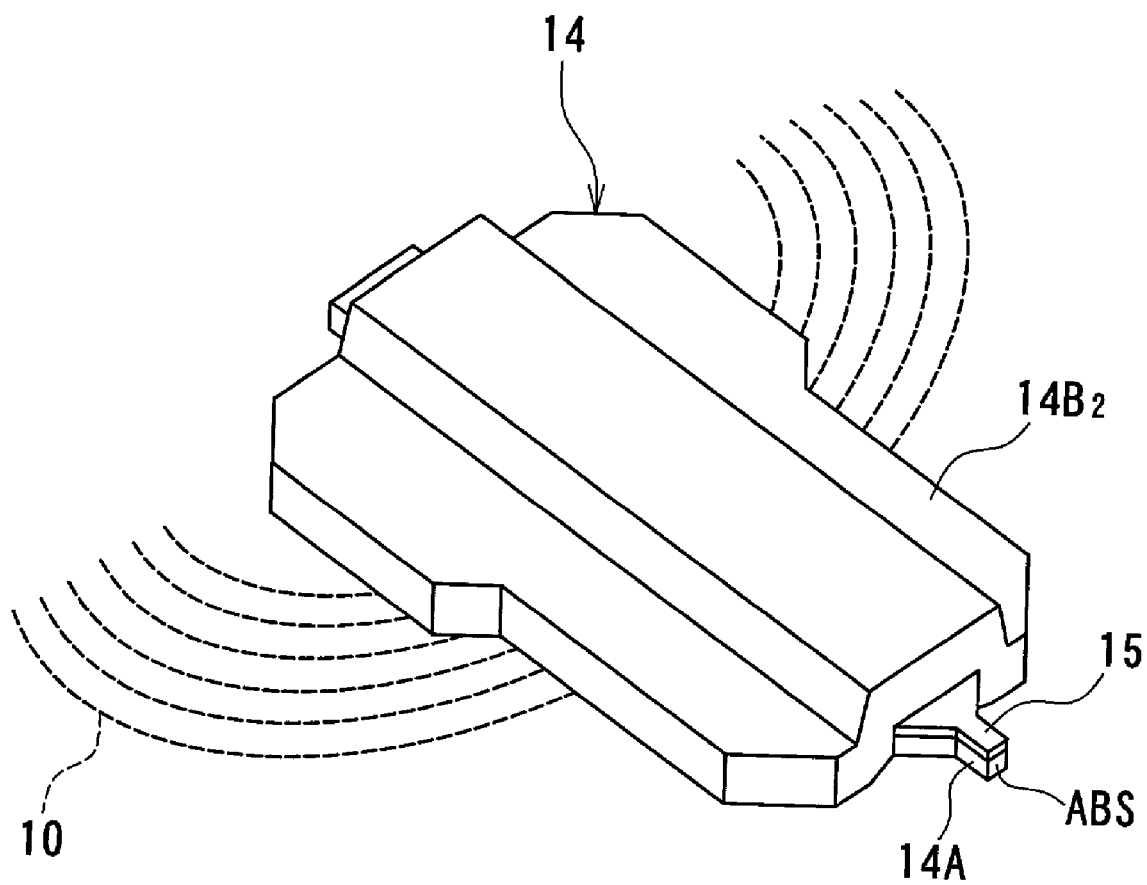
FIG. 58 is a perspective view illustrating the main part of the thin-film magnetic head shown in FIG. 57.

A thin-film magnetic head according to a fourth embodiment of the invention will now be explained with reference to FIGS. 57 and 58. FIG. 57 is a cross-sectional view illustrating the structure of the thin-film magnetic head of this embodiment. FIG. 57 shows a cross section orthogonal to the medium facing surface and the surface of the substrate. In addition, the arrow indicated by symbol T in FIG. 57 shows the traveling direction of a recording medium. FIG. 58 is a perspective view illustrating the main part of the thin-film magnetic head shown in FIG. 57.

In this embodiment, the top surfaces of the first layer 14B$_1$ of the yoke portion layer 14B and the gap layer 9 are flattened together so as to form one plane. In this embodiment, the pole portion layer 14A is formed on the flattened first layer 14B$_1$ and gap layer 9, and the non-magnetic layer 15 is formed on the pole portion layer 14A. In this embodiment, the end of each of the pole portion layer 14A and non-magnetic layer 15 opposite to the medium facing surface ABS is located farther from the medium facing surface ABS than the portion where the first magnetic layer 8 and the first layer 14B$_1$ are magnetically coupled to each other.

In addition, the end of the second layer 14B$_2$ of the yoke portion layer 14B opposite to the medium facing surface ABS reaches near the end of each of the pole portion layer 14A and non-magnetic layer 15 opposite to the medium facing surface ABS. In this embodiment, the second layer 14B$_2$ is not in contact with the rear end of the pole portion layer 14A, but is in contact with both side surfaces of the pole portion layer 14A in the width direction. The second layer 14B$_2$ is magnetically connected to the top surface of the pole portion layer 14A via the non-magnetic layer 15. Therefore, in this embodiment, the yoke portion layer 14B is in direct contact with and magnetically connected to the pole portion layer 14A at the surface of the pole portion layer 14A closer to the gap layer 9 and both side surfaces of the pole portion layer 14A in the width direction, and is also magnetically connected to the top surface of the pole portion layer 14A via the non-magnetic layer 15.

The method of manufacturing the thin-film magnetic head according to this embodiment is the same as that of the second embodiment.

Like the thin-film magnetic head shown in FIG. 29, this embodiment may be modified such that the top shield layer 6 and the non-magnetic layer 7 are eliminated and the first magnetic layer 8 functions as the top shield layer 6, too. The remainder of the structure, functions and effects of this embodiment are similar to those of the second embodiment.

Fifth Embodiment

Figure 59:
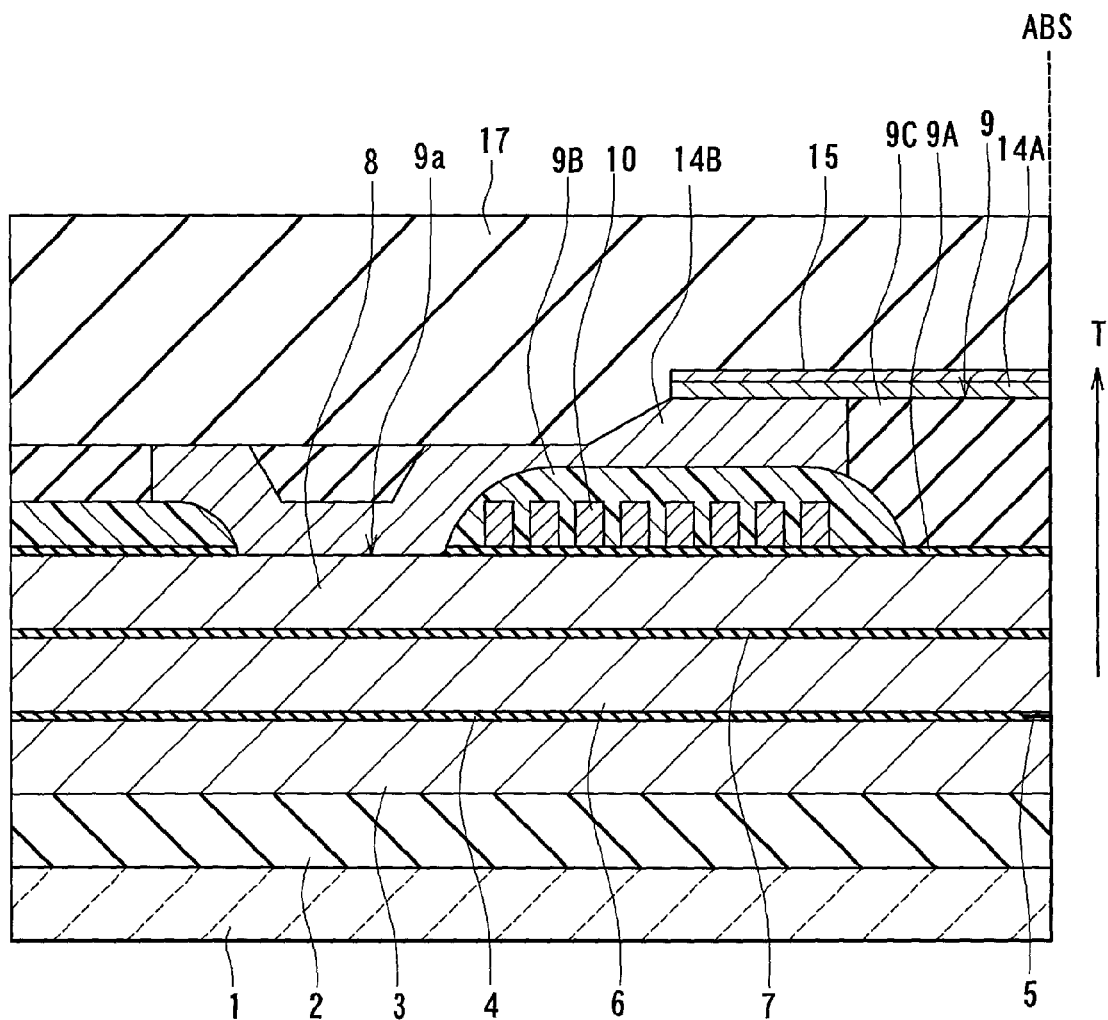
FIG. 59 is a cross-sectional view illustrating the structure of a thin-film magnetic head according to a fifth embodiment of the invention.
Figure 60:
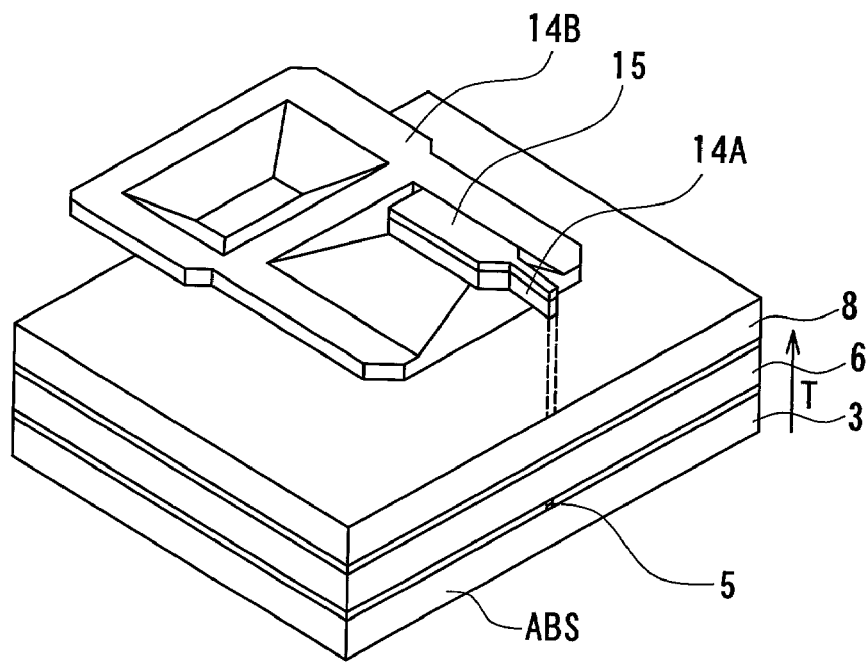
FIG. 60 is a perspective view illustrating the main part of the thin-film magnetic head shown in FIG. 59.
Figure 61:
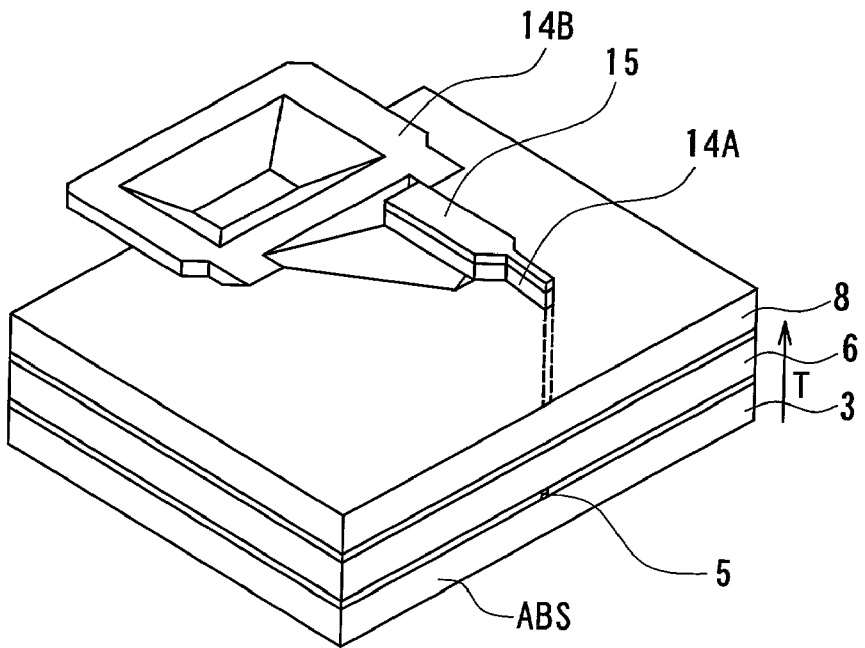
FIG. 61 is a cross-sectional view illustrating the main part of a modified example of the thin-film magnetic head shown in FIG. 59.

A thin-film magnetic head according to a fifth embodiment of the invention will now be explained with reference to FIGS. 59 to 61. FIG. 59 is a cross-sectional view illustrating the structure of the thin-film magnetic head of this embodiment. FIG. 59 shows a cross section orthogonal to the medium facing surface and the surface of the substrate. In addition, the arrow indicated by symbol T in FIG. 59 shows the traveling direction of a recording medium. FIG. 60 is a perspective view illustrating the main part of the thin-film magnetic head shown in FIG. 59. FIG. 61 is a perspective view illustrating the main part of a modified example of the thin-film magnetic head shown in FIG. 59. In FIGS. 60 and 61, the gap layer 9 and the thin-film coil 10 are not shown.

The thin-film magnetic head of this embodiment is configured such that the second layer $14B_2$ of the yoke portion layer 14B of the third embodiment is eliminated. That is, the yoke portion layer 14B of this embodiment has a shape similar to that of the first layer $14B_1$ of the yoke portion layer 14B of the third embodiment. Therefore, in this embodiment, the yoke portion layer 14B is magnetically connected to the pole portion layer 14A at the surface of the pole portion layer 14A closer to the gap layer 9. At least part of the portion where the yoke portion layer 14B and the pole portion layer 14A are connected to each other is located closer to the medium facing surface ABS than the portion where the first magnetic layer 8 and the yoke portion layer 14B are connected to each other.

The method of manufacturing the thin-film magnetic head according to this embodiment eliminates the step of forming the second layer $14B_2$ in the third embodiment.

In this embodiment, of the surface of the yoke portion layer 14B farther from the first magnetic layer 8, a portion that is not in contact with the pole portion layer 14A is located closer to the first magnetic layer 8 than the surface of the pole portion layer 14A adjacent to the gap layer 9. In addition, at least part of the surface of the yoke portion layer 14B farther from the first magnetic layer 8 gradually approaches the first magnetic layer 8 as the distance from the pole portion layer 14A increases. The shape of the surface of the yoke portion layer 14B farther from the first magnetic layer 8 as described above is defined by the etching in forming the pole portion layer 14A.

FIG. 60 shows the case where the yoke portion layer 14B has the same shape as that of the first layer $14B_1$ of the yoke portion layer 14B in the second embodiment. In contrast to this, FIG. 61 shows the case where the insulating layer 9B is made greater in thickness than in the second embodiment and the thickness of part of the yoke portion layer 14B located near the medium facing surface ABS is made smaller than that in FIG. 60.

In this embodiment, by forming the yoke portion layer 14B to have such a shape as described above, it becomes possible to magnetically connect the pole portion layer 14A to the first magnetic layer 8 in a short distance with the yoke portion layer 14B, without necessitating an excessive increase in volume of the yoke portion layer 14B.

Furthermore, in this embodiment the yoke portion layer 14B is made up of a single layer, which simplifies the structure and manufacture of the thin-film magnetic head as compared with the other embodiments.

Like the thin-film magnetic head shown in FIG. 29, this embodiment may be modified such that the top shield layer 6 and the non-magnetic layer 7 are eliminated and the first magnetic layer 8 functions as the top shield layer 6, too. The remainder of the structure, functions and effects of this embodiment are similar to those of the third embodiment.

Sixth Embodiment

Figure 62:
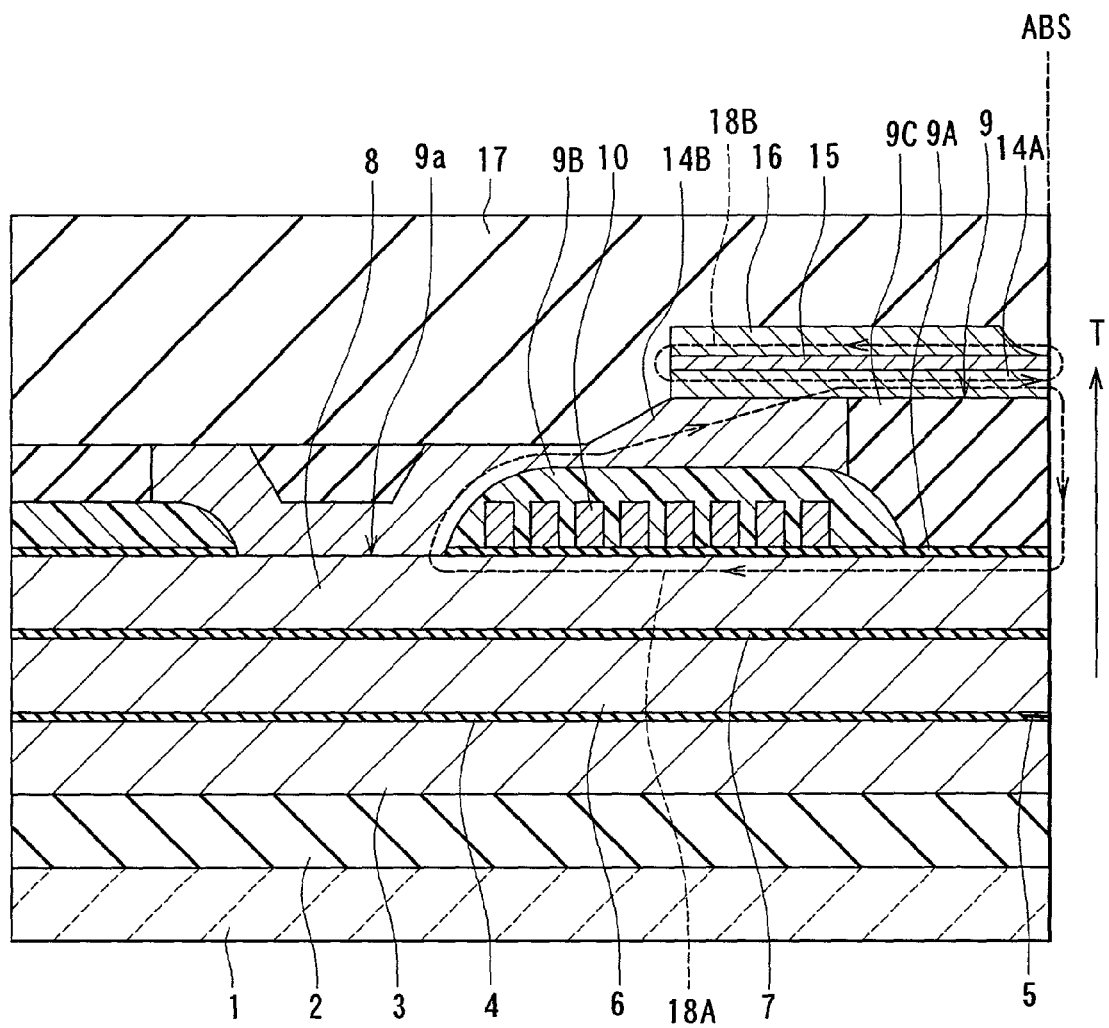
FIG. 62 is a cross-sectional view illustrating the structure of a thin-film magnetic head according to a sixth embodiment of the invention.
Figure 63:
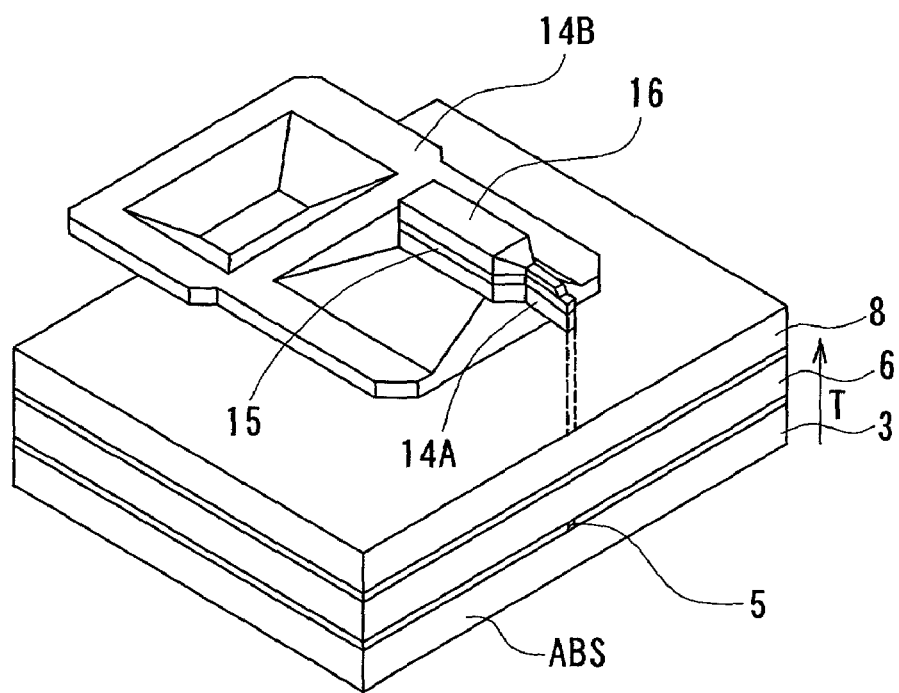
FIG. 63 is a perspective view illustrating the main part of the thin-film magnetic head shown in FIG. 62.

A thin-film magnetic head according to a sixth embodiment of the invention will now be explained with reference to FIGS. 62 and 63. FIG. 62 is a cross-sectional view illustrating the structure of the thin-film magnetic head of this embodiment. FIG. 62 shows a cross section orthogonal to the medium facing surface and the surface of the substrate. In addition, the arrow indicated by symbol T in FIG. 62 shows the traveling direction of a recording medium. FIG. 63 is a perspective view illustrating the main part of the thin-film magnetic head shown in FIG. 62. The gap layer 9 and the thin-film coil 10 are not shown in FIG. 63.

In the thin-film magnetic head of this embodiment, a third magnetic layer 16 made of a magnetic material is provided on the non-magnetic layer 15 of the fifth embodiment. The end of the third magnetic layer 16 closer to the medium facing surface ABS is located at a distance from the medium facing surface ABS. In addition, in part of the third magnetic layer 16 located near the medium facing surface ABS, the surface thereof located farther from the non-magnetic layer 15 gradually gets closer to the non-magnetic layer 15 as the distance from the medium facing surface ABS decreases.

Now, referring to FIGS. 64 to 66, a method of manufacturing the thin-film magnetic head of this embodiment is explained below.

The method of manufacturing the thin-film magnetic head of this embodiment employs the same steps as those of the third embodiment up to the step of forming the non-magnetic layer 15e on the layer 14Ae to be etched, as shown in FIG. 48. In this embodiment, although not shown, an electrode layer for electroplating is formed by sputtering on the non-magnetic layer 15e. This electrode layer is 0.1 μm or less in thickness and made of an iron-nickel alloy, for example.

Figure 64:
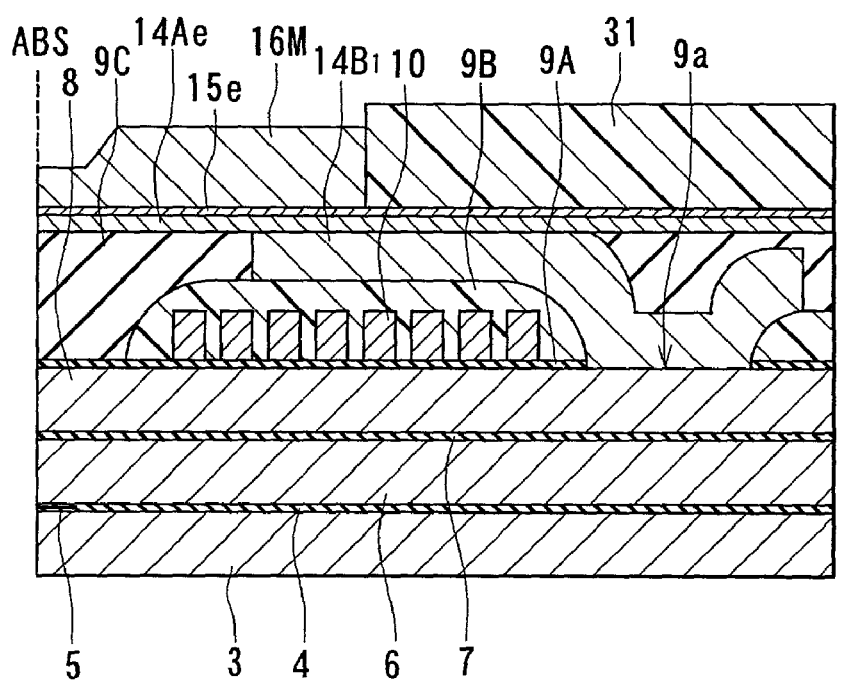
FIG. 64 is a cross-sectional view illustrating a step of a method of manufacturing the thin-film magnetic head according to the sixth embodiment of the invention.

Then, as shown in FIG. 64, the resist frame 31, which has a gap portion corresponding to the shape of the pole portion layer 14A, is formed of a photoresist on the aforementioned electrode layer by photolithography. The shape of the resist frame 31 according to this embodiment will be explained later in detail.

Then, using the resist frame 31, a plating film that serves as a mask 16M corresponding to the shape of the pole portion layer 14A is formed on the aforementioned electrode layer by electroplating (frame plating). This mask 16M is formed of a magnetic material such as an iron-nickel alloy in this embodiment. The shape of the mask 16M will be explained later in detail. Then, the resist frame 31 is removed.

Figure 65:
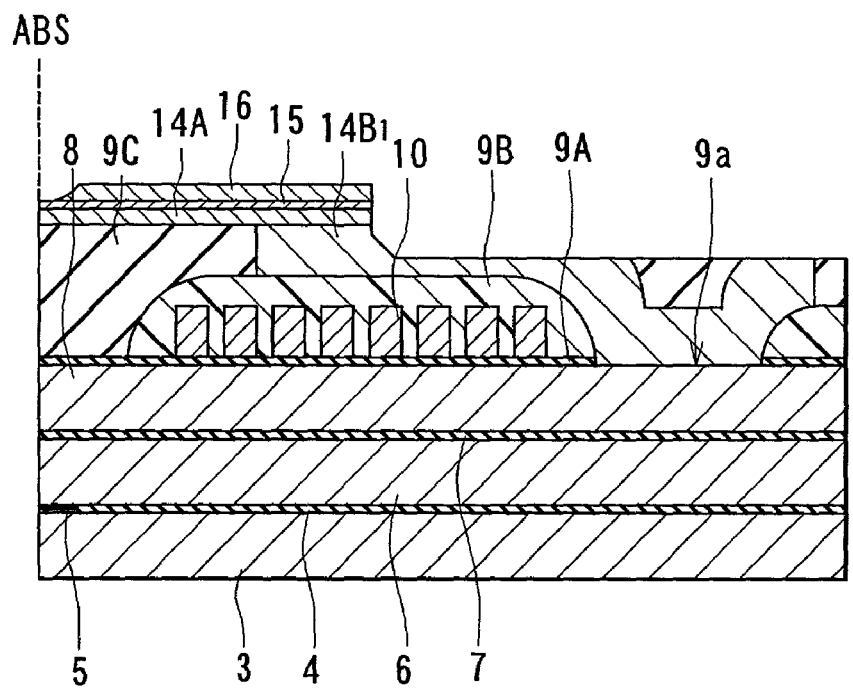
FIG. 65 is a cross-sectional view illustrating a step that follows FIG. 64.

Then, as shown in FIG. 65, using the mask 16M, the non-magnetic layer 15e and the layer 14Ae are etched by dry etching such as ion milling to form the non-magnetic layer 15 and the pole portion layer 14A. At this stage, part of the mask 16M is also etched. The remaining portion of the mask 16M after the etching serves as the third magnetic layer 16. Through the aforementioned etching, the non-magnetic layer 15 and the pole portion layer 14A are formed and the first layer $14B_1$ of the yoke portion layer 14B is exposed.

If the mask 16M is completely removed through the aforementioned etching, the resulting thin-film magnetic head will have the same structure as that of the fifth embodiment.

Figure 66:
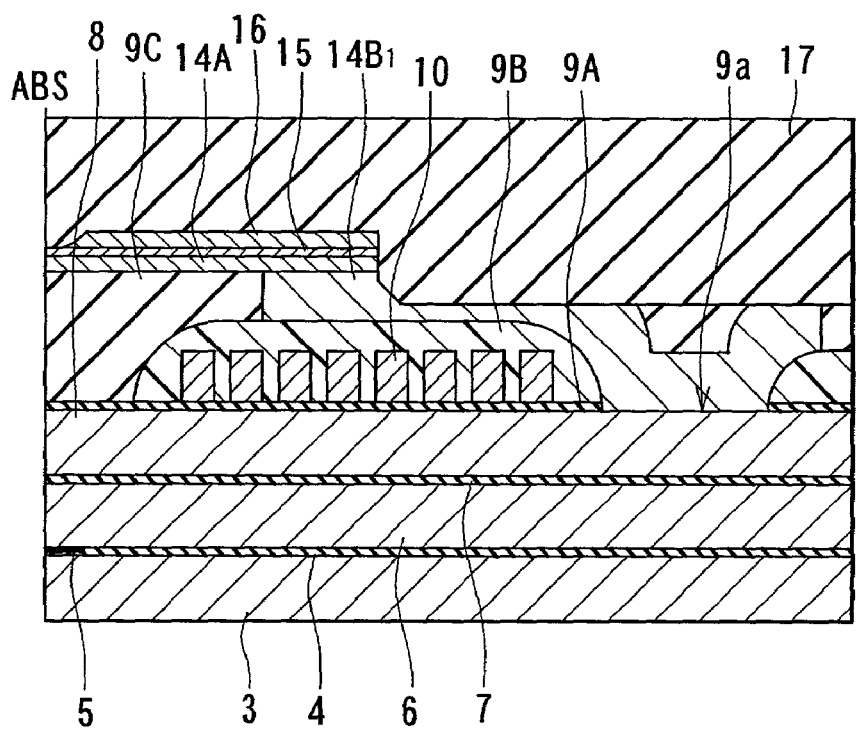
FIG. 66 is a cross-sectional view illustrating a step that follows FIG. 65.

Then, as shown in FIG. 66, the protective layer 17 is formed so as to cover the entirety. Then, through the steps of forming leads, terminals and the like on the protective layer 17, cutting the substrate for each slider, polishing the medium facing surface ABS, preparing rails for flying and so on, the thin-film magnetic head is completed.

Figure 67:
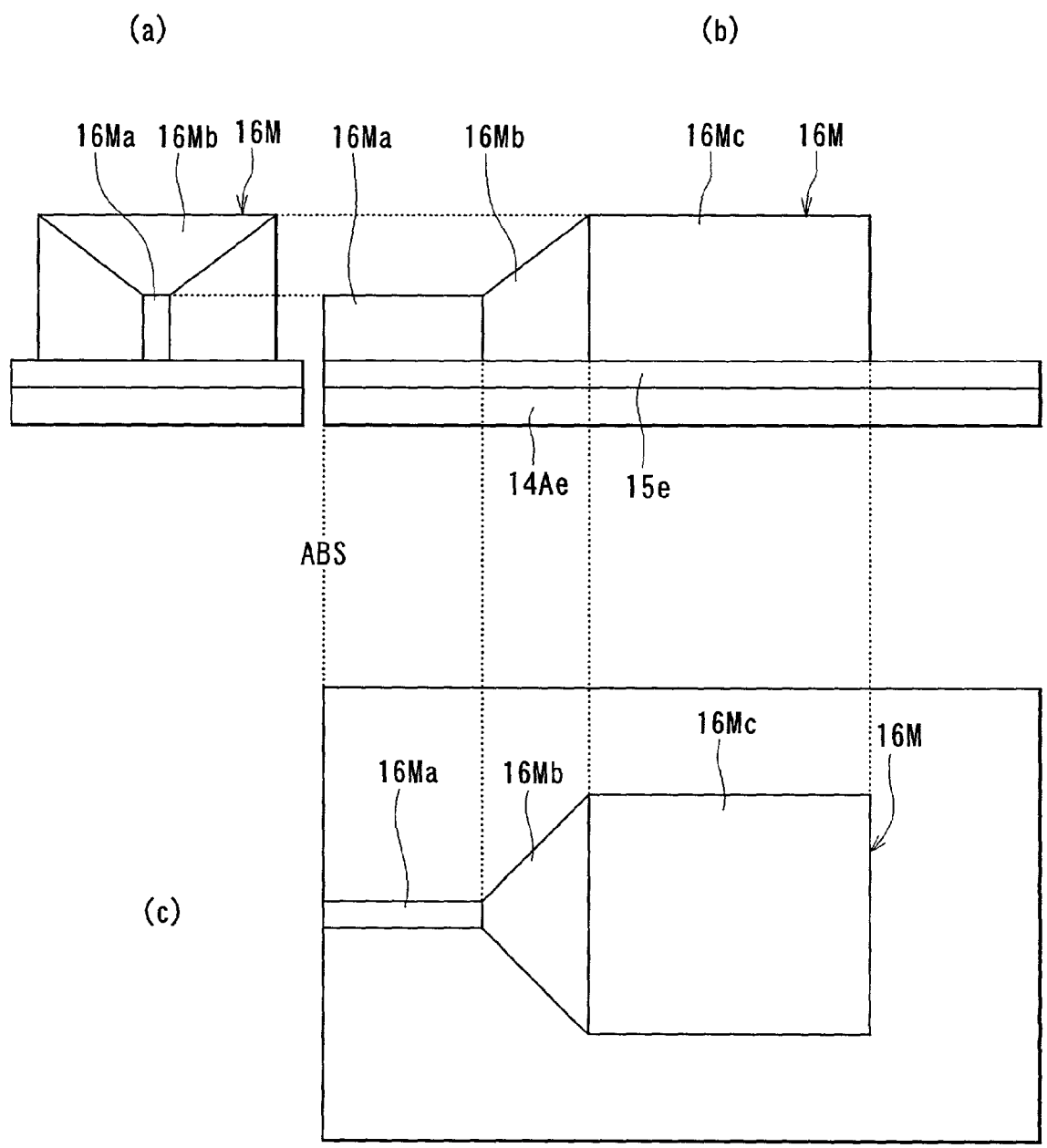
FIG. 67 is an explanatory view illustrating the shape of a mask according to a sixth embodiment of the invention.

Now, referring to FIG. 67, the shape of the mask 16M according to this embodiment is explained below. FIG. 67 illustrates the mask 16M as viewed: (a) from the medium facing surface ABS; (b) from a surface perpendicular to the medium facing surface ABS and the substrate; and (c) from above the top surface of the substrate. As shown in FIG. 67, the mask 16M has a first portion 16Ma that is located closest to the medium facing surface ABS, a second portion 16Mb disposed on the side of the first portion 16Ma opposite to the medium facing surface ABS, and a third portion 16Mc disposed on the side of the second portion 16Mb opposite to the medium facing surface ABS. The first portion 16Ma is smaller than the third portion 16Mc in width and thickness. The second portion 16Mb is equal to the first portion 16Ma in width and thickness at the interface with the first portion 16Ma, being equal to the third portion 16Mc in width and thickness at the interface with the third portion 16Mc, and gradually varying in width and thickness at the intermediate portion therebetween.

Figure 68:
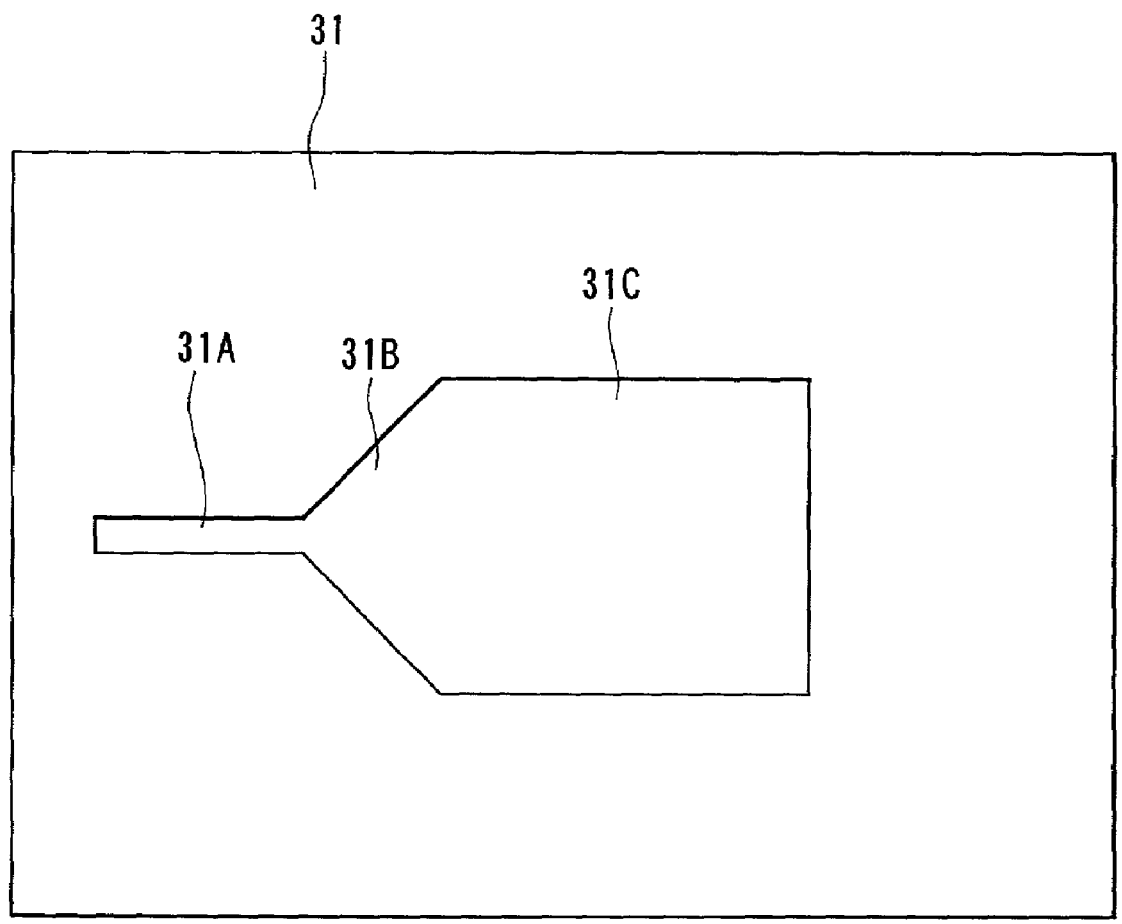
FIG. 68 is a plan view illustrating a resist frame for forming the mask shown in FIG. 67.

FIG. 68 is a plan view illustrating the resist frame 31 for forming the mask 16M shown in FIG. 67. The resist frame 31 has a gap portion corresponding to the outer shape of the mask 16M. That is, the gap portion has a first portion 31A, a second portion 31B, and a third portion 31C, which correspond to the outer shapes of the first portion 16Ma, the second portion 16Mb, and the third portion 16Mc of the mask 16M, respectively. The first portion 31A is smaller than the third portion 31C in width. The width of the second portion 31B is equal to that of the first portion 31A at the interface with the first portion 31A, equal to the third portion 31C at the interface with the third portion 31C, and the width gradually varies at the intermediate portion therebetween.

Figure 69:
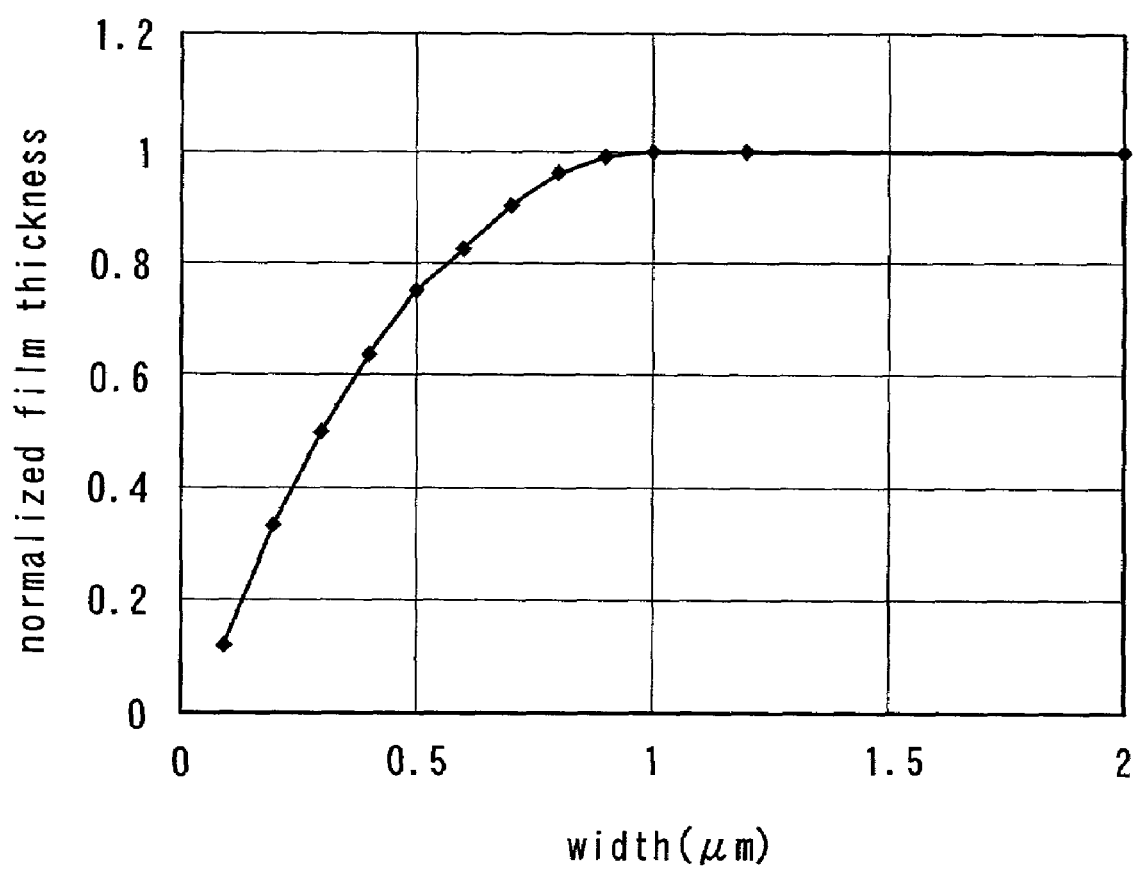
FIG. 69 is a characteristic view illustrating an example of the relationship between the width of a gap of the resist frame and the thickness of a plating film.

Incidentally, it should be noted that when a plating film is formed by electroplating (frame plating) using a resist frame, the thickness of the plating film depends on the width of a gap portion of the resist frame. When it is desired to intentionally enhance this dependency, both ends of the resist frame facing the gap portion may be inclined such that the width of the gap portion becomes greater toward the top of the resist frame. FIG. 69 shows an example of the relationship between the width of the gap portion of the resist frame and the thickness of the plating film (normalized film thickness). The diagram illustrates an example in which the plating film is formed of NiFe (80 wt % of Ni and 20 wt % of Fe). In this example, the thickness of the plating film is constant when the width of the gap portion of the resist frame is 1 µm or more. However, when the width of the gap portion is less than 1 µm, the thickness of the plating film decreases as the width of the gap portion decreases.

For example, suppose that the mask 16M is to be formed of NiFe (80 wt % of Ni and 20 wt % of Fe). In this case, if the width of the first portion 31A of the gap portion of the resist frame 31 shown in FIG. 68 is made below 1 µm and the width of the third portion 31C is made equal to or greater than 1 µm, it is possible to form the mask 16M having the shape shown in FIG. 67 through the use of this resist frame 31.

If the mask 16M having the shape shown in FIG. 67 is used to etch the non-magnetic layer 15e and the layer 14Ae by dry etching such as ion milling, the etching will cause part of the mask 16M to be etched as well. The first portion 16Ma of the mask 16M, disposed closest to the medium facing surface ABS, is smaller than the other portion in thickness. Therefore, part of the mask 16M located near the medium facing surface ABS can be completely removed by the etching, whereas the other part can remain. This makes it possible to form the third magnetic layer 16 having the shape shown in FIG. 62.

Figure 71:
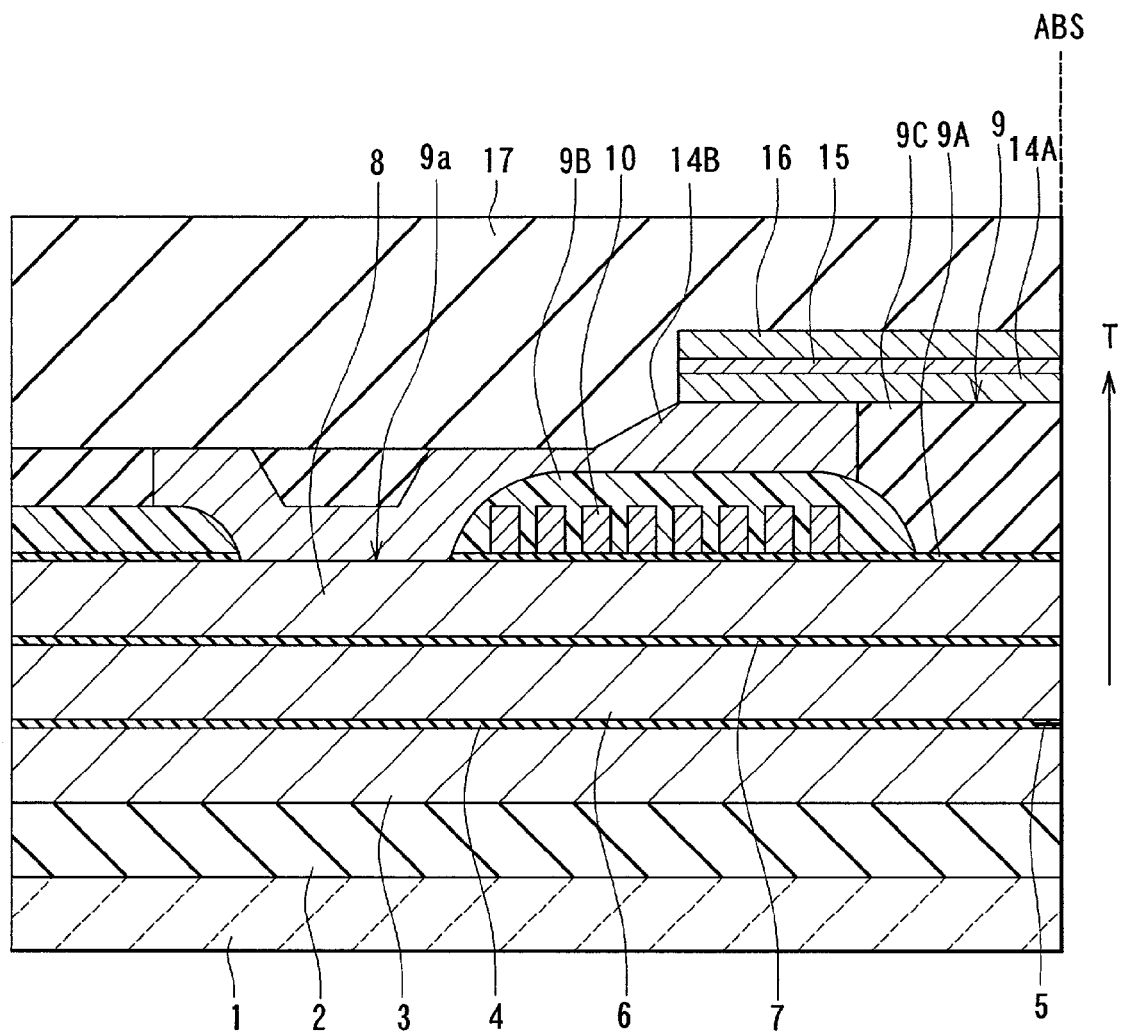
FIG. 71 is a cross-sectional view illustrating the structure of a thin-film magnetic head according to a first modified example of the sixth embodiment of the invention.

FIG. 62 illustrates an example in which the end of the third magnetic layer 16 closer to the medium facing surface ABS is not exposed in the medium facing surface ABS. However, as shown in FIGS. 70 and 71, the end of the third magnetic layer 16 closer to the medium facing surface ABS may be exposed in the medium facing surface ABS. In this case, as shown in FIG. 70, in part of the third magnetic layer 16 located near the medium facing surface ABS, the surface thereof located farther from the non-magnetic layer 15 may gradually get closer to the non-magnetic layer 15 as the distance from the medium facing surface ABS decreases. Alternatively, as shown in FIG. 71, the surface of the third magnetic layer 16 farther from the non-magnetic layer 15 may be located at a substantially constant distance from the non-magnetic layer 15.

If the end of the third magnetic layer 16 closer to the medium facing surface ABS is exposed in the medium facing surface ABS, it is preferable that the third magnetic layer 16 has a saturated magnetic flux density lower than that of the pole portion layer 14A, so that information that has been once written onto the recording medium will not be erased by a magnetic field produced from the third magnetic layer 16. If the end of the third magnetic layer 16 closer to the medium facing surface ABS is not exposed in the medium facing surface ABS, it is possible to prevent the information that has been once written onto the recording medium from being erased by the magnetic field produced from the third magnetic layer 16, even if the saturated magnetic flux density of the third magnetic layer 16 is not lower than that of the pole portion layer 14A.

In the thin-film magnetic head of this embodiment, as shown in FIG. 62, formed are two magnetic paths 18A and 18B which are magnetic paths that pass through the pole portion layer 14A. The magnetic path 18A passes through the pole portion layer 14A, the recording medium, the first magnetic layer 8, and the yoke portion layer 14B. On the other hand, the magnetic path 18B passes through the pole portion layer 14A, the recording medium, and the third magnetic layer 16.

In the thin-film magnetic head of this embodiment, the third magnetic layer 16 is provided on the non-magnetic layer 15 on the surface of the pole portion layer 14A farther from the gap layer 9. This causes part of the magnetic flux flowing from the pole portion layer 14A to the recording medium to flow into the third magnetic layer 16 via the recording medium. As a result, in the medium facing surface ABS, the magnetic field tends to concentrate in the vicinity of the end of the pole portion layer 14A farther from the gap layer 9, and the magnetic field gradient becomes sharp at that portion. Accordingly, this embodiment makes it possible to prevent the bit pattern of the recording medium from being distorted in shape and thereby improve the linear recording density.

According to the method of manufacturing the thin-film magnetic head of this embodiment, the mask 16M, which is used in the etching for defining the outer shape of the pole portion layer 14A, is formed of a magnetic material. This allows the mask 16M to have a good resistance to dry etching. Accordingly, even when the material forming the pole portion layer 14A has a good resistance to dry etching, it is possible to define the outer shape of the pole portion layer 14A by dry etching using the mask 16M. Furthermore, in this embodiment, the remaining portion of the mask 16M after the etching can serve as the third magnetic layer 16. By thus providing the third magnetic layer 16, it is possible to prevent the bit pattern of the recording medium from being distorted in shape and thereby improve the linear recording density.

As shown in FIG. 67, the mask 16M which is used in forming the pole portion layer 14A by dry etching has a varying thickness, and therefore, part of the mask 16M can be entirely removed in the thickness direction as a result of the etching. If this occurs, the layer underlying the mask 16M will be damaged and have surface irregularities. In this embodiment, however, the non-magnetic layer 15 is provided on the pole portion layer 14A to form the mask 16M on the non-magnetic layer 15. It is thereby possible to prevent the surface of the pole portion layer 14A farther from the gap layer 9 from being damaged by the etching, and to thereby allow the surface to be flat.

According to the method of manufacturing the thin-film magnetic head of this embodiment, as shown in FIG. 67, the mask 16M, part of which located near the medium facing surface ABS is smaller in thickness than the other part, is used to etch the non-magnetic layer 15e and the layer 14Ae. This makes it possible to perform the etching so that the part of the mask 16M located near the medium facing surface ABS is completely removed, allowing the other part to remain. By performing the etching as described above, it is possible to form the third magnetic layer 16 that is not exposed in the medium facing surface ABS. This prevents the third magnetic layer 16 from writing information onto the recording medium.

According to the method of manufacturing the thin-film magnetic head of this embodiment, as shown in FIG. 68, the resist frame 31 having the gap portion, part of the gap portion located near the medium facing surface ABS being smaller in width than the other part, is used to form the mask 16M by electroplating. This makes it possible to facilitate the formation of the mask 16M having the shape shown in FIG. 67.

In this embodiment, the third magnetic layer 16 may be provided independent from the mask for the etching, without using the remaining part of the mask 16M after the etching as described above.

This embodiment may be modified such that the entire surface of the third magnetic layer 16 farther from the non-magnetic layer 15 gradually gets closer to the non-magnetic layer 15 as the distance from the medium facing surface ABS decreases.

Like the thin-film magnetic head shown in FIG. 6, this embodiment may be modified such that the top shield layer 6 and the non-magnetic layer 7 are eliminated and the first magnetic layer 8 functions as the top shield layer 6, too.

The remainder of the structure, functions and effects of this embodiment are similar to those of the fifth embodiment.

Seventh Embodiment

Figure 72:
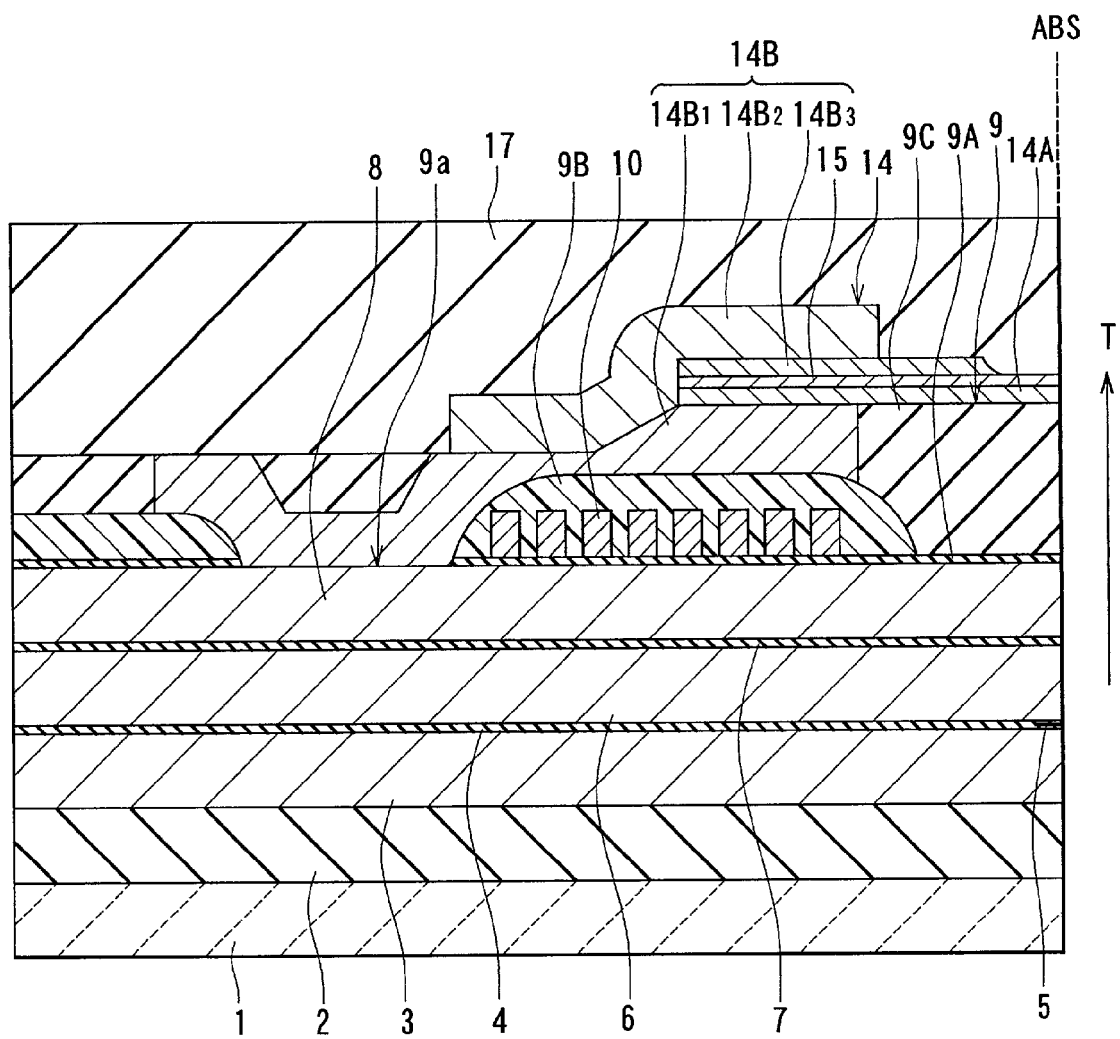
FIG. 72 is a cross-sectional view illustrating the structure of a thin-film magnetic head according to a seventh embodiment of the invention.
Figure 73:
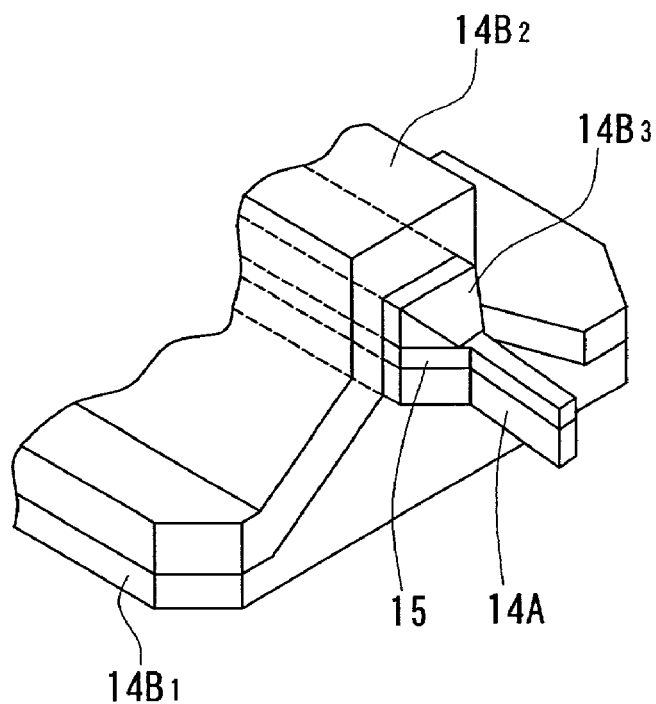
FIG. 73 is a perspective view illustrating the main part of the thin-film magnetic head shown in FIG. 72.

A thin-film magnetic head according to a seventh embodiment of the invention will now be explained with reference to FIGS. 72 and 73. FIG. 72 is a cross-sectional view illustrating the structure of the thin-film magnetic head of this embodiment. FIG. 72 shows a cross section orthogonal to the medium facing surface and the surface of the substrate. In addition, the arrow indicated by symbol T in FIG. 72 shows the traveling direction of a recording medium. FIG. 73 is a perspective view illustrating the main part of the thin-film magnetic head shown in FIG. 72. The gap layer 9 and the thin-film coil 10 are not shown in FIG. 73.

In the thin-film magnetic head of this embodiment, a third layer $14B_3$ of the yoke portion layer 14B, made of a magnetic material, is provided between the non-magnetic layer 15 and the second layer $14B_2$ of the yoke portion layer 14B of the third embodiment. The end of the third layer $14B_3$ closer to the medium facing surface ABS is located at a distance from the medium facing surface ABS. In addition, in part of the third layer $14B_3$ located near the medium facing surface ABS, the surface thereof located farther from the non-magnetic layer 15 gradually gets closer to the non-magnetic layer 15 as the distance from the medium facing surface ABS decreases. The third layer $14B_3$ is in contact with the non-magnetic layer 15 and therefore corresponds to the direct connection layer of the present invention. The second layer $14B_2$ is in contact with at least part of the surface of the third layer $14B_3$ farther from the non-magnetic layer 15, and therefore corresponds to the indirect connection layer of the present invention.

Now, referring to FIGS. 74 to 76, a method of manufacturing the thin-film magnetic head of this embodiment is explained below.

The method of manufacturing the thin-film magnetic head of this embodiment employs the same steps as those of the third embodiment up to the step of forming the non-magnetic layer 15e on the layer 14Ae to be etched, as shown in FIG. 48. In this embodiment, although not shown, an electrode layer for electroplating is formed by sputtering on the non-magnetic layer 15e. This electrode layer is 0.1 μm or less in thickness and made of an iron-nickel alloy, for example.

Figure 74:
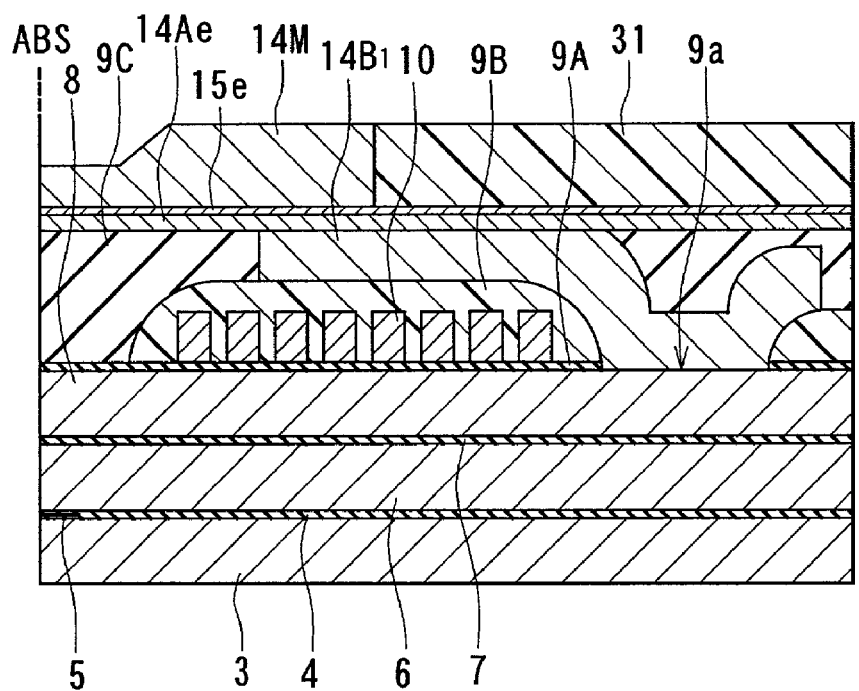
FIG. 74 is a cross-sectional view illustrating a step of a method of manufacturing the thin-film magnetic head according to the seventh embodiment of the invention.

Then, as shown in FIG. 74, the resist frame 31, which has a gap portion corresponding to the shape of the pole portion layer 14A, is formed of a photoresist on the aforementioned electrode layer by photolithography. Like in the sixth embodiment, the resist frame 31 of this embodiment has the shape shown in FIG. 68.

Then, using the resist frame 31, a plating film that serves as a mask 14M corresponding to the shape of the pole portion layer 14A is formed on the aforementioned electrode layer by electroplating (frame plating). This mask 14M is formed of a magnetic material such as an iron-nickel alloy in this embodiment. The mask 14M is the same in shape as the mask 16M of the sixth embodiment shown in FIG. 67. Then, the resist frame 31 is removed.

Figure 75:
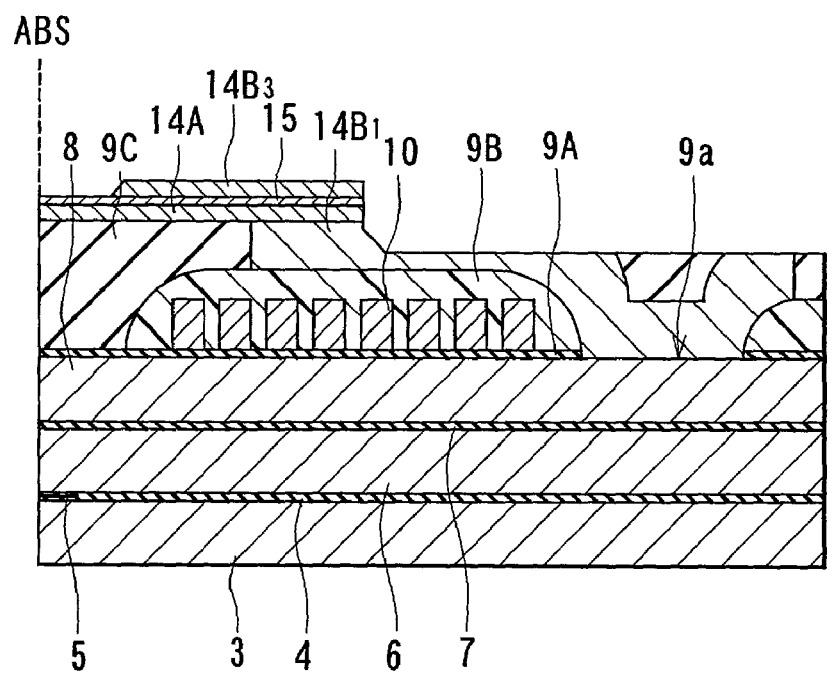
FIG. 75 is a cross-sectional view illustrating a step that follows FIG. 74.

Then, as shown in FIG. 75, using the mask 14M, the non-magnetic layer 15e and the layer 14Ae are etched by dry etching such as ion milling to form the non-magnetic layer 15 and the pole portion layer 14A. At this stage, part of the mask 14M is also etched. The remaining portion of the mask 14M after the etching serves as the third layer $14B_3$ of the yoke portion layer 14B. Through the aforementioned etching, the non-magnetic layer 15 and the pole portion layer 14A are formed and the first layer $14B_1$ of the yoke portion layer 14B is exposed.

If the mask 14M is completely removed through the aforementioned etching, the resulting thin-film magnetic head will have the same structure as that of the third embodiment.

Figure 76:
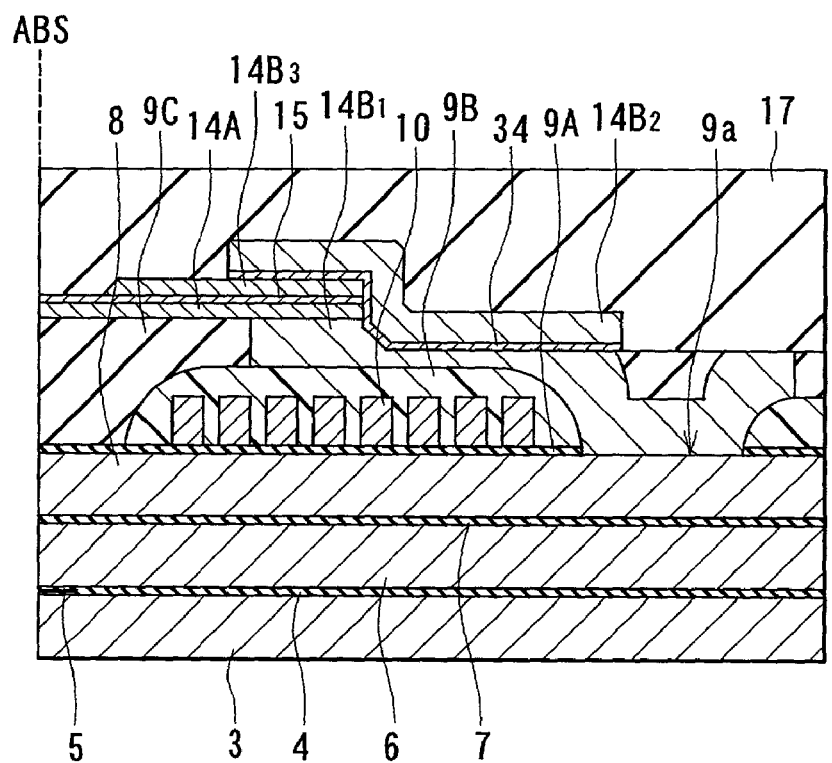
FIG. 76 is a cross-sectional view illustrating a step that follows FIG. 75.

Then, through the same steps as those of the third embodiment shown in FIGS. 51 to 56, the second layer $14B_2$ of the yoke portion layer 14B and the protective layer 17 are formed as shown in FIG. 76. Then, through the steps of forming leads, terminals and the like on the protective layer 17, cutting the substrate for each slider, polishing the medium facing surface ABS, preparing rails for flying and so on, the thin-film magnetic head is completed.

In the thin-film magnetic head of this embodiment, in part of the third layer $14B_3$ of the yoke portion layer 14B located near the medium facing surface ABS, the surface thereof located farther from the non-magnetic layer 15 gradually gets closer to the non-magnetic layer 15 as the distance from the medium facing surface ABS decreases. Therefore, according to this embodiment, the magnetic flux flowing from the yoke portion layer 14B to the pole portion layer 14A via the non-magnetic layer 15 can be efficiently introduced into the pole portion layer 14A without being saturated near the end of the third layer $14B_3$ closer to the medium facing surface ABS.

Furthermore, since the third layer $14B_3$ is provided between the non-magnetic layer 15 and the second layer $14B_2$ of the yoke portion layer 14B in this embodiment, the portion of the yoke portion layer 14B magnetically connected to the pole portion layer 14A via the non-magnetic layer 15 can be increased in area, and it is thereby possible to introduce the magnetic flux into the pole portion layer 14A more efficiently.

In this embodiment, the third layer $14B_3$ of the yoke portion layer 14B is provided on the non-magnetic layer 15, and the second layer $14B_2$ of the yoke portion layer 14B is disposed on the third layer $14B_3$. In addition, in part of the third layer $14B_3$ near the medium facing surface ABS, the surface thereof located farther from the non-magnetic layer 15 gradually gets closer to the non-magnetic layer 15 as the distance from the medium facing surface ABS decreases. Therefore, this embodiment makes it possible to easily form the shape of the yoke portion layer 14B for introducing a magnetic flux, which flows from the yoke portion layer 14B to the pole portion layer 14A through the non-magnetic layer 15, into the pole portion layer 14A efficiently in the portion of the yoke portion layer 14B magnetically connected to the pole portion layer 14A via the non-magnetic layer 15.

According to the method of manufacturing the thin-film magnetic head of this embodiment, the mask 14M, which is used in the etching for defining the outer shape of the pole portion layer 14A, is formed of a magnetic material. This allows the mask 14M to have a good resistance to dry etching. Accordingly, even when the material forming the pole portion layer 14A has a good resistance to dry etching, it is possible to define the outer shape of the pole portion layer 14A by dry etching using the mask 14M. Furthermore, in this embodiment, the remaining portion of the mask 14M after the etching can serve as the third layer $14B_3$ of the yoke portion layer 14B.

Like in the sixth embodiment, the mask 14M used in forming the pole portion layer 14A by dry etching has a varying thickness, and therefore, part of the mask 14M can be entirely removed in the thickness direction as a result of the etching. If this occurs, the layer underlying the mask 14M will be damaged and have surface irregularities. In this embodiment, however, the non-magnetic layer 15 is provided on the pole portion layer 14A to form the mask 14M on the non-magnetic layer 15. It is thereby possible to prevent the surface of the pole portion layer 14A farther from the gap layer 9 from being damaged by the etching, and to thereby allow the surface to be flat.

According to the method of manufacturing the thin-film magnetic head of this embodiment, the mask 14M, part of which located near the medium facing surface ABS is smaller in thickness than the other part, is used to etch the non-magnetic layer 15e and the layer 14Ae. This makes it possible to perform the etching so that the part of the mask 14M located near the medium facing surface ABS is completely removed, allowing the other part to remain. By performing the etching as described above, it is possible to form the third layer $14B_3$ that is not exposed in the medium facing surface ABS. This prevents the third layer $14B_3$ from writing information onto the recording medium.

According to the method of manufacturing the thin-film magnetic head of this embodiment, as shown in FIG. 68, the resist frame 31 having the gap portion, part of the gap portion located near the medium facing surface ABS being smaller in width than the other part, is used to form the mask 14M by electroplating. This makes it possible to facilitate the formation of the mask 14M having the shape as described above.

In this embodiment, the third layer $14B_3$ of the yoke portion layer 14B may be provided independent from the mask for the etching, without using the remaining part of the mask 14M after the etching as described above. Furthermore, in this embodiment the shape of the yoke portion layer 14B is not limited to that in the third embodiment but may be the same as that in the second, fourth, or fifth embodiment.

This embodiment may be modified such that the entire surface of the third layer $14B_3$ of the yoke portion layer 14B farther from the non-magnetic layer 15 gradually gets closer to the non-magnetic layer 15 as the distance from the medium facing surface ABS decreases.

Like in the first embodiment, the head of this embodiment may be configured such that the first magnetic layer 8 and the pole portion layer 14A are magnetically coupled to each other by means of the coupling portion 12 and the yoke portion layer 14B.

The remainder of the structure, functions and effects of this embodiment are similar to those of the third embodiment.

The present invention is not limited to the foregoing embodiments but may be practiced in still other ways. In the first embodiment, for example, the distance between the pole portion layer 14A and the first magnetic layer 8 measured in the medium facing surface ABS is made equal to or greater than the thickness of the coupling portion 12. However, the thickness of the coupling portion 12 may be made greater than the distance between the pole portion layer 14A and the first magnetic layer 8 measured in the medium facing surface ABS.

In FIG. 26, for example, the end of the second layer $14B_2$ of the yoke portion layer 14B closer to the medium facing surface ABS is located closer to the medium facing surface ABS than the end of the first layer $14B_1$ closer to the medium facing surface ABS. However, the positional relationship between those ends may be reversed, or those ends may be located at the same distance from the medium facing surface ABS.

The pole portion layer 14A of the present invention may be made up of two or more layers that are formed by successively depositing two or more materials. In this case, for example, of the two or more layers making up the pole portion layer 14A, one layer located closer to the non-magnetic layer 15 may be formed of a material having a higher saturated magnetic flux density than that of the other (another) layer located closer to the gap layer 9.

In the foregoing, a process has been described, which includes the steps of, after the step of forming the layer to be etched, forming the non-magnetic layer on the layer to be etched, forming the mask corresponding to a shape of the pole portion layer on the non-magnetic layer, and defining an outer shape of the pole portion layer by etching the non-magnetic layer and the layer to be etched, by using the mask. This process is usable not only for the thin-film magnetic head of the present invention but also for a thin-film magnetic head having a different shape so long as it is preferred in the thin-film magnetic head to maintain the flatness of the end of the pole portion layer farther from the gap layer.

As described above, in the thin-film magnetic head of the present invention the second magnetic layer has the pole portion layer and the yoke portion layer. It is therefore possible to reduce the track width without decreasing the intensity of the magnetic field to be applied to the recording medium. Furthermore, the thin-film magnetic head of the invention comprises the non-magnetic layer that is in contact with the entire surface of the pole portion layer farther from the gap layer. It is therefore possible to prevent the surface of the pole portion layer farther from the gap layer from being damaged in the manufacturing process of the thin-film magnetic head, and thereby to keep the surface flat. Therefore, according to the present invention, the end of the pole portion layer farther from the gap layer is kept flat in the medium facing surface, and the magnetic field generated from the pole portion layer in the medium facing surface is made uniform in the direction intersecting the track. As a result, it is possible to prevent the bit pattern of the recording medium from being distorted in shape, and to thereby improve the linear recording density. Consequently, the present invention allows the magnetic pole portion to produce an increased magnetic field in the direction perpendicular to the surface of the recording medium and thereby improves the recording density thereof.

In the thin-film magnetic head of the invention, part of the yoke portion layer may be adjacent to the surface of the pole portion layer farther from the gap layer via the non-magnetic layer, and may be magnetically connected to the pole portion layer via the non-magnetic layer. In this case, it is possible to introduce a magnetic flux from the yoke portion layer to the medium-facing-surface side of the pole portion layer via the non-magnetic layer, through the surface of the pole portion layer farther from the gap layer, too.

In the thin-film magnetic head of the invention, the part of the yoke portion layer that is adjacent to the surface of the pole portion layer farther from the gap layer via the non-magnetic layer has a surface that is farther from the non-magnetic layer, and the surface, at least in a part thereof located near the medium facing surface, may gradually get closer to the non-magnetic layer as the distance from the medium facing surface decreases. In this case, the magnetic flux flowing from the yoke portion layer to the pole portion layer via the non-magnetic layer can be efficiently introduced into the pole portion layer without being saturated near the end of the yoke portion layer closer to the medium facing surface.

In the thin-film magnetic head of the invention, the part of the yoke portion layer adjacent to the surface of the pole portion layer farther from the gap layer via the non-magnetic layer may include: a direct connection layer that is in contact with the non-magnetic layer; and an indirect connection layer that is in contact with at least a part of a surface of the direct connection layer farther from the non-magnetic layer. This allows the portion of the yoke portion layer magnetically connected to the pole portion layer via the non-magnetic layer to be increased in area, and it is thereby possible to introduce the magnetic flux into the pole portion layer more efficiently.

In the thin-film magnetic head of the present invention, the surface of the direct connection layer farther from the non-magnetic layer, at least in a part thereof located near the medium facing surface, may gradually get closer to the non-magnetic layer as the distance from the medium facing surface decreases. In this case, it is possible to easily form the shape of the yoke portion layer for introducing the magnetic flux, which flows from the yoke portion layer to the pole portion layer through the non-magnetic layer 15, into the pole portion layer efficiently in the portion of the yoke portion layer magnetically connected to the pole portion layer via the non-magnetic layer.

The thin-film magnetic head of the present invention may be provided with a third magnetic layer that is adjacent to a surface of the non-magnetic layer farther from the pole portion layer. In this case, it is possible to provide a sharp gradient of the magnetic field in the medium facing surface near the surface of the pole portion layer farther from the gap layer, and it is thereby possible to prevent the bit pattern of the recording medium from being distorted in shape and to improve the linear recording density.

In the thin-film magnetic head of the present invention, one of ends of the third magnetic layer closer to the medium facing surface may be located at a distance from the medium facing surface. In this case, it is possible to prevent the information that has been once written onto the recording medium from being erased by the magnetic field produced from the third magnetic layer.

In the thin-film magnetic head of the present invention, the third magnetic layer may have a saturated magnetic flux density smaller than that of the pole portion layer. In this case, such an effect is provided that the information that has been once written onto the recording medium can be prevented from being erased by the magnetic field produced from the third magnetic layer.

In the thin-film magnetic head of the present invention, the pole portion layer may have a saturated magnetic flux density equal to or greater than that of the yoke portion layer. In this case, it is possible to prevent a saturation of the magnetic flux halfway through the second magnetic layer.

The thin-film magnetic head of the present invention may further comprise a magnetoresistive element as a read element. In this case, read performance can be improved as compared with the case where reading is performed by using an induction-type electromagnetic transducer.

In the thin-film magnetic head of the present invention, the first magnetic layer may be disposed on the trailing side of the traveling direction of the recording medium, while the second magnetic layer may be disposed on the leading side of the traveling direction of the recording medium. In this case, it is possible to form a magnetization pattern of a higher density on the recording medium, thereby improving the linear recording density.

The thin-film magnetic head of the present invention may be employed for a vertical magnetic recording scheme. In this case, it is possible to make the thin-film magnetic head impervious to heat fluctuations of the recording medium, thereby increasing the linear recording density.

According to the method of manufacturing a thin-film magnetic head of the present invention, the second magnetic layer is formed to have the pole portion layer and the yoke portion layer. It is therefore possible to reduce the track width without decreasing the intensity of the magnetic field to be applied to the recording medium. Furthermore, in the method of manufacturing the thin-film magnetic head of the present invention, the non-magnetic layer is formed which is in contact with the entire surface of the pole portion layer farther from the gap layer. It is therefore possible to prevent the surface of the pole portion layer farther from the gap layer from being damaged in the manufacturing process of the thin-film magnetic head, and thereby to keep the surface flat. Therefore, according to the present invention, the end of the pole portion layer farther from the gap layer is kept flat in the medium facing surface, and the magnetic field generated by the pole portion layer in the medium facing surface is made uniform in the direction intersecting the track. As a result, it is possible to prevent the bit pattern of the recording medium from being distorted in shape, and to thereby improve the linear recording density. Consequently, the present invention allows the magnetic pole portion to produce an increased magnetic field in the direction perpendicular to the surface of the recording medium and thereby improves the recording density thereof.

In the method of manufacturing a thin-film magnetic head of the present invention, the step of forming the second magnetic layer and the non-magnetic layer may include the steps of: forming a layer to be etched, made of a material for forming the pole portion layer, on the gap layer; forming the non-magnetic layer on the layer to be etched; forming a mask corresponding to a shape of the pole portion layer on the non-magnetic layer; and defining an outer shape of the pole portion layer by etching the non-magnetic layer and the layer to be etched selectively by dry etching through the use of the mask. In this case, the outer shape of the pole portion layer can be defined with the top surface of the layer to be etched being protected by the non-magnetic layer, which makes it possible to maintain the flatness of the end of the pole portion layer farther from the gap layer.

Furthermore, in the method of manufacturing a thin-film magnetic head of the present invention, after the step of forming the layer to be etched, the top surface of the layer to be etched may be flattened by polishing. In this case, the end of the pole portion layer farther from the gap layer can be completely made flat in the medium facing surface. This allows the magnetic field produced by the pole portion layer in the medium facing surface to be made uniform in the direction intersecting the track. Consequently, it is possible to prevent the bit pattern of the recording medium from being distorted, and to thereby improve the linear recording density.

In the method of manufacturing a thin-film magnetic head of the present invention, a base of the layer to be etched may be also flattened by polishing, prior to the step of forming the layer to be etched. In this case, the end of the pole portion layer closer to the gap layer can be made flat in the medium facing surface. If the layer to be etched is formed by sputtering, the end of the pole portion layer farther from the gap layer can also be made flat in the medium facing surface. As a result, according to the present invention, the magnetic field produced by the pole portion layer in the medium facing surface can be made uniform in the direction intersecting the track. Consequently, it is possible to prevent the bit pattern of the recording medium from being distorted, and to thereby improve the linear recording density.

In the method of manufacturing a thin-film magnetic head of the present invention, the mask may be formed of a magnetic material. In this case, it is possible to form the mask to have a better resistance to dry etching, and as a result, it is possible to define the outer shape of the pole portion layer by dry etching using the mask, even when the pole portion layer is made of a material that has a good resistance to dry etching.

Furthermore, according to the method of manufacturing a thin-film magnetic head of the present invention, in the step of defining the outer shape of the pole portion layer, the etching may be carried out such that at least a portion of the mask remains. In this case, it is possible to utilize the portion of the mask remaining after the etching as a magnetic layer.

Furthermore, according to the method of manufacturing a thin-film magnetic head of the present invention, in the step of defining the outer shape of the pole portion layer, a third magnetic layer may be formed of the portion of the mask remaining after the etching, the third magnetic layer being adjacent to a surface of the non-magnetic layer farther from the pole portion layer. In this case, it is possible to provide a sharp gradient of the magnetic field in the medium facing surface near the surface of the pole portion layer farther from the gap layer, and it is thereby possible to prevent the bit pattern of the recording medium from being distorted in shape and to improve the linear recording density.

According to the method of manufacturing a thin-film magnetic head of the present invention, in the step of defining the outer shape of the pole portion layer, part of the yoke portion layer may be formed of the portion of the mask remaining after the etching, the yoke portion layer being adjacent to the surface of the pole portion layer farther from the gap layer via the non-magnetic layer and magnetically connected to the pole portion layer via the non-magnetic layer. This allows the portion of the yoke portion layer magnetically connected to the pole portion layer via the non-magnetic layer to be increased in area, and it is thereby possible to introduce the magnetic flux into the pole portion layer more efficiently.

Furthermore, according to the method of manufacturing a thin-film magnetic head of the present invention, the mask may be formed by electroplating, using a frame having a gap portion, part of the gap portion located near the medium facing surface being smaller in width than the other part. In this case, it is possible to facilitate the formation of the mask, a part of which located near the medium facing surface is smaller than the other part in thickness. This makes it possible to easily perform the etching such that at least part of the mask remains.

Furthermore, according to the method of manufacturing a thin-film magnetic head of the present invention, in the step of defining the outer shape of the pole portion layer, the etching may be carried out such that a part of the mask that located near the medium facing surface is completely removed while the other part of the mask is allowed to remain. In this case, it is possible to prevent the portion of the mask remaining after the etching from writing information onto the recording medium.

Furthermore, according to the method of manufacturing a thin-film magnetic head of the present invention, the part of the mask located near the medium facing surface has a thickness smaller than that of the other part. In this case, it is possible to carry out the etching so as to allow the part of the mask located near the medium facing surface to be completely removed while allowing the other part of the mask to remain.

Obviously many modifications and variations of the present invention are possible in the light of the above teachings. It is therefore to be understood that within the range of equivalency of the appended claims the present invention may be carried out otherwise than as specifically described.

What is claimed is:

1. A thin-film magnetic head comprising:
a medium facing surface that faces toward a recording medium;
a first magnetic layer and a second magnetic layer that are magnetically coupled to each other at a distance from the medium facing surface, and include magnetic pole portions disposed so as to oppose each other with a predetermined spacing interposed therebetween along the traveling direction of the recording medium;
a gap layer made of a non-magnetic material and provided between the first and second magnetic layers; and
a thin-film coil at least a part of which is disposed between the first and second magnetic layers and insulated from the first and second magnetic layers, wherein:

the second magnetic layer has: a pole portion layer including the magnetic pole portion, the width of the pole portion layer measured in the medium facing surface defining a track width; and a yoke portion layer for magnetically connecting the pole portion layer and the first magnetic layer to each other;

at a location apart from the medium facing surface, the pole portion layer is not in contact with the first magnetic layer but is connected to the first magnetic layer via at least the yoke portion layer;

the gap layer has an end located in the medium facing surface next to the second magnetic layer, the part of the thin-film coil disposed between the first and second magnetic layers has a surface closer to the second magnetic layer, and this surface of the part of the thin-film coil is located closer to the first magnetic layer than is the end of the gap layer; and the yoke portion layer is magnetically connected to the pole portion layer at least in part of: an end surface of the pole portion layer farther from the medium facing surface; a surface of the pole portion layer closer to the gap layer; and both side surfaces of the pole portion layer in the width direction, the thin-film magnetic head further comprising a non-magnetic layer that is in contact with the entire surface of the pole portion layer farther from the gap layer.

2. A thin-film magnetic head according to claim 1, wherein a part of the yoke portion layer is adjacent to the surface of the pole portion layer farther from the gap layer via the non-magnetic layer, and magnetically connected to the pole portion layer via the non-magnetic layer.

3. A thin-film magnetic head according to claim 2, wherein the part of the yoke portion layer that is adjacent to the surface of the pole portion layer farther from the gap layer via the non-magnetic layer has a surface that is farther from the non-magnetic layer, and the surface of the part of the yoke portion layer, at least in a part thereof located near the medium facing surface, gradually gets closer to the non-magnetic layer as the distance from the medium facing surface decreases.

4. A thin-film magnetic head according to claim 2, wherein the part of the yoke portion layer that is adjacent to the surface of the pole portion layer farther from the gap layer via the non-magnetic layer includes: a direct connection layer that is in contact with the non-magnetic layer; and an indirect connection layer that is in contact with at least a part of a surface of the direct connection layer farther from the non-magnetic layer.

5. A thin-film magnetic head according to claim 4, wherein the surface of the direct connection layer farther from the non-magnetic layer, at least in a part thereof located near the medium facing surface, gradually gets closer to the non-magnetic layer as the distance from the medium facing surface decreases.

6. A thin-film magnetic head according to claim 1, further comprising a third magnetic layer that is in contact with a surface of the non-magnetic layer farther from the pole portion layer.

7. A thin-film magnetic head according to claim 6, wherein one end of the third magnetic layer closer to the medium facing surface is located apart from the medium facing surface.

8. A thin-film magnetic head according to claim 6, wherein the third magnetic layer has a saturated magnetic flux density smaller than that of the pole portion layer.

9. A thin-film magnetic head according to claim 1, wherein the pole portion layer has a saturated magnetic flux density equal to or greater than that of the yoke portion layer.

10. A thin-film magnetic head according to claim 1, further comprising a magnetoresistive element as a read element.

11. A thin-film magnetic head according to claim 1, wherein the first magnetic layer is disposed on the trailing side of the traveling direction of the recording medium, while the second magnetic layer is disposed on the leading side of the traveling direction of the recording medium.

12. A thin-film magnetic head according to claim 1, being employed for a vertical magnetic recording scheme.

* * * * *